United States Patent
Allen et al.

(10) Patent No.: US 9,738,784 B2
(45) Date of Patent: Aug. 22, 2017

(54) POLYMER BLENDS

(75) Inventors: Scott D. Allen, Ithaca, NY (US); Sanjeev Naik, Ithaca, NY (US)

(73) Assignee: Novomer, Inc., Waltham, MA (US)

( * ) Notice: Subject to any disclaimer, the term of this patent is extended or adjusted under 35 U.S.C. 154(b) by 848 days.

(21) Appl. No.: 13/878,582

(22) PCT Filed: Oct. 11, 2011

(86) PCT No.: PCT/US2011/055846
§ 371 (c)(1),
(2), (4) Date: Apr. 10, 2013

(87) PCT Pub. No.: WO2012/051219
PCT Pub. Date: Apr. 19, 2012

(65) Prior Publication Data
US 2013/0209775 A1    Aug. 15, 2013

Related U.S. Application Data

(60) Provisional application No. 61/535,573, filed on Sep. 16, 2011, provisional application No. 61/392,010, filed on Oct. 11, 2010.

(51) Int. Cl.
*C08L 69/00* (2006.01)
*C08L 23/12* (2006.01)
(Continued)

(52) U.S. Cl.
CPC .......... *C08L 69/00* (2013.01); *B29C 47/0057* (2013.01); *C08J 5/18* (2013.01);
(Continued)

(58) Field of Classification Search
CPC ......... C08J 5/18; C08L 23/02–23/0838; C08L 23/10–23/16; C08L 69/00
See application file for complete search history.

(56) References Cited

U.S. PATENT DOCUMENTS 3,585,168 A * 6/1971 Inoue et al. ....... C08G 64/0208
502/152
3,706,716 A * 12/1972 Hull et al. ......... C08G 73/0627
524/233

(Continued)

FOREIGN PATENT DOCUMENTS

CN    1148063 A    4/1997
CN    1388178 A    1/2003
(Continued)

OTHER PUBLICATIONS

Machine translation of JP3016601. Retrieved Feb. 6, 2015.*
(Continued)

*Primary Examiner* — Prashant J Khatri
(74) *Attorney, Agent, or Firm* — John G. Tolomei

(57) ABSTRACT

The present invention provides, among other things, extruded blends of aliphatic polycarbonates and polyolefins. In one aspect, provided blends comprise aliphatic polycarbonates such as poly(propylene carbonate) and a lesser amount of a crystalline or semicrystalline polymer. In certain embodiments, provided blends are characterized in that they exhibit unexpected improvements in their elongation properties. In another aspect, the invention provides methods of making such materials and applications of the materials in applications such as the manufacture of consumer packaging materials.

21 Claims, 3 Drawing Sheets

(51) Int. Cl.

| | |
|---|---|
| *C08L 23/06* | (2006.01) |
| *C08J 5/18* | (2006.01) |
| *C08L 23/04* | (2006.01) |
| *C08L 23/10* | (2006.01) |
| *B29C 47/00* | (2006.01) |

(52) U.S. Cl.
CPC .............. *C08L 23/04* (2013.01); *C08L 23/06* (2013.01); *C08L 23/10* (2013.01); *C08L 23/12* (2013.01); *Y10T 428/31507* (2015.04)

(56) References Cited

U.S. PATENT DOCUMENTS

| | | | |
|---|---|---|---|
| 4,137,280 A | | 1/1979 | Dixon et al. |
| 4,410,482 A | * | 10/1983 | Subramanian ...... B29C 47/0004 264/171.28 |
| 5,399,600 A | | 3/1995 | Buysch et al. |
| 5,536,806 A | | 7/1996 | Sant'Angelo |
| 5,585,434 A | | 12/1996 | DeNicola, Jr. et al. |
| 7,304,172 B2 | | 12/2007 | Coates et al. |
| 8,247,520 B2 | | 8/2012 | Allen et al. |
| 8,470,956 B2 | | 6/2013 | Allen et al. |
| 8,575,245 B2 | | 11/2013 | LaPointe et al. |
| 8,580,911 B2 | | 11/2013 | Allen et al. |
| 8,604,155 B2 | | 12/2013 | Allen et al. |
| 8,748,555 B2 | | 6/2014 | Allen |
| 8,785,591 B2 | | 7/2014 | Allen et al. |
| 8,921,508 B2 | | 12/2014 | Allen et al. |
| 9,029,498 B2 | | 5/2015 | Allen et al. |
| 9,102,800 B2 | | 8/2015 | Allen et al. |
| 2008/0097033 A1 | | 4/2008 | Rosenau et al. |
| 2009/0105443 A1 | | 4/2009 | Brack et al. |
| 2009/0105444 A1 | | 4/2009 | Chatterjee et al. |
| 2011/0218127 A1 | | 9/2011 | Allen et al. |
| 2011/0230580 A1 | | 9/2011 | Allen et al. |
| 2011/0257296 A1 | | 10/2011 | LaPointe et al. |
| 2012/0059078 A1 | | 3/2012 | Kim et al. |
| 2012/0156410 A1 | | 6/2012 | Allen |
| 2013/0066044 A1 | | 3/2013 | Allen et al. |
| 2013/0244864 A1 | | 9/2013 | Allen et al. |
| 2013/0303724 A1 | | 11/2013 | Allen et al. |
| 2014/0031453 A1 | | 1/2014 | Allen et al. |
| 2014/0046008 A1 | | 2/2014 | Allen et al. |
| 2015/0166734 A1 | | 6/2015 | Allen et al. |
| 2015/0299386 A1 | | 10/2015 | Allen et al. |
| 2015/0307660 A1 | | 10/2015 | Allen et al. |

FOREIGN PATENT DOCUMENTS

| | | |
|---|---|---|
| CN | 1415661 A | 5/2003 |
| CN | 101432360 A | 5/2009 |
| CN | 102471473 A | 5/2012 |
| DE | 4328384 A1 | 3/1995 |
| JP | 3016601 B * | 3/2000 |
| JP | 2008-063577 A | 3/2008 |
| JP | 2008-527151 A | 7/2008 |
| JP | 4-214750 B2 | 1/2009 |
| JP | 2010-505370 A | 2/2010 |
| JP | 2010-138326 A | 6/2010 |
| JP | 2011-500912 A | 1/2011 |
| JP | 2011-193345 A | 9/2011 |
| JP | 2012-057158 A | 3/2012 |
| WO | WO-2007/125039 A1 | 11/2007 |
| WO | WO-2008/039872 A2 | 4/2008 |
| WO | WO-2009/050682 A2 | 4/2009 |
| WO | WO-2010/022388 A2 | 2/2010 |
| WO | WO-2010/028362 A1 | 3/2010 |
| WO | WO-2010/060038 A1 | 5/2010 |
| WO | WO-2010/062703 A1 | 6/2010 |
| WO | WO-2010/075232 A1 | 7/2010 |
| WO | WO-2011/005664 A2 | 1/2011 |
| WO | WO-2012/071505 A1 | 5/2012 |

OTHER PUBLICATIONS

Zhu et al. "Thermally stable and high molecular weight poly(propylene carbonate)s from carbon dioxide and propylene oxide". Polymer International, vol. 51, Issue 10, (2002); pp. 1079-1085.*
International Search Report for PCT/US2011/055846, 4 pages (Apr. 27, 2012).
Written Opinion for PCT/US2011/055846, 9 pages (Apr. 27, 2012).
Kamal, M.R. et al., The development of laminar morphology during extrusion of polymer blends, Polymer Engineering & Science, 35(1): 41-51 (1995).
Lednor, P.W. and Rol, N.C., Copolymerization of Propene Oxide with Carbon Dioxide: Aselective Incorporation of Propene Oxide into the Polycarbonate Chains, determined by 100 MHz 13C N.M.R. Spectroscopy, J. Chem. Soc., Chem. Comm., 598-599 (1985).
Lee, S.Y. and Kim, S.C., Laminar morphology development and oxygen permeability of LDPE/EVOH blends, Polymer Engineering & Science, 37(2): 463-475 (1997).
Subramanian, P.M., Permeability barriers by controlled morphology of polymer blends, Polymer Engineering & Science, 25(8): 483-487 (1985).

* cited by examiner

POLYMER BLENDS

CROSS REFERENCE TO RELATED APPLICATIONS

The present application claims priority to U.S. provisional application Ser. No. 61/392,010, filed Oct. 11, 2010, and U.S. provisional application Ser. No. 61/535,573, filed Sep. 16, 2011, the entire contents of each of which are hereby incorporated herein by reference.

GOVERNMENT SUPPORT

This invention was made with U.S. government support under Contract DE-FE0002474, awarded by the US Department of Energy. The U.S. government has certain rights in the invention.

FIELD OF THE INVENTION

The invention pertains to the field of polymer compositions and polymer blends. More particularly, the invention pertains to aliphatic polycarbonate blends having improved properties.

BACKGROUND OF THE INVENTION

Lessening the carbon footprint of plastics used for consumer applications such as packaging is of increasing importance. Aliphatic polycarbonates (APCs) are recognized as an attractive option in this regard since they have a very favorable carbon profile compared to traditional polymers derived exclusively from fossil fuel feedstocks. This is due in part to the fact that a significant portion of the mass of the polymer is derived from $CO_2$ which can be derived from waste sources. APCs not only replace a significant mass of polymer with non-fossil fuel feedstock, they can actually be produced from waste $CO_2$ that would otherwise be released to the atmosphere. Additional factors such as lower processing temperatures and lower use of energy in production make these polymers even more favorable when compared to polymers derived exclusively from petroleum or natural gas feedstocks. Life cycle analyses of aliphatic polycarbonates also indicate they exceed bio-based polymers that require large amounts of energy and fresh water for production and in some instances compete for the same resources required for food production.

For these advantages to have a significant environmental benefit requires the identification of large markets where significant volumes of APC can replace traditional petrochemical polymers. This has been a challenge: while epoxide $CO_2$ polymers have been known for over 40 years, they have yet to find broad application in any commodity market This is due to their relatively poor structural and thermal characteristics, and until recently, their high cost. The cost has been reduced in recent years through the identification of efficient cobalt-based catalysts for the copolymerization of $CO_2$. Strides have also been made in improving the physical properties of the polymers. APCs made with cobalt catalysts have much better defined structures than earlier materials based on zinc or aluminum catalysts. The newer materials exhibit a very high degree of $CO_2$ incorporation, strict control of molecular weight (Mn) and molecular weight distribution (PDI) and lower contamination by cyclic carbonate by-products.

APCs encompassing these improvements have been demonstrated to have higher glass transition temperatures, better thermal stability, and lower gas permeability. All of these improvements have increased the likelihood of adoption of the polymers in large volume consumer applications such as uses as packaging materials. However, the polymers still have some shortcomings in terms of their physical strength and flexibility. Poly(propylene carbonate) which has been the most studied epoxide-$CO_2$ copolymer tends to be quite brittle. This is particularly true if the polymer is produced in highly pure form free of ether linkages (caused by direct enchainment of two or more epoxides without $CO_2$) and free of cyclic propylene carbonate (cPC) (formed as a byproduct during polymerization or by partial degradation of the polymer by nucleophilic attack of the hydroxyl chain ends on adjacent carbonate linkages). In certain cases, the presence of ether linkages can lower the Tg of the polymer and provide less brittle materials, but this generally comes at the cost of strength, lower thermal stability and poorer gas barrier properties. Likewise, while residual cyclic carbonate can act as a plasticizer to make the polymer less brittle, the presence of the byproduct has undesirable side effects and may be a problem where the polymer is to be used for food contact since small molecules such as propylene carbonate can migrate from the packaging material to contaminate the contents of the package.

Attempts have been made to blend aliphatic polycarbonates with other materials to improve their applicability, but these blends have focused on biopolymers such as polylactic acid (PLA), polyhydroxybutyrate (PHB), starch and the like. These blends still suffer the environmental disadvantages of the biopolymers used in the blends and in many cases, still have only moderate processing and physical characteristics.

Polyolefins such as polyethylene (PE) and polypropylene (PP) constitute the major portion of the consumer packaging market. These polymers are popular because they provide an excellent combination of physical properties, good processing characteristics and low cost. As noted above, one area in which they lag is their carbon footprint. Blends of polyolefins with aliphatic polycarbonates are not currently known in the art.

Lower permeability to oxygen is also important in packaging applications. Good oxygen barrier properties lead to an increased shelf-life as a result of less oxidation of food and beverages, thereby maintaining taste and quality for a longer time. This is particularly important as current trends in the packaging industry are to down-gauge films by reducing their thickness to provide light-weight packaging. Thus, an improvement in permeability at an equivalent thickness or an equivalent permeability at a much lower thickness can have significant commercial value. Improved oxygen barrier films are important for packaging a variety of foods and beverages, including meat, baked goods, snacks, juices in stand-up pouches, confectionaries, and a wide variety of moisture and oxygen sensitive nutraceuticals and health and beauty products. The food packaging industry is looking for new options as they move away from current materials like polyvinylidene chloride (PVDC) due to environmental regulatory pressures on chlorinated materials and ethylene vinyl alcohol (EVOH) due to sensitivity to moisture and higher oxygen permeability at higher humidity levels.

There remains a need for APC compositions with improved physical properties. Methods to improve the properties of the APCs without sacrificing their unique environmental benefits would be particularly valuable. The present invention addresses these needs and others.

SUMMARY OF THE INVENTION

The present invention provides, among other things, blends of aliphatic polycarbonates and polyolefins, films thereof, and methods of making such blends and films. In certain embodiments, such blends are extruded. In some embodiments, provided compositions have improved elongation properties. In some embodiments, provided compositions comprise an aliphatic polycarbonate in combination with one or more non aliphatic polycarbonate polymers characterized in that the measured oxygen permeability that is less than expected from the predicted permeability calculated using the oxygen permeability values of the polymers in the blend.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either a Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched".

The term "epoxide", as used herein, refers to a substituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer is comprised of substantially alternating units derived from $CO_2$ and an epoxide (e.g., poly(ethylene carbonate)). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used herein

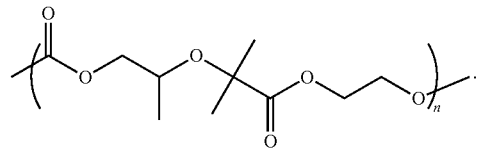

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

As used herein, the term "catalyst" refers to a substance the presence of which increases the rate and/or extent of a chemical reaction, while not being consumed or undergoing a permanent chemical change itself.

As used herein, the term "crystalline" refers to a polymer or polymer composition that possesses a first order transition or crystalline melting point (Tm) as determined by differential scanning calorimetry (DSC) or equivalent technique. The term may be used interchangeably with the term "semi-crystalline". Relative to an amorphous polymer, a crystalline polymer or a composition thereof possesses higher degrees of ordered structure. In some embodiments, a crystalline polymer has characteristics that may be used to differentiate the material from amorphous material. In some embodiments, crystalline material is sufficiently crystalline such that is has a melting point.

As used herein, the term "crystallizable" refers to polymers or compositions thereof which are mainly amorphous in a certain state, but can crystallize upon being subjected to conditions and methods described herein.

As used herein, the term "amorphous" refers to a polymer lacking a melting point as determined by differential scanning calorimetry (DSC) or equivalent technique.

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

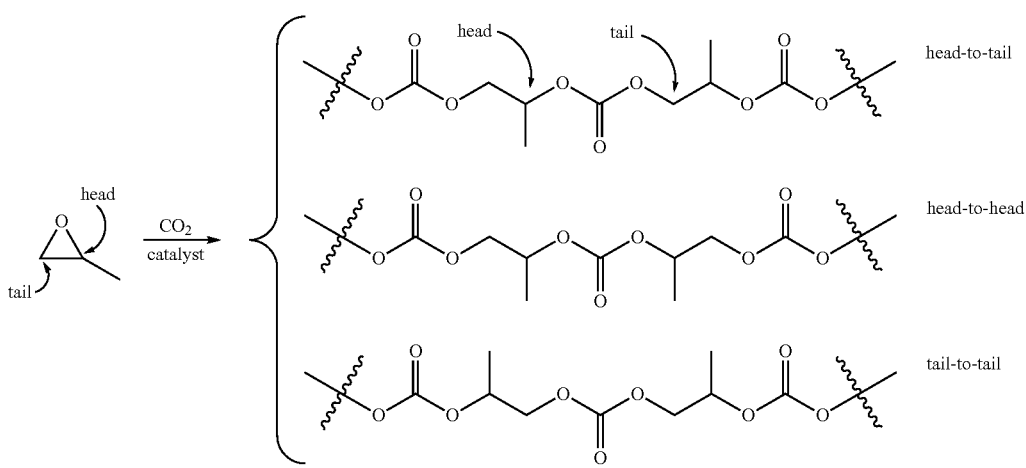

The term head-to-tail ratio (H:T) refers to the proportion of head-to-tail linkages to the sum of all other regiochemical possibilities. Such terms may be used to describe and/or quantify the regioregularity of a polymer or polymer composition. The head-to-tail ratio of poly(propylene carbonate) can readily be determined by $^{13}$C-NMR spectroscopy, as described by, for example, Lednor, et al. *J. Chem. Soc., Chem. Comm.* 1985, 598-599. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

The term "tacticity", as used herein, refers to the stereoregularity of the orientation of the propylene unit methyl groups in a polymer or polymer composition. Such stereoregularity may be considered apart from regioregularity (e.g., head-to-tail ratio), but for simplicity the definition below considers adjacent propylene units with the same regiochemistry. Pairs (diads) of methyl residues from adjacent (i.e., spaced apart by a carbonate unit) propylene units which have the same relative stereochemical orientation with respect to the polymer backbone are termed "meso" (m). Those of opposite stereochemical configuration are termed "racemic" (r). When three adjacent propylene units (triads) have methyl groups with the same orientation, the tacticity of the triad is "mm". If two adjacent propylene units in a three propylene unit sequence have the same stereochemical orientation, and that orientation is different from the relative configuration of the third unit, the tacticity of the triad is "mr". When the middle propylene unit has an opposite configuration from either propylene neighbor, the triad has "rr" tacticity. The fraction of each type of triad in the polymer bases on the total chain content can be determined and when multiplied by 100 indicates the percentage of that type found in the polymer. The tacticity as used herein is the percentage of isotactic "mm" triads.

The term "syndiotactic", as used herein, refers to a PPC polymer or polymer composition wherein the stereochemical orientation of propylene unit methyl groups alternates along the polymer chain. For example, a perfectly syndiotactic polymer has 100% racemic diads. A syndiotactic polymer or composition thereof need not be perfectly syndiotactic, but may contain a certain degree of syndiotacticity (e.g., slightly syndiotactic).

The term "isotactic", as used herein, refers to a PPC polymer or polymer composition wherein the relative stereochemical orientation of propylene unit methyl groups is the same along the polymer chain. For example, a perfectly isotactic polymer has 100% meso diads. An isotactic polymer or composition thereof need not be perfectly isotactic, but may contain a certain degree of isotacticity (e.g., slightly isotactic).

The term "melting point" for a material as used herein is defined as the highest peak among principal and secondary melting peaks as determined by Differential Scanning calorimetry (DSC).

The term "barrier polymer", as used herein, is defined as any polymer having a low permeability to a molecule of interest. In some embodiments, the molecule of interest is oxygen. In some embodiments, the molecule of interest is water.

The term "structural polymer", as used herein, is defined as any polymer having a predetermined value for at least one mechanical or structural property other than permeability such as, for example, density, hardness, rigidity, impact resistance, strength, and toughness.

The term "polycarbonate", as used herein, is defined as any polymer containing carbonate groups. The term "aliphatic polycarbonate", as used herein is defined as any polycarbonate which does not contain aromatic rings.

The term "polyolefin", as used herein, is defined as any polymer produced from a simple olefin as a monomer having the general formula $C_nH_{2n}$.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R°; —(CH$_2$)$_{0-4}$OR°; —O—(CH$_2$)$_{0-4}$C(O)OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH═CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)N(R°)$_2$; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched)alkylene)O—N(R°)$_2$; or —(C$_{1-4}$ straight or branched) alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R•, -(haloR•), —(CH$_2$)$_{0-2}$OH, —(CH$_2$)$_{0-2}$OR•, —(CH$_2$)$_{0-2}$CH(OR•)$_2$; —O(haloR•), —CN, —N$_3$, —(CH$_2$)$_{0-2}$C(O)R•, —(CH$_2$)$_{0-2}$C(O)OH, —(CH$_2$)$_{0-2}$C(O)OR•, —(CH$_2$)$_{0-4}$C(O)N(R°)$_2$; —(CH$_2$)$_{0-2}$SR•, —(CH$_2$)$_{0-2}$SH, —(CH$_2$)$_{0-2}$NH$_2$, —(CH$_2$)$_{0-2}$NHR•, —(CH$_2$)$_{0-2}$NR•$_2$, —NO$_2$, —SiR•$_3$, —OSiR•$_3$, —C(O)SR•, —(C$_{1-4}$ straight or branched alkylene)C(O)OR•, or —SSR• wherein each R• is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.
Suitable substituents on a substitutable nitrogen of an "optionally substituted" group include —R$^†$, —NR$^†$$_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†$$_2$, —C(S)NR$^†$$_2$, —C(NH)NR$^†$$_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

DETAILED DESCRIPTION OF CERTAIN EMBODIMENTS

Figure 1:
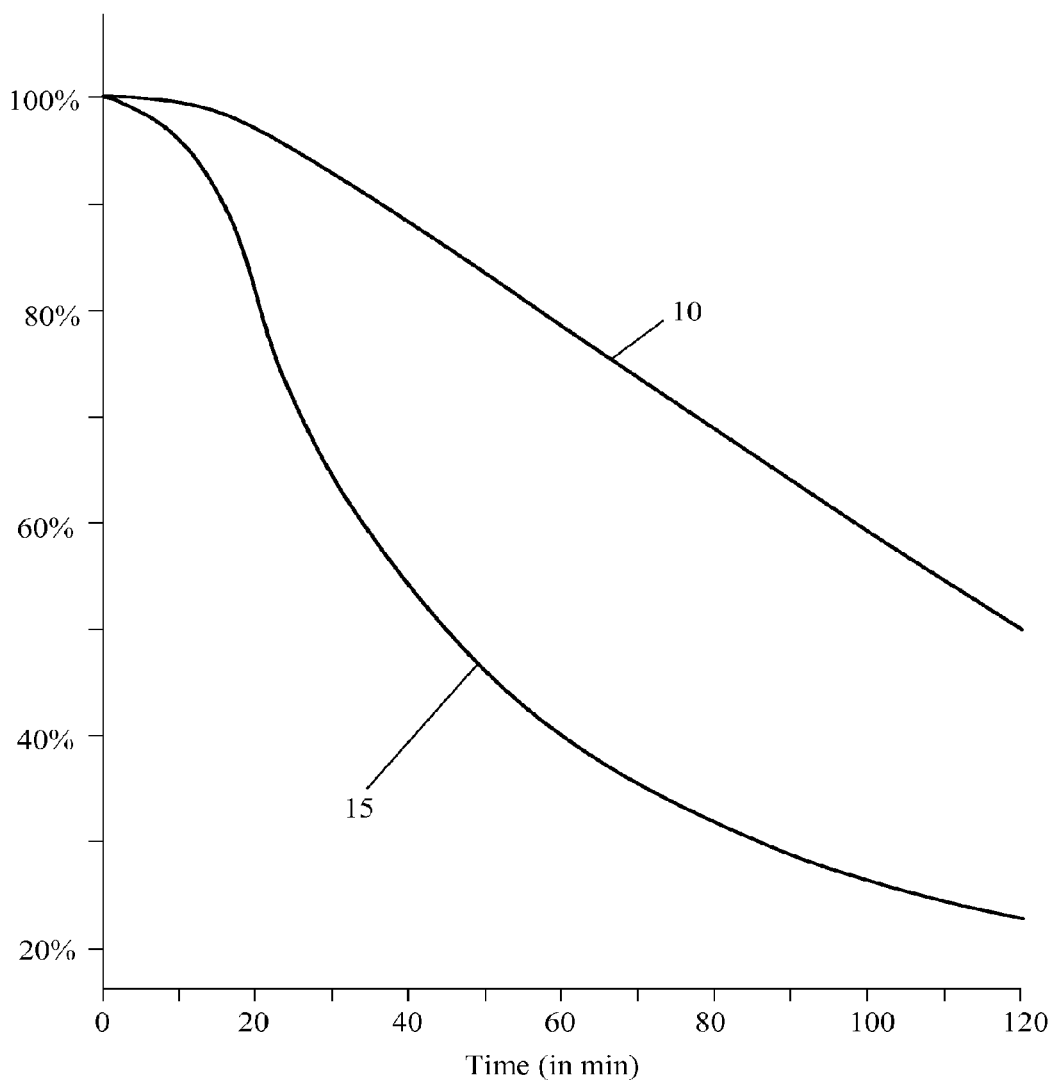
FIG. 1 shows the mass over time of two samples of PPC at 200° C.

Coextrusion or lamination yielding multi-layer products is typically used to obtain films with high barrier properties for packaging applications. Three to five layers and sometimes up to nine layers are used to produce a film with the desired properties. However, multi-layer products require high capital investment and complex process control. The present invention encompasses the recognition that a single blend polymer with higher barrier properties can reduce the complexity of the packaging significantly, but low moisture sensitivity of commonly used oxygen barrier polymers like EVOH requires them to be embedded in between two polyolefin layers.

In some embodiments, the present invention provides an extruded polymer blend comprising an epoxide/CO$_2$ copolymer and one or more polyolefins. These novel materials have not been heretofore known in the art. Without being bound by theory or thereby limiting the scope of the current invention, it is believed this may be due to incompatibility of existing commercially available aliphatic polycarbonates with the processing temperatures at which polyolefins are processed and extruded. The present invention therefore provides, among other things, the identification of the previously unknown source of a problem. In certain embodiments, the present invention provides extruded polymer blends comprising aliphatic polycarbonate compositions with improved thermal processing characteristics.

In some embodiments, the present invention encompasses blends of APCs with one or more additional polymers, wherein the APC comprises at least 70 weight percent of the blend. In certain embodiments, the inventive blends comprise at least 80, at least 90 or at least 95 weight percent APC. In certain embodiments, the inventive blends also comprise up to about 30 weight percent of one or more crystalline or semicrystalline polymers. In certain embodiments, the inventive blends comprise less than about 20, less than about 10 or less than about 5 weight percent of a crystalline or semicrystalline polymer. In certain embodiments, the inventive blends comprise between about 1 and about 10 weight percent of a crystalline or semicrystalline polymer. In certain embodiments, the inventive blends comprise about 5 weight percent of a crystalline or semicrystalline polymer.

In certain embodiments, the present invention encompasses the recognition that stretching a film comprising an amorphous APC can greatly improve the elongation properties of the film if a small amount of a crystalline or semicrystalline polymer is blended with the APC. While such improvements are known for films made predominately or entirely from semicrystalline or crystalline polymers, it is highly unexpected that the elongation properties of a film comprising predominately amorphous aliphatic polycarbonate should be improved by this method since completely amorphous polymers are known not to benefit from biaxial stretching and related methods.

In certain embodiments, the present invention provides compositions of matter comprising blends of APCs with semicrystalline polymers such as polyolefins, wherein the APC comprises at least 70, at least 80, at least 90 or at least 95 weight percent amorphous APC and less than 30, less than 20, less than 10 or less than 5 weight percent of semicrystalline polymer. In certain embodiments such compositions have EB measurements greater than 100%. In certain embodiments, the invention encompasses films made from such compositions. In certain embodiments, the invention encompasses packaging materials comprising such compositions.

In another aspect, the present invention encompasses methods of increasing the EB of an APC composition. In certain embodiments, such methods comprise the steps of providing an APC, blending the APC with 30 weight percent or less of a semicrystalline polymer, and stretching the blended polymer mixture.

In certain embodiments, blends of the present invention have unexpectedly increased $E_B$ values compared to the unblended APCs. Such increased $E_B$ values are particularly unexpected given the relatively small amount of other polymers in the blends of certain embodiments. In certain embodiments, APC blends of the present invention are characterized in that they possess an $E_B$ value at least 3 times greater than the corresponding unblended APC composition. In certain embodiments, an $E_B$ value of the blend is more than 5 times, more than 8 times or more than 10 times that of the unblended APC.

In certain embodiments, an $E_B$ value of a blend exceeds the weighted average of the $E_B$ values of the unblended polymer components by a factor of about two or more. For example, if a blend consists of 90% of an APC having an $E_B$ value of 20%, and 10% of an LDPE composition having an $E_B$ value of 200%, the weighted average of $E_B$ based on the 90:10 mixture is 38%, while a blend according to the above-described embodiment of the present invention will have an $E_B$ of at least about 76%. In certain embodiments, an $E_B$ value of the blend exceeds the weighted average of the $E_B$ values of the unblended polymer components by a factor of about three or more, about four or more, about five or more, or about ten or more. In certain embodiments, an $E_B$ value of a blend exceeds the $E_B$ values of either of the unblended polymer components.

In certain embodiments, APC blends of the present invention are characterized in that they have been subjected to a stretching process that increases the $E_B$ of the blend. In certain embodiments an $E_B$ value of a stretched blend is more than 2 times, more than 3 times, more than 5 times or more than 10 times that of the corresponding unstretched blend. In certain embodiments, an $E_B$ value of a stretched blend is more than 2 times, more than 3 times, more than 5 times or more than 10 times that of the corresponding pure APC when subjected to the same stretching.

In certain embodiments, an APC present in a blend of the present invention is one of those disclosed in Appendix 1, Appendix 2, or Appendix 3 provided herewith. It is to be understood that definitions in these appendices are to be read independently. For example, the definitions of R groups in one appendix may differ from correspondingly designated R groups in the other appendices or the body of the specification: in such instances, the definitions are to be regarded to be independent and specific to each appendix. As such, a limitation on an R-group in an appendix is not necessarily intended to limit any definition provided in the specification and vice-versa.

In some embodiments, the present invention provides mixtures of aliphatic polycarbonates with a second polymer characterized in that the barrier properties of the blend (e.g. oxygen barrier or water barrier) are significantly better than would be predicted based on a weighted average of the barrier properties of the individual components.

In certain embodiments, a polymer with low oxygen permeability and a structural polymer are combined in a polymer blend having lower oxygen permeability than the structural polymer and better structural properties than the barrier polymer. In certain embodiments, a barrier polymer is an aliphatic polycarbonate. A barrier polymer is more preferably an aliphatic polycarbonate derived from carbon dioxide and one or more epoxides. In some embodiments, a barrier polymer is poly(propylene carbonate). In some embodiments, a barrier polymer is poly(ethylene carbonate). In some embodiments, a barrier polymer is poly(ethylene-co-propylene carbonate). A structural polymer is preferably a polyolefin. In some embodiments, a structural polymer is a low-density polyethylene (LDPE). In some embodiments, a structural polymer is a linear low-density polyethylene (LLDPE). In some embodiments, a structural polymer is a high-density polyethylene (HDPE). In some embodiments, a structural polymer is a polypropylene (PP). In some embodiments, a polymer blend is a film for use in food packaging.

In certain embodiments, the present invention provides APC compositions having reduced brittleness. The flexibility of polymers is often assessed by measuring elongation-to-break ($E_B$). This is typically measured using ASTM D638 for bulk compositions or, ASTM D882 for films, and is reported as a percentage of the original sample length. In numerous literature reports, PPC shows EB values of less than 50% and often as low as only a few percent. Applicant has found that it is possible to make blends of APCs incorporating a relatively small amount of a semicrystalline polymer (for example a polyolefin such as LDPE), which have unexpectedly improved $E_B$ properties. In certain embodiments, the improvement in properties is observed after stretching a film made from the blend. In certain embodiments, the ratio of the EB of the blended stretched film to that of an analogous film made from the APC only is more than 3:1 and in some cases greater than 10:1.

It will be appreciated that where the present disclosure describes one characteristic of provided compositions, the disclosure encompasses compositions having such individual characteristics alone and in combination with one or more other characteristics as described herein.

I) Aliphatic Polycarbonates

In some embodiments, the present invention provides an extruded polymer blend comprising an aliphatic polycarbonate in combination with one or more polyolefin polymers. In certain embodiments, the aliphatic polycarbonate is derived from the copolymerization of carbon dioxide with one or more epoxides. In certain embodiments, the aliphatic polycarbonate is selected from the group consisting of poly(propylene carbonate) (PPC), poly(ethylene carbonate) PEC, poly(propylene carbonate)-co-poly(ethylene carbonate), and mixtures of any of these.

In certain embodiments, the aliphatic polycarbonate (APC) is present in amounts about equal to or less than the amount of polyolefin in the extruded polymer blend. In certain other embodiments, the extruded polymer blend contains more APC than polyolefin. In some embodiments, the blends comprise two or more polyolefin materials. In some embodiments, the blends further comprise additional components such as compatibilizers, processing additives, pigments, fillers, and the like.

In certain embodiments, APC blends of the present invention comprise one or more APCs having a primary repeat unit having a structure:

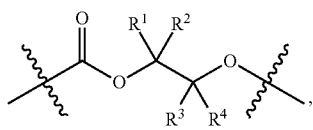

wherein R$^1$, R$^2$, R$^3$, and R$^4$ are, at each occurrence in the polymer chain, independently selected from the group consisting of —H, fluorine, an optionally substituted C$_{1-40}$ aliphatic group, an optionally substituted C$_{1-20}$ heteroaliphatic group, and an optionally substituted aryl group, where any two or more of R$^1$, R$^2$, R$^3$, and R$^4$ may optionally be taken together with intervening atoms to form one or more optionally substituted rings optionally containing one or more heteroatoms.

In certain embodiments, each

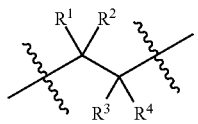

in the repeat units of APC polymers incorporated into the blends described herein is independently selected from the group consisting of:

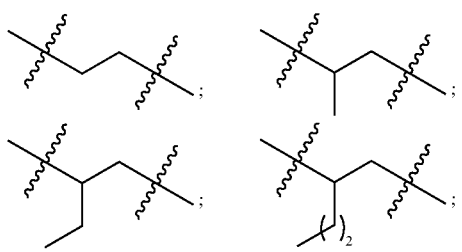

-continued

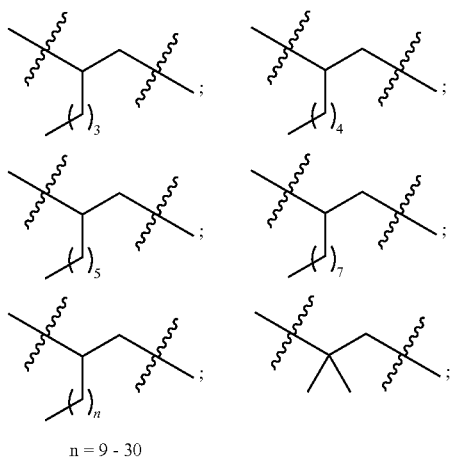

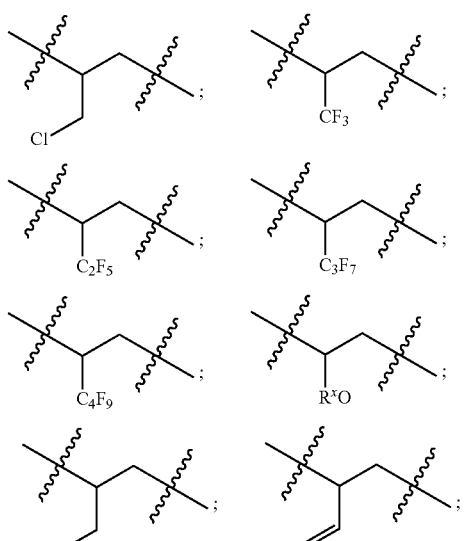

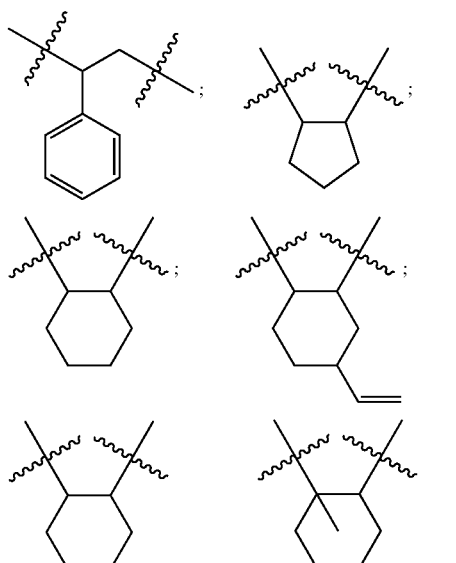

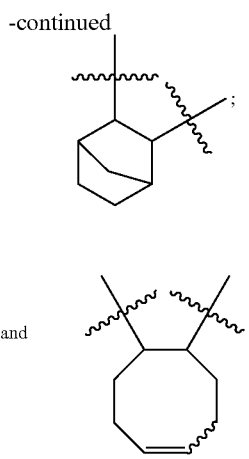

wherein each $R^x$ is independently an optionally substituted group selected from the group consisting of $C_{1-20}$ aliphatic, $C_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

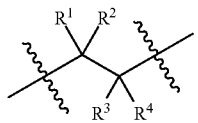

in the repeat units of the APC polymers incorporated into the blends described herein is independently selected from the group consisting of:

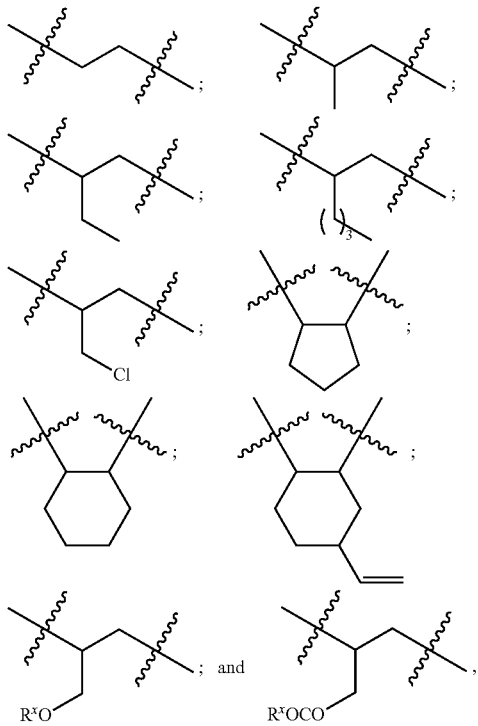

wherein $R^x$ is as defined above and described in classes and subclasses herein.

In certain embodiments, APCs present in blends described herein are selected from the group consisting of poly(propylene carbonate) (PPC), poly(ethylene carbonate) (PEC), poly(butylene carbonate) (PBC), poly(cyclohexene carbonate) (PCHC), poly(1,2 hexene carbonate) (PHC), copolymers of $CO_2$ and epichlorohydrin or glycidol ethers or esters, and mixtures or copolymers of any two or more of these. In certain embodiments, APCs present in blends described herein comprise PPC. In certain embodiments, APCs present in blends described herein comprise PEC.

In certain embodiments, APCs present in blends described herein comprise a copolymer of carbon dioxide and one or more epoxides. In certain embodiments, APCs comprise a copolymer of carbon dioxide and ethylene oxide. In certain embodiments, APCs comprise a copolymer of carbon dioxide and propylene oxide. In certain embodiments APCs comprise a copolymer of carbon dioxide and cyclohexene oxide. In certain embodiments, APCs comprise a copolymer of carbon dioxide and cyclopentene oxide. In certain embodiments, APCs comprise a copolymer of carbon dioxide and 3-vinyl cyclohexane oxide.

In some embodiments, APCs present in blends described herein comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, APCs present in blends described herein comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In certain embodiments, APCs present in blends of the present invention have a relatively high molecular weight, for example as expressed by their degree of polymerization (DP) which expresses the average number of repeating units per chain in the composition. Preferably, the degree of polymerization of an APC is sufficiently high that the chains have a high degree of entanglement. In certain embodiments, an APC is characterized in having a DP above about 100. In certain embodiments, an APC is characterized in having a DP above about 200. In certain embodiments, an APC is characterized in having a DP above about 500. In certain embodiments, an APC is characterized in having a DP above about 1,000. In certain embodiments, an APC is characterized in having a DP between about 500 and about 5,000. In certain embodiments, an APC is characterized in having a DP between about 1,000 and about 4,000. In certain embodiments, an APC is characterized in having a DP between about 1,000 and about 3,000. In certain embodiments, an APC is characterized in having a DP less than about 5,000.

In certain embodiments, where blends comprise PPC, PPC is characterized in that it has a number average molecular weight (Mn) above about 40,000 g/mol. In certain embodiments, PPC is characterized in that it has an Mn above about 80,000 g/mol. In certain embodiments, PPC is characterized in that it has an Mn between about 100,000 and about 500,000 g/mol. In certain embodiments, PPC is characterized in that it has an Mn between about 100,000 and about 300,000 g/mol. In certain embodiments, the PPC is characterized in that it has an Mn between about 150,000 and about 250,000 g/mol.

In certain embodiments, APCs present in blends of the present invention comprise substantially alternating polymer chains containing a high percentage of carbonate linkages and a low content of ether linkages. In certain embodiments, APCs present in blends of the present invention are characterized in that, on average in the composition, the percentage of carbonate linkages is 85%, 90%, 91%, 92%, 93%, 94%, 95%, 96%, 97%, 98%, 99%, 99.5% or greater. In certain embodiments, where blends comprise PPC, PPC is characterized in that it has greater than 99% carbonate linkages. In certain embodiments, PPC is characterized in that it has a low ether linkage content. In certain embodiments, PPC is characterized in that it has essentially no ether linkages, for example as determined by NMR spectroscopy.

Without being bound by theory, or thereby limiting the scope of the present invention, it is believed that in certain cases, prior art APC compositions that contain a significant proportion of ether linkages may have improved EB values relative to those of the perfectly alternating polymers. Nonetheless, it may be desirable to avoid the presence of such ether linkages since they may lower the glass transition temperature of the composition, lower its gas barrier properties, or have other undesired consequences. Therefore, in certain embodiments, the present invention provides methods to increase the EB values of APC compositions having low ether linkage content.

In certain embodiments, where blends comprise PEC, PEC is characterized in that it has greater than about 85% carbonate linkages. In certain embodiments, PEC is characterized in that it has greater than about 90%, greater than about 95% or greater than about 98% carbonate linkages. In certain embodiments, PEC is characterized in that is has a low ether linkage content. In certain embodiments, PEC is characterized in that it has essentially no ether linkages, for example as determined by NMR spectroscopy.

In certain embodiments, APCs used in the provided blends are characterized in that they have a narrow molecular weight distribution. This can be indicated by the polydispersity indices (PDI) of the aliphatic polycarbonate polymers. In certain embodiments, APCs in the inventive compositions have a PDI less than 2. In certain embodiments, APCs in the inventive compositions have a PDI less than 1.8. In certain embodiments, APCs in the inventive compositions have a PDI less than 1.5. In certain embodiments, APCs in the inventive compositions have a PDI less than 1.4. In certain embodiments, APCs in the inventive compositions have a PDI between about 1.0 and 1.2. In certain embodiments APCs in the inventive compositions have a PDI between about 1.0 and 1.1.

In certain embodiments where an APC used in a blend of the present invention is derived from mono-substituted epoxides (e.g. such as propylene oxide, 1,2-butylene oxide, epichlorohydrin, epoxidized alpha olefins, and the like), an aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the provided polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by $^1$H or $^{13}$C NMR spectroscopy.

In certain embodiments, APCs used in blends of the present invention are characterized in that they have low or zero content of cyclic carbonate. Cyclic carbonates are commonly formed as a byproduct during epoxide $CO_2$ copolymerization and have a formula:

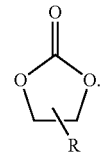

Higher cyclic oligomers containing two to five repeat units may also be formed, though generally to a lesser extent. Without being bound by theory, or thereby limiting the scope of the invention, it is believed that the presence of such cyclic byproducts may act as plasticizers and thereby lower the brittleness observed in certain prior art APC compositions. Among other things, the present invention aims to provide APC blends substantially free of such impurities since these small molecules may migrate from the polymer compositions leading to undesirable contamination, or to an increase in brittleness of an APC composition over time as the content of cyclic impurities decreases. Therefore, in certain embodiments, the present invention provides methods to increase the EB values of APC compositions having negligible cyclic carbonate content.

In certain embodiments, APCs present in provided blends have a cyclic carbonate content of less than about 5 weight percent. In certain embodiments, cyclic carbonate content is less than about 3, less than about 2, or less than about 1 weight percent. In certain embodiments, APCs present in provided blends are characterized in that they contain essentially no cyclic carbonate, for example as determined by inspection of the $^1$H NMR spectrum or the IR absorption spectrum of an APC composition.

In certain embodiments, APCs present in provided blends are characterized in that they are substantially amorphous. In certain embodiments, APCs are characterized in that, in their pure unblended state, they do not exhibit a melting point, for example as measured using digital scanning calorimetry (DSC).

a) Poly(Propylene Carbonate)

Poly(propylene carbonate) (PPC) is a polymer known since the late 1960's when it was first synthesized by Inoue and co-workers. Until recently, high molecular weight PPC has been predominantly synthesized using zinc carboxylate catalysts to copolymerize propylene oxide and $CO_2$. The resulting material was the focus of intense investigation and several companies have explored applications for the material as a commodity thermoplastic. To date, PPC has been commercialized only as a sacrificial polymer in applications where the clean thermal decomposition of PPC is advantageous. Commercialization of the material for thermoplastic applications has been complicated by poor thermal and processing properties. Recently, transition metal complexes have been developed for the copolymerization of $CO_2$ and epoxides, but prior to the present disclosure, such complexes have not been fully exploited and/or optimized in the preparation of improved PPC materials.

In some embodiments, the present invention provides a polymer blend comprising poly(propylene carbonate) (PPC) and one or more polyolefin polymers. In certain embodiments, provided polymer blends comprise one or more PPC compositions described in APPENDIX A.

In certain embodiments, polymer blends of the present invention comprise poly(propylene carbonate) having thermal stability above about 200° C. For example, FIG. 1 shows the mass over time of two samples of PPC held at 200° C. As can be seen, the prior art PPC 15, produced with zinc-based catalysts, loses mass at a higher rate than the structurally precise PPC 10. This behavior makes processing prior art PPC at typical polyolefin extrusion temperatures impossible. As will be seen from the examples hereinbelow, such coextrusions are unexpectedly successful using structurally precise PPC.

In certain embodiments, a polymer blend includes poly (propylene carbonate) with a PDI of less than about 1.7. In some embodiments, a polymer blend includes poly(propylene carbonate) with a PDI of between about 1.1 and about 1.5. In some embodiments, a polymer blend includes poly (propylene carbonate) with a PDI of between about 1.2 and about 1.4. In some embodiments, a polymer blend includes poly(propylene carbonate) with a PDI of less than about 1.2. In some embodiments, a polymer blend includes poly(propylene carbonate) with a PDI of about 1.1.

In certain embodiments, a polymer blend includes poly (propylene carbonate) with a head to tail ratio (H:T) greater than about 4:1. In certain embodiments, a polymer blend includes poly(propylene carbonate) with a head to tail ratio (H:T) greater than about 5:1. In certain embodiments, a polymer blend includes poly(propylene carbonate) with a head to tail ratio (H:T) greater than about 10:1. In certain embodiments, a polymer blend includes poly(propylene carbonate) with a head to tail ratio (H:T) greater than about 100:1.

In certain embodiments, a polymer blend includes poly (propylene carbonate) characterized in that, on average the percentage of carbonate linkages is 85% or greater. In certain embodiments, the poly(propylene carbonate) composition is characterized in that, on average in the composition, the percentage of carbonate linkages is 90% or greater. In certain embodiments, the poly(propylene carbonate) composition is characterized in that, on average in the composition, the percentage of carbonate linkages is 91% or greater. In certain embodiments, the poly(propylene carbonate) composition is characterized in that, on average in the composition, the percentage of carbonate linkages is 92% or greater. In certain embodiments, the poly(propylene carbonate) composition is characterized in that, on average in the composition, the percentage of carbonate linkages is 93% or greater. In certain embodiments, the poly(propylene carbonate) composition is characterized in that, on average in the composition, the percentage of carbonate linkages is 94% or greater. In certain embodiments, the poly(propylene carbonate) composition is characterized in that, on average in the composition, the percentage of carbonate linkages is 95% or greater. In certain embodiments, the poly(propylene carbonate) composition is characterized in that, on average in the composition, the percentage of carbonate linkages is 96% or greater. In certain embodiments, the poly(propylene carbonate) composition is characterized in that, on average in the composition, the percentage of carbonate linkages is 97% or greater. In certain embodiments, the poly(propylene carbonate) composition is characterized in that, on average in the composition, the percentage of carbonate linkages is 98% or greater. In certain embodiments, the poly(propylene carbonate) composition is characterized in that, on average in the composition, the percentage of carbonate linkages is 99% or greater. In certain embodiments, the poly(propylene carbonate) composition is characterized in that, on average in the composition, the percentage of carbonate linkages is 99.5% or greater. In certain embodiments, the poly(propylene carbonate) composition is characterized in that ether linkages are not detectable by $^1$H or $^{13}$C NMR.

In certain embodiments, a polymer blend includes poly (propylene carbonate) having a head-to-tail ratio of at least 4:1, a PDI less than 1.5, an ether content of less than 10%, and a $M_N$ between 75,000 g/mol and 350,000 g/mol. In certain embodiments, a polymer blend includes poly (propylene carbonate) having a head-to-tail ratio of at least 9:1, a PDI less than 1.5, an ether content of less than 10%, and a $M_N$ between 75,000 g/mol and 350,000 g/mol. In certain embodiments, a polymer blend includes poly(propylene carbonate) having a head-to-tail ratio of at least 6:1, a PDI less than 1.4, an ether content of less than 10%, and a $M_N$ between 75,000 g/mol and 350,000 g/mol.

In certain embodiments, a polymer blend includes poly (propylene carbonate) having a head-to-tail ratio of at least 4:1, a PDI less than 1.4, an ether content of less than 10%, and a $M_N$ between 75,000 g/mol and 350,000 g/mol. In certain embodiments, a polymer blend includes poly(propylene carbonate) having a head-to-tail ratio of at least 4:1, a PDI less than 1.5, an ether content of less than 5%, and a $M_N$ between 75,000 g/mol and 350,000 g/mol.

In certain embodiments, a polymer blend includes poly (propylene carbonate) having a head-to-tail ratio of at least 20:1, a PDI less than 1.3, an ether content of less than 2%, and a $M_N$ between 75,000 g/mol and 350,000 g/mol.

In certain embodiments, a provided polymer blend comprises poly(propylene carbonate) selected from the group consisting of:

i) Poly(propylene carbonate) having an average molecular weight number of between about 50,000 g/mol and about 500,000 g/mol, a polydispersity index less than about 1.5, at least 95% carbonate linkages, and less than 5% cyclic ether content;
ii) Poly(propylene carbonate) having an average molecular weight number of between about 75,000 g/mol and about 300,000 g/mol, a polydispersity index less than about 1.5, at least 95% carbonate linkages, and less than 5% cyclic ether content;
iii) Poly(propylene carbonate) having an average molecular weight number of between about 100,000 g/mol and about 250,000 g/mol, a polydispersity index less than about 1.5, at least 95% carbonate linkages, and less than 5% cyclic ether content;
iv) Poly(propylene carbonate) having an average molecular weight number of between about 150,000 g/mol and about 210,000 g/mol, a polydispersity index less than about 1.5, at least 95% carbonate linkages, and less than 5% cyclic ether content;
v) Poly(propylene carbonate) having an average molecular weight number of about 180,000 g/mol, a polydispersity index less than about 1.5, at least 95% carbonate linkages, and less than 5% cyclic ether content;
vi) Poly(propylene carbonate) having an average molecular weight number of between about 150,000 g/mol and about 400,000 g/mol, a polydispersity index less than about 1.2, at least 99% carbonate linkages, and less than 2% cyclic ether content;
vii) Poly(propylene carbonate) having an average molecular weight number of between about 150,000 g/mol and about 400,000 g/mol, a polydispersity index less than about 1.2, at least 99% carbonate linkages, less than 2% cyclic ether content, and a head-to-tail ratio of at least 85%;
viii) Poly(propylene carbonate) having an average molecular weight number of between about 150,000 g/mol and about 400,000 g/mol, a polydispersity index less than about 1.2, at least 99% carbonate linkages, less than 2% cyclic ether content, and a Tg greater than 35° C.;
ix) Poly(propylene carbonate) having an average molecular weight number of between about 150,000 g/mol and about 400,000 g/mol, a polydispersity index less than about 1.2, at least 99% carbonate linkages, less than 2% cyclic ether content, and a Tg greater than 37° C.; and
x) Poly(propylene carbonate) having an average molecular weight number of between about 150,000 g/mol and about 400,000 g/mol, a polydispersity index less than about 1.2, at least 99% carbonate linkages, less than 2% cyclic ether content, and a Tg greater than 40° C.

b) Poly(Ethylene Carbonate)

In certain embodiments, polymer blends of the present invention comprise PEC. In certain embodiments, polymer blends of the present invention comprise PEC having greater than about 85% or greater than about 90% carbonate linkages. In certain embodiments, blends comprise one or more of the PEC compositions described in APPENDIX B.

c) Other Aliphatic Polycarbonates

In certain embodiments, extruded polymer blends of the present invention comprise poly(propylene carbonate)-co-poly(ethylene carbonate). Such polymers encompass terpolymers derived from $CO_2$ with ethylene oxide and propylene oxide. In certain embodiments, poly(propylene carbonate)-co-poly(ethylene carbonate) is a random copolymer. In other embodiments, poly(propylene carbonate)-co-poly(ethylene carbonate) is a tapered copolymer. In some embodiments, poly(propylene carbonate)-co-poly(ethylene carbonate) is a block copolymer. In some embodiments, poly(propylene carbonate)-co-poly(ethylene carbonate) compositions contain ratios of EO to PO ranging from about 0.5% to about 99.5%. In some embodiments, poly(propylene carbonate)-co-poly(ethylene carbonate) compositions have characteristics similar to those described in APPENDICES A & B for the pure polycarbonates.

II) Non-APC Components of Blends

In addition to the aliphatic polycarbonates described above, compositions of the present invention comprise one or more additional polymers. In certain embodiments, additional polymers are characterized in that they are crystalline or semicrystalline.

In certain embodiments, a crystalline or semicrystalline polymer used in the blend is characterized in that it can be extruded at a temperature below about 250° C. In certain embodiments, a crystalline or semicrystalline polymer used in the blend is characterized in that it can be extruded at a temperature below about 220° C., about 200° C., or about 180° C.

In certain embodiments, a non-APC component of a blend of the present invention is a crystalline or semicrystalline polymer selected from the group consisting of: polyolefins, polyesters, polyethers, polycarbonates, and polyamides.

In certain embodiments, a crystalline or semicrystalline polymer in a blend of the present invention comprises a polyolefin. In some of these embodiments, a polyolefin is LDPE, LLDPE, HDPE, polypropylene, polystyrene, or blends of any of these with one another or with other non-APC polymers. In certain embodiments, a polyolefin is selected from the group consisting of polyethylene, polypropylene, copolymers of ethylene and/or propylene with higher olefins, and mixtures of any two or more of these. In certain embodiments, blends comprise polyethylene. In certain embodiments, blends comprise polypropylene. In certain embodiments, blends comprise low density polyethylene (LDPE). In certain embodiments, a polyolefin comprises linear low density polyethylene (LLDPE), high density polyethylene (HDPE)), polypropylene homopolymer, copolymers such as ethylene-propylene, ethylene-propylene-butene, and variants thereof. Functionalized ethylene polymers (for example, anhydride grafted polyethylene) as well as ethylene copolymers (for e.g.: ethylene acrylate copolymer) may also be used.

Without being bound by theory or thereby limiting the scope of the invention, it is believed that in some embodiments, LDPE performs well because it has branching which improves melt strength and stretchability of a film. In certain embodiments, this may be due to its high elongational viscosity related to the presence of long chain branches in its structure. Using this knowledge, certain embodiments of the present invention preferentially incorporate polyolefins having these properties.

In some embodiments, a non-APC polymer in a blend of the present invention is selected from the group consisting of: poly(lactic acid), thermoplastic starch, poly(3-hydroxybutyrate), poly(3-hydroxyvalerate), poly(3-hydroxybutyrate-co-3-hydroxyvalerate), poly(ethylene terephthalate) (PET), biodegradable polyesters like poly(butylene adipate), poly(butylene succinate), poly(butylene adipate-co-terephtalate), poly(butylene adipate-co-butylene succinate), poly(butylene adipate-co-terephtalate), other aliphatic and aromatic polyesters, poly(vinyl alcohol), poly(vinyl acetate), ethylene vinyl alcohol polymer (EVOH), poly(caprolactone), poly(ethylene glycol), polymethacrylates, polyesteramide, and any combination of the above with one another or another non-APC polymer.

In certain embodiments, a crystalline or semicrystalline polymer in a blend of the present invention comprises a polyester. In certain embodiments, a polyester is selected from the group consisting of polylactic acid (PLA), poly(3-hydroxy butyrate) PHB, poly(3-hydroxyvalerate), poly(butylene adipate-co-terephtalate), poly(3-hydroxybutyrate-co-3-hydroxyvalerate), polybutylene succinate (PBS), poly(3-hydroxy propionate), polypropiolactone and mixtures or copolymers of any of these.

In general for the polycarbonates described herein, blends may be prepared with other polymers including, but not limited to, elastomers, thermoplastics, or thermosets. Elastomers are generally polymers whose $T_g$ (glass transition temperature) and $T_m$ (melting point), if present, are below ambient temperature, usually considered to be about 20° C. Thermoplastics are those polymers whose $T_g$ and/or $T_m$ are at or above ambient temperature. Blends can be made by any of the common techniques known to the artisan, such as solution blending or melt blending, in a suitable apparatus, such as a single or twin-screw extruder.

Polycarbonate polymer blends may be made with almost any kind of elastomer, such as ethylene-propylene (EP), ethylene-propylene-diene (EPDM), styrene-butadiene (SBR), natural rubber, polyisoprene, polybutadiene, neoprene, butyl rubber, styrene-butadiene block copolymers, segmented polyester-polyether copolymers, elastomeric polyurethanes, chlorinated or chlorosulfonated polyethylene, (per)fluorinated elastomers such as copolymers of vinylidene fluoride, hexafluoropropylene, tetrafluoroethylene, copolymers of tetrafluoroethylene and perfluoro(methyl vinyl ether), and copolymers of tetrafluoroethylene and propylene.

Suitable thermoplastics useful for blending with the polycarbonates described herein include polyesters such as poly (lactic acid) (PLA), poly(3-hydroxybutyrate) (P3HB), poly (4-hydroxybutyrate) (P4HB), poly(hydroxy valerate) (PHV), poly(3-hydroxy propionate) (P3HP), polyhydroxyoctanoate (PHO), poly(ethylene terephthalate), poly (butylene terephthalate), and poly(ethylene adipate), other polycarbonates such as aromatic polycarbonates, and other aliphatic polycarbonates such as poly(ethylene carbonate), poly(butylene carbonate), poly(cyclohexane carbonate), poly(limonene carbonate) and terpolymers of $CO_2$ and any two or more epoxides; polyamides such as nylon-6, nylon-6,6, nylon-12, nylon-12,12, nylon-11, and a copolymer of hexamethylene diamine, adipic acid and terephthalic acid; fluorinated polymers such as copolymers of ethylene and vinylidene fluoride, copolymers of tetrafluoroethylene and hexafluoropropylene, copolymers of tetrafluoroethylene and a perfluoro(alkyl vinyl ether) such as perfluoro(propyl vinyl ether), and poly(vinyl fluoride); other halogenated polymers such a poly(vinyl chloride) and poly(vinylidene chloride) and its copolymers; polyolefins such as polyethylene, polypropylene, polyvinyl alcohol, and polystyrene, and copolymers thereof; (meth)acrylic polymers such a poly(methyl methacrylate) and copolymers thereof; copolymers of olefins such as ethylene with various (meth)acrylic monomers such as alkyl acrylates, (meth)acrylic acid and ionomers thereof, and glycidyl(meth)acrylate); aromatic polyesters such as the copolymer of Bisphenol A and terephthalic and/or isophthalic acid; and liquid crystalline polymers such as aromatic polyesters or aromatic poly(ester-amides). Other suitable blending polymers include polyethers such as poly-ethylene glycol, polypropylene glycol, polyether ether ketone, poly(tetramethylene ether)glycol, polyphenyl ether, and polyoxymethylene.

All of the extruded polymer blends disclosed herein may optionally be mixed with various additives normally added to elastomers and thermoplastics [see, for example Encyclopedia of Polymer Science and Engineering, 2nd Ed. vol. 14, p. 327-410]. For instance reinforcing, non-reinforcing and conductive fillers, such as carbon black, glass fiber, organic materials such as starch and wood flour, minerals such as clay, mica and talc, glass spheres, barium sulfate, zinc oxide, carbon fiber, and aramid fiber or fibrids, may be used. Antioxidants, antiozonants, pigments, dyes, delusterants, chain extenders to improve melt strength and build molecular weight during processing, and compounds to promote crosslinking may be added. Plasticizers such as various hydrocarbon oils or epoxidized vegetable oils may also be used. In some embodiments, the polycarbonates may contain nanoparticles or nanomaterials. Nanomaterials such as carbon nano-tubes, Fullerenes, graphene, buckyballs, quantum dots, colloidal metals such as silver and gold and platinum, iron or other metal nano particles or other non-carbon nanoparticles may also be incorporated into the polycarbonates.

a) Polyolefins

As discussed above, in some embodiments, extruded polymer blends of the present invention comprise one or more polyolefins. In certain embodiments, polyolefins are selected from the group consisting of: polyethylene, polypropylene, polystyrene, poly(alpha olefins), polyvinyl chloride, and mixtures or copolymers of any two or more of these. In some embodiments, a polyolefin is LDPE, LLDPE, HDPE, polypropylene, or any combination of the above.

In certain embodiments, the present invention encompasses extruded polymer blends comprising polyethylene. Many grades and qualities of polyethylene may be present, including, but not limited to: ultra high molecular weight polyethylene (UHMWPE); ultra low molecular weight polyethylene (ULMWPE or PE-WAX); high molecular weight polyethylene (HMWPE); high density polyethylene (HDPE); high density cross-linked polyethylene (HDX-LPE); cross-linked polyethylene (PEX or XLPE); medium density polyethylene (MDPE); linear low density polyethylene (LLDPE); low density polyethylene (LDPE); very low density polyethylene (VLDPE); and mixtures or combinations of two or more of these.

In certain embodiments, the present invention encompasses extruded polymer blends comprising polyolefins derived from copolymerization of ethylene and one or more comonomers. In certain embodiments, such copolymers comprise ethylene-propylene copolymers. In certain embodiments, such copolymers comprise ethylene-alpha olefin copolymers. In certain embodiments, such copolymers comprise ethylene vinyl acetate copolymers. In certain embodiments, such copolymers comprise ethylene acrylate copolymers.

In certain embodiments, the present invention encompasses extruded polymer blends comprising polypropylene. Many grades and qualities of polypropylene are available in the trade and known to those skilled in the art these may be used as-is or provided as blends of two or more grades for incorporation into the inventive extruded blends.

In certain embodiments, an extruded polymer blend contains less aliphatic polycarbonate (APC) than polyolefin. In certain embodiments, an APC is present in a range of about 1 mass percent to about 50 mass percent of the extruded polymer blend. In certain embodiments, an APC is present in a range of about 1 mass percent to about 10 mass percent of the extruded polymer blend. In certain embodiments, an APC is present in a range of about 5 mass percent to about 20 mass percent of the extruded polymer blend. In certain embodiments, an APC is present in a range of about 10 mass percent to about 30 mass percent of the extruded polymer blend. In certain embodiments, an APC is present in a range of about 25 mass percent to about 40 mass percent of the extruded polymer blend. In certain embodiments, an APC is present in a range of about 30 mass percent to about 50 mass percent of the extruded polymer blend. In certain embodiments, an APC present in an extruded blend comprises a single polymer, while in other embodiments, an APC present in an extruded blend comprises a mixture of two or more different polymers. When two or more different APCs are present in a blend, they may differ in the identity of their repeat units, or in other properties such as molecular weight, shape (e.g. straight or branched chains) etc.

In certain embodiments, an extruded polymer blend contains more APC than polyolefin. In certain embodiments, a polyolefin is present in a range of about 1 mass percent to about 50 mass percent of the extruded polymer blend. In certain embodiments, a polyolefin is present in a range of about 1 mass percent to about 10 mass percent of the extruded polymer blend. In certain embodiments, a polyolefin is present in a range of about 5 mass percent to about 20 mass percent of the extruded polymer blend. In certain embodiments, a polyolefin is present in a range of about 10 mass percent to about 30 mass percent of the extruded polymer blend. In certain embodiments, a polyolefin is present in a range of about 25 mass percent to about 40 mass percent of the extruded polymer blend. In certain embodiments, a polyolefin is present in a range of about 30 mass percent to about 50 mass percent of the extruded polymer blend. In any of the above described blends, a polyolefin present may be a single polyolefin composition, or a mixture of two or more different polyolefin compositions.

III. Film Compositions

The present invention provides, among other things, barrier films formed from an extruded blend of aliphatic polycarbonate and polyolefin. In certain embodiments, barrier films are oxygen barrier films formed from an extruded blend of aliphatic polycarbonate and polyolefin. In some embodiments, an aliphatic polycarbonate acts as a barrier polymer with low oxygen permeability and the polyolefin acts as a structural polymer. In certain embodiments, barrier films are characterized in that they have a lower oxygen permeability than the structural polymer and better structural properties than the barrier polymer. In some embodiments, a barrier polymer is poly(propylene carbonate) (PPC). In some embodiments, a barrier polymer is poly(ethylene carbonate) (PEC). In some embodiments, a structural polymer is a low-density polyethylene (LDPE). In some embodiments, a structural polymer is a linear low-density polyethylene (LLDPE). In some embodiments, a structural polymer is a high-density polyethylene (HDPE). In some embodiments, a structural polymer is a polypropylene (PP). In some embodiments, a polymer blend is a film for use in food packaging. In embodiments where an oxygen barrier is improved significantly over that of the polyolefin alone by combining with an aliphatic polycarbonate (like PEC, for example), a single mono-layer high oxygen barrier film with low sensitivity to moisture can be developed.

In some embodiments, the present invention provides polymer films comprising an aliphatic polycarbonate and at least one other polymer. In some embodiments, a film comprises at least 70 weight percent aliphatic polycarbonate and up to about 30% of a crystalline or semicrystalline polymer. In some embodiments, a provided film is a barrier film. In some embodiments, a provided film is characterized in that it has low oxygen permeability.

In certain embodiments, the present invention comprises a package or packaging material comprising a film as described above or in classes and subclasses herein. In certain embodiments, such packaging materials comprise a monolayer film. In certain embodiments, such packaging materials comprise a multilayer film. In certain embodiments, a film comprises a food packaging material. In certain embodiments, a packaging material is made via thermoforming a film of suitable thickness.

The following subcategories of compositions are mentioned to describe certain embodiments and characteristics of some aspects of the present invention. It will be understood that following subcategories are not exclusive to one another (i.e., the description of a particular composition in one category is not meant to imply that the composition does not have a characteristic described in another category).

a) Poly(Propylene Carbonate) Blends

In certain embodiments, the present invention encompasses polymer blend barrier films comprising polypropylene carbonate. In certain embodiments, provided barrier films comprise one or more PPC compositions described in APPENDIX A.

In certain embodiments, a polymer blend barrier films include poly(propylene carbonate) with a PDI of less than about 1.7. In some embodiments, a polymer blend barrier films include poly(propylene carbonate) with a PDI of between about 1.1 and about 1.5. In some embodiments, a polymer blend barrier films include poly(propylene carbonate) with a PDI of between about 1.2 and about 1.4. In some embodiments, a polymer blend barrier films include poly(propylene carbonate) with a PDI of less than about 1.2. In some embodiments, a polymer blend barrier films include poly(propylene carbonate) with a PDI of about 1.1.

In certain embodiments, a polymer blend barrier films include poly(propylene carbonate) with a head to tail ratio (H:T) greater than about 4:1. In certain embodiments, polymer blend barrier films include poly(propylene carbonate) with a head to tail ratio (H:T) greater than about 5:1. In certain embodiments, polymer blend barrier films include poly(propylene carbonate) with a head to tail ratio (H:T) greater than about 10:1. In certain embodiments, polymer blend barrier films include poly(propylene carbonate) with a head to tail ratio (H:T) greater than about 100:1.

In certain embodiments, polymer blend barrier films include poly(propylene carbonate) characterized in that, on average the percentage of carbonate linkages is 85% or greater. In certain embodiments, a poly(propylene carbonate) blend is characterized in that, on average in the composition, the percentage of carbonate linkages is 90% or greater. In certain embodiments, a poly(propylene carbonate) blend is characterized in that, on average in the composition, the percentage of carbonate linkages is 91% or greater. In certain embodiments, a poly(propylene carbonate) blend is characterized in that, on average in the composition, the percentage of carbonate linkages is 92% or greater. In certain embodiments, a poly(propylene carbonate) blend is characterized in that, on average in the composition, the percentage of carbonate linkages is 93% or greater. In certain embodiments, a poly(propylene carbonate) blend is characterized in that, on average in the composition, the percentage of carbonate linkages is 94% or greater. In certain embodiments, a poly(propylene carbonate) blend is characterized in that, on average in the composition, the percentage of carbonate linkages is 95% or greater. In certain embodiments, a poly(propylene carbonate) blend is characterized in that, on average in the composition, the percentage of carbonate linkages is 96% or greater. In certain embodiments, a poly(propylene carbonate) blend is characterized in that, on average in the composition, the percentage of carbonate linkages is 97% or greater. In certain embodiments, a poly(propylene carbonate) blend is characterized in that, on average in the composition, the percentage of carbonate linkages is 98% or greater. In certain embodiments, a poly(propylene carbonate) blend is characterized in that, on average in the composition, the percentage of carbonate linkages is 99% or greater. In certain embodiments, a poly(propylene carbonate) blend is characterized in that, on average in the composition, the percentage of carbonate linkages is 99.5% or greater. In certain embodiments, a poly(propylene carbonate) blend is characterized in that ether linkages are not detectable by $^1$H or $^{13}$C NMR.

In certain embodiments, polymer blend barrier films include poly(propylene carbonate) having a head-to-tail ratio of at least 4:1, a PDI less than 1.5, an ether content of less than 10%, and a $M_N$ between 75,000 g/mol and 500,000 g/mol.

In certain embodiments, polymer blend barrier films include poly(propylene carbonate) having a head-to-tail ratio of at least 9:1, a PDI less than 1.5, an ether content of less than 10%, and a $M_N$ between 75,000 g/mol and 350,000 g/mol.

In certain embodiments, polymer blend includes poly(propylene carbonate) having a head-to-tail ratio of at least 6:1, a PDI less than 1.4, an ether content of less than 10%, and a $M_N$ between 75,000 g/mol and 350,000 g/mol.

In certain embodiments, polymer blend barrier films include poly(propylene carbonate) having a head-to-tail ratio of at least 4:1, a PDI less than 1.4, an ether content of less than 10%, and a $M_N$ between 75,000 g/mol and 350,000 g/mol.

In certain embodiments, the polymer blend barrier films include poly(propylene carbonate) having a head-to-tail ratio of at least 4:1, a PDI less than 1.5, an ether content of less than 5%, and a $M_N$ between 75,000 g/mol and 350,000 g/mol.

In certain embodiments, polymer blend barrier films include poly(propylene carbonate) having a head-to-tail ratio of at least 20:1, a PDI less than 1.3, an ether content of less than 2%, and a $M_N$ between 75,000 g/mol and 350,000 g/mol.

b) Poly(Ethylene Carbonate) Blends

In certain embodiments, polymer blend barrier films of the present invention comprise PEC. In certain embodiments, polymer blend barrier films of the present invention comprise PEC having greater than about 90% carbonate linkages. In certain embodiments, the polymer blend barrier films comprise one or more of the PEC compositions described in APPENDIX B.

c) Other Blends with Aliphatic Polycarbonates

In certain embodiments, polymer blend barrier films of the present invention comprise poly(propylene carbonate)-co-poly(ethylene carbonate). Such polymers encompass terpolymers derived from $CO_2$ with ethylene oxide and propylene oxide. In certain embodiments, a poly(propylene carbonate)-co-poly(ethylene carbonate) is a random copolymer. In some embodiments, a poly(propylene carbonate)-co-poly(ethylene carbonate) is a tapered copolymer. In some embodiments, a poly(propylene carbonate)-co-poly(ethylene carbonate) is a block copolymer, poly(propylene carbonate)-co-poly(ethylene carbonate) compositions may contain ratios of EO to PO ranging from about 0.5% to about 99.5%. In some embodiments, poly(propylene carbonate)-co-poly(ethylene carbonate) compositions have characteristics similar to those described in APPENDICES A & B for the pure polycarbonates.

In some embodiments, polycarbonate contributes at least about 5% by weight of the total weight of the polymer blend barrier films. In some of these embodiments, a polyolefin comprises at least about 5% by weight of the total weight of the polymer blend barrier films. In some of these embodiments, a polymer blend film is extruded from a single polymer blend. In some of these embodiments, a polymer blend film has a thickness of about 100 mils or less.

In some embodiments, a polymer blend film includes more than one polycarbonate. In some embodiments, a polymer blend film includes poly(ethylene carbonate) and poly(propylene carbonate). In some embodiments, polycarbonates have different molecular weights. In some embodiments, polycarbonates have different chemical structures. In some embodiments, polycarbonates have different molecular weights and different chemical structures.

In some embodiments, a polymer blend film includes more than one non-polycarbonate polymer. In some embodiments, a polymer blend film includes more than one polycarbonate and more than one non-polycarbonate polymer. In some embodiments, a polymer blend film includes more than one polycarbonate and more than one polyolefin. In some embodiments, the polymer blend film includes more than one polycarbonate and more than one polyester.

d) Polymer Blend Films with Low Oxygen Permeability

In some embodiments, the present invention encompasses barrier films comprising an aliphatic polycarbonate and at least one other polymer. In some embodiments, polyolefins are not a required component of such blends.

In certain embodiments, the present invention encompasses barrier films comprising at least one polycarbonate having a first oxygen permeability and a second polymer having a second oxygen permeability higher than the first oxygen permeability. The polymer blend film has a third oxygen permeability less than an oxygen permeability value calculated from a volume additive model using a value of the first oxygen permeability and a value of the second oxygen permeability. In some embodiments, the third oxygen permeability is less than an oxygen permeability value calculated from a Maxwell model using the value of the first oxygen permeability and using the value of the second oxygen permeability.

In certain embodiments, the present invention provides polymer blend films comprising aliphatic polycarbonate and at least one other polymer wherein the oxygen permeability of the film is less than two thirds of the oxygen permeability value calculated from a volume additive model using the oxygen permeability of the aliphatic polycarbonate and the value of the oxygen permeability of the other polymer(s). In certain embodiments, oxygen permeability of the film is less than one half of value expected from a volume additive model. In certain embodiments, oxygen permeability of the film is less than one third of value expected from a volume additive model. In certain embodiments, oxygen permeability of the film is less than one fourth of value expected from a volume additive model. In certain embodiments, oxygen permeability of the film is less than one fifth of value expected from a volume additive model. In certain embodiments, oxygen permeability of the film is less than one eighth of value expected from a volume additive model. In certain embodiments, oxygen permeability of the film is less than one tenth of value expected from a volume additive model.

In certain embodiments, the present invention provides polymer blend films comprising aliphatic polycarbonate and at least one other polymer wherein the oxygen permeability of the film is less than two thirds of the oxygen permeability value calculated from a Maxwell model using the oxygen permeability of the aliphatic polycarbonate and the value of the oxygen permeability of the other polymer(s). In certain embodiments, oxygen permeability of the film is less than one half of value expected from a Maxwell model. In certain embodiments, oxygen permeability of the film is less than one third of value expected from a Maxwell model. In certain embodiments, oxygen permeability of the film is less than one fourth of value expected from a Maxwell model. In certain embodiments, oxygen permeability of the film is less than one fifth of value expected from a Maxwell model. In certain embodiments, oxygen permeability of the film is less than one eighth of value expected from a Maxwell model. In certain embodiments, oxygen permeability of the film is less than one tenth of value expected from a Maxwell model.

In some embodiments, an aliphatic polycarbonate and the other polymer(s) are combined by extrusion to directly form a polymer blend. In some embodiments, an aliphatic polycarbonate and the other polymer(s) are combined by extrusion to form a polymer blend, which is then processed in a second step to form the polymer blend film.

In some of these embodiments, the other polymer is LDPE, LLDPE, HDPE, polypropylene, polystyrene, polyvinyl chloride, poly(lactic acid), thermoplastic starch, poly(3-hydroxylbutyrate), poly(3-hydroxyvalerate), poly(3-hydroxylbutyrate-co-3-hydroxyvalerate), poly(ethylene terephthalate) (PET), biodegradable polyesters like poly(butylene adipate), poly(butylene succinate), poly(butylene adipate-co-terephtalate), poly(butylene adipate-co-butylene succinate), other aliphatic and aromatic polyesters, poly(vinyl alcohol), poly(vinyl acetate), ethylene vinyl alcohol polymer (EVOH), poly(caprolactone), poly(ethylene glycol) dimethacrylates, polyesteramide, or any combination of the above.

In certain embodiments, the present invention encompasses barrier films comprising an aliphatic polycarbonate and a polyester. In certain embodiments, the present invention encompasses barrier films comprising an aliphatic polycarbonate and a biopolyester. In certain embodiments, the present invention encompasses barrier films comprising an aliphatic polycarbonate and polylactic acid. In certain embodiments, the present invention encompasses barrier films comprising an aliphatic polycarbonate and polyhydroxy butyrate. In some embodiments, a polycarbonate is poly(ethylene carbonate), poly(propylene carbonate), a poly(ethylene-propylene carbonate) terpolymer, or any combination of these.

Although observed in a case above with a PPC having a molecular weight of about 180,000, depending on the local stress or shear rate level, the interfacial tension, the composition, the flow fields in the extruder, and the relative viscosity and melt elasticity of the two mixing polymer melts, it is expected that an oxygen permeability level of a polymer blend film below an oxygen permeability level calculated using a volume additivity model can be achieved with aliphatic polycarbonates and other polymers over a range of molecular weights for an aliphatic polycarbonate. In some embodiments, it is expected that an oxygen permeability level of the polymer blend film below an oxygen permeability level calculated using a Maxwell model can be achieved over a range of molecular weights for an aliphatic polycarbonate. In some embodiments, an aliphatic polycarbonate has a molecular weight of at least about 40,000. In some embodiments, an aliphatic polycarbonate has a molecular weight of about 300,000 or less. In some embodiments, an aliphatic polycarbonate has a molecular weight in the range of about 40,000 to about 300,000.

Although observed in cases above with a 50/50 wt % polymer blend of PPC and polyolefin, depending on the local stress or shear rate level, the interfacial tension, the composition, the flow fields in the extruder, and the relative viscosity and melt elasticity of the two mixing polymer melts, it is expected that an oxygen permeability level of the polymer blend film below an oxygen permeability level calculated using a volume additivity model can be achieved with polycarbonate and polyolefin over a range of blend compositions. In some embodiments, it is expected that an oxygen permeability level of a polymer blend film below an oxygen permeability level calculated using a Maxwell model can be achieved.

In some embodiments, a polycarbonate makes up at least about 5% by weight of the total weight of the polymer blend barrier films. In some embodiments, a polycarbonate makes up at least about 10% by weight of the total weight of the polymer blend barrier films. In some embodiments, the amount of polycarbonate is in the range from about 10 wt % to about 90 wt % of the total blend. In some embodiments, a polycarbonate is in the range from about 20 wt % to about 80 wt % of the total blend. In some embodiments, a polycarbonate is in the range from about 20 wt % to about 50 wt % of the total blend. In some embodiments, a polycarbonate is in the range from about 40 wt % to about 60 wt % of the total blend. In some embodiments, the other polymer or polymers make up at least about 10% by weight of the total weight of the polymer blend barrier films. In some embodiments, the other polymer(s) is/are in the range from about 20 wt % to about 50 wt % of the total blend.

e) Polymer Blend Films Comprising a Crystalline or Semicrystalline Polymer

In certain embodiments, the present invention encompasses a polymer film comprising at least 70 weight percent aliphatic polycarbonate, and up to about 30% of a crystalline or semicrystalline polymer, characterized in that the film has elongation before break value as measured with ASTM method D882 of at least 100%. In certain embodiments, such films comprise any one or more of the APC compositions described hereinabove and in the appendices hereto. In certain embodiments, such films are further characterized in that the APC in the blend is substantially free of ether linkages. In certain embodiments, such films are further characterized in that they are substantially free of cyclic carbonates.

In certain embodiments, the present invention encompasses a polymer film comprising at least 70 weight percent of one or more of poly(propylene carbonate) and poly(ethylene carbonate). In certain embodiments, the present invention encompasses a polymer film comprising at least 70 weight percent poly(propylene carbonate). In certain embodiments, the present invention encompasses a polymer film comprising at least 75, at least 80, at least 90 or at least 95 weight percent weight percent poly(propylene carbonate). In certain embodiments, such films are further characterized in that the poly(propylene carbonate) in the blend is substantially free of ether linkages. In certain embodiments, such films are further characterized in that they are substantially free of propylene carbonate.

In certain embodiments, the present invention encompasses a polymer film comprising at least 70 weight percent poly(ethylene carbonate). In certain embodiments, the present invention encompasses a polymer film comprising at least 75, at least 80, at least 90 or at least 95 weight percent poly(ethylene carbonate).

In certain embodiments, the present invention encompasses a polymer film comprising at least 70 weight percent of one or more APCs in combination and from about 0.5 to about 30 weight percent of one or more polyolefin polymers. In certain embodiments, such films comprise from about 1 to about 25 weight percent of one or more polyolefin polymers. In certain embodiments, such films comprise from about 1 to about 10 weight percent of one or more polyolefin polymers. In certain embodiments, such films comprise from about 2 to about 5 weight percent of one or more polyolefin polymers. In certain embodiments, such films comprise about 5 weight percent of one or more polyolefin polymers. In certain embodiments, a polyolefin polymer comprises one or more of: polyethylene, polypropylene, and polyethylene-co-propylene. In certain embodiments, a plastic film comprises about 5 weight percent polyethylene. In certain embodiments, a plastic film comprises about 5 weight LDPE. In certain embodiments, such films further comprise compatibilizers or other additives typically included in polymer films and known in the art.

In certain embodiments, plastic films of the present invention are oriented films. In certain embodiments, plastic films of the present invention have been subjected to a stretching step. In certain embodiments, plastic films of the present invention have been biaxially stretched. In certain embodiments, plastic films of the present invention have been made by a blown film process.

In certain embodiments, the elongation before break value as measured with ASTM D882 of the film prior to stretching is less than 50%. In certain embodiments the present invention encompasses a plastic film comprising at least 70 weight percent aliphatic polycarbonate characterized in that the film has been stretched and that the elongation before break value as measured using ASTM D882, prior to stretching is less than 50% and that the elongation before break value as measured using ASTM D882 after stretching is greater than 100%.

f) Polymer Blends with Co-Continuous Laminar Morphologies

Figure 2:
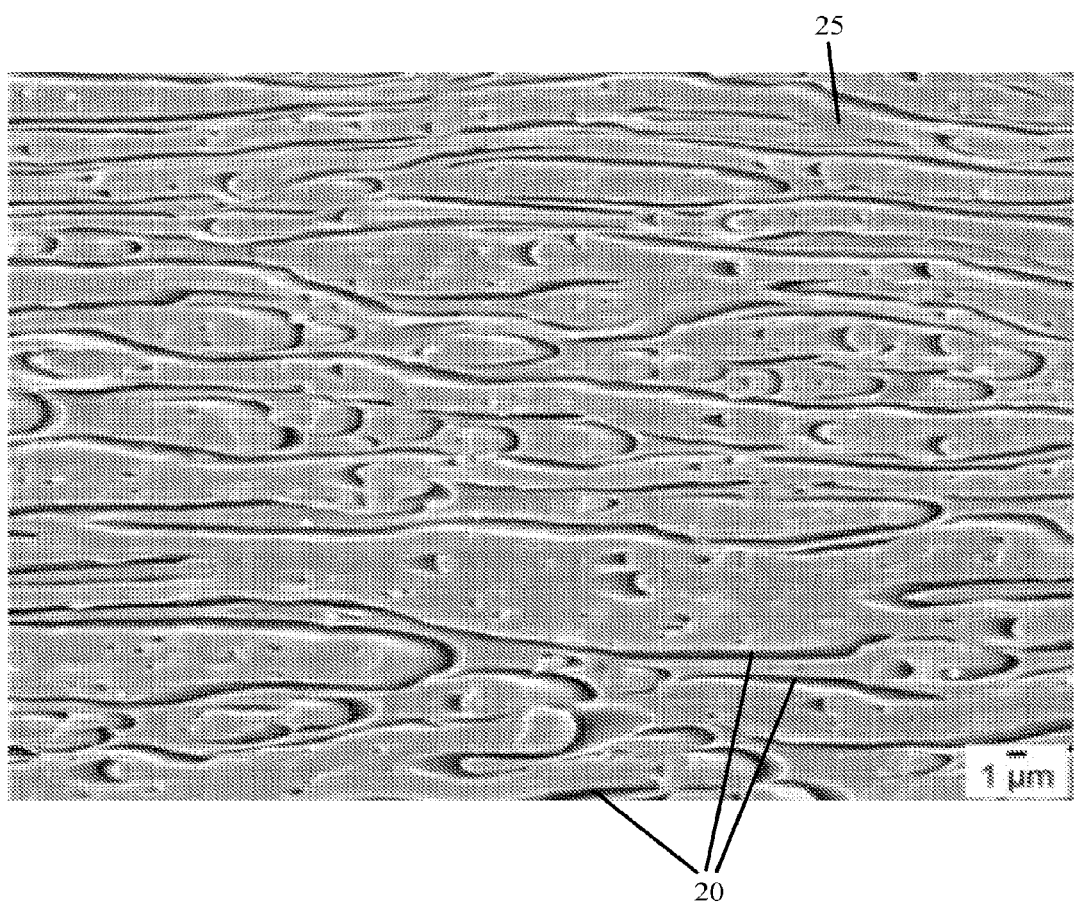
FIG. 2 shows an SEM micrograph of a polymer blend of PPC and LLDPE.
Figure 3:
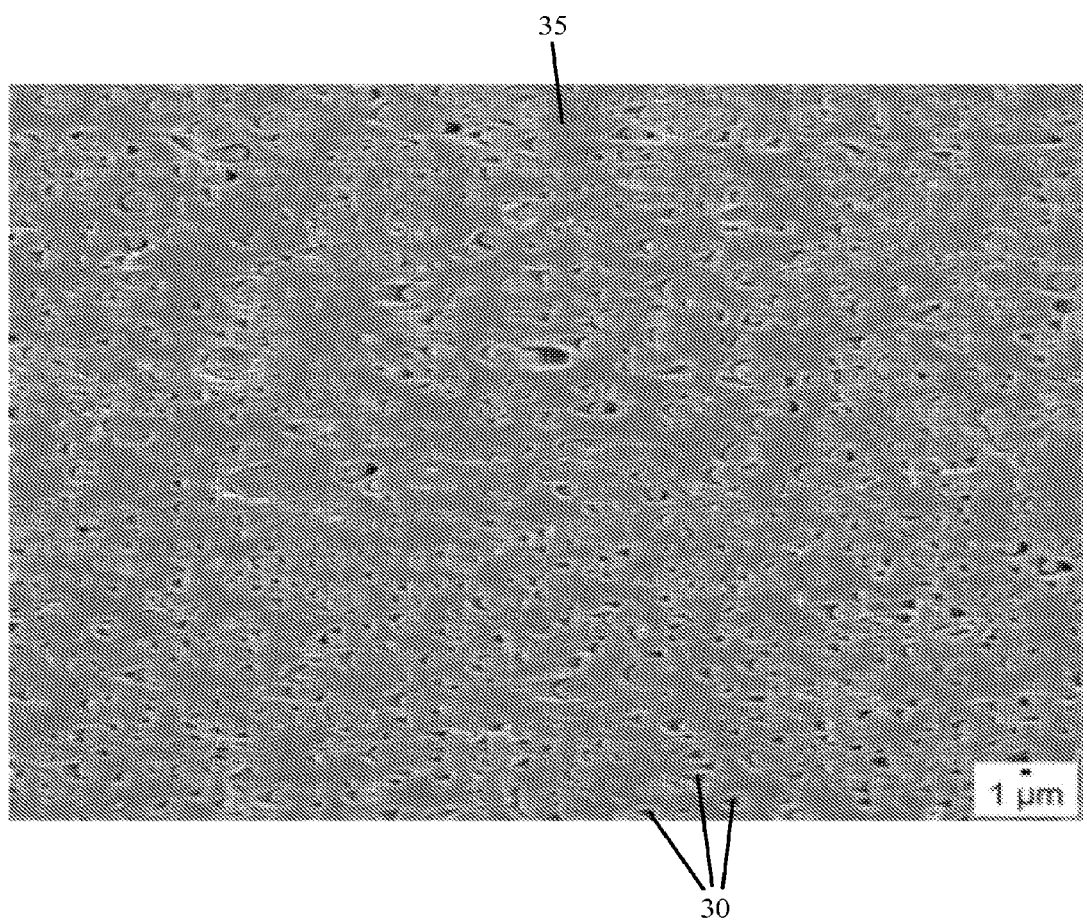
FIG. 3 shows an SEM micrograph of a polymer blend of PPC and HDPE.

In some embodiments, the present invention provides polymer blends having specific morphologies. In some embodiments, the present invention encompasses polymer blends comprising aliphatic polycarbonates and at least one other polymer characterized in that the blends exhibit co-continuous laminar morphology. In certain embodiments, such morphology can be ascertained by evaluating micrographs of samples prepared from the polymer blends. An example of a scanning electron micrograph (SEM) of a polymer blend comprising PPC and polyethylene and exhibiting a co-continuous laminar morphology is shown in FIG. 2. FIG. 3 shows the SEM of a similar blend which does not have a co-continuous laminar morphology.

In certain embodiments, the present invention encompasses polymer films including at least one aliphatic polycarbonate and at least one non aliphatic polycarbonate polymer characterized in that the film exhibits a co-continuous laminar morphology. In some embodiments, polymer films having a co-continuous laminar morphology include at least one aliphatic polycarbonate and at least one polyolefin. In some embodiments, polymer films having a co-continuous laminar morphology include at least one aliphatic poly-carbonate and polyethylene. In some embodiments, polymer films having a co-continuous laminar morphology include at least one aliphatic polycarbonate and at least one polypropylene. In some embodiments, polymer films having a co-continuous laminar morphology include at least one aliphatic polycarbonate and at least one polyester. In some embodiments, polymer films having a co-continuous laminar morphology include at least one aliphatic polycarbonate and PLA. In some embodiments, polymer films having a co-continuous laminar morphology include at least one aliphatic polycarbonate and PHB. In some embodiments, polymer films having a co-continuous laminar morphology further include at least one compatibilizer.

In some embodiments, a polycarbonate and the other polymer are combined by extrusion to form a polymer blend film directly. In some embodiments, a polycarbonate and the other polymer are combined by extrusion to form a polymer blend, which is then extruded to form the polymer blend film.

In some embodiments, the other polymer in the blend having a co-continuous laminar morphology is selected from the group consisting of LDPE, LLDPE, HDPE, polypropylene, polystyrene, poly(lactic acid), thermoplastic starch, poly(3-hydroxylbutyrate), poly(3-hydroxyvalerate), poly(3-hydroxylbutyrate-co-3-hydroxyvalerate), poly(ethylene terephthalate) (PET), biodegradable polyesters like poly(butylene adipate), poly(butylenes succinate), poly(butylene adipate-co-butylene succinate), poly(butylene adipate-co-terephtalate), other aliphatic and aromatic polyesters, poly(vinyl alcohol), poly(vinyl acetate), ethylene vinyl alcohol polymer (EVOH), poly(caprolactone), poly(ethylene glycol) dimethacrylates, polyesteramide, or any combination of the above.

i) Poly(Propylene Carbonate)

In certain embodiments, the present invention encompasses polymer blend having a co-continuous laminar morphology comprising polypropylene carbonate. In certain embodiments, provided blends having a co-continuous laminar morphology comprise one or more PPC compositions described in APPENDIX A.

In certain embodiments, polymer blends having a co-continuous laminar morphology include poly(propylene carbonate) with a PDI of less than about 1.7. In some embodiments, polymer blends having a co-continuous laminar morphology include poly(propylene carbonate) with a PDI of between about 1.1 and about 1.5. In some embodiments, polymer blends having a co-continuous laminar morphology include poly(propylene carbonate) with a PDI of between about 1.2 and about 1.4. In some embodiments, polymer blends having a co-continuous laminar morphology include poly(propylene carbonate) with a PDI of less than about 1.2. In some embodiments, polymer blends having a co-continuous laminar morphology include poly(propylene carbonate) with a PDI of about 1.1.

In certain embodiments, polymer blends having a co-continuous laminar morphology include poly(propylene carbonate) with a head to tail ratio (H:T) greater than about 4:1. In certain embodiments, polymer blends having a co-continuous laminar morphology include poly(propylene carbonate) with a head to tail ratio (H:T) greater than about 5:1. In certain embodiments, polymer blends having a co-continuous laminar morphology include poly(propylene carbonate) with a head to tail ratio (H:T) greater than about 10:1. In certain embodiments, polymer blends having a co-continuous laminar morphology include poly(propylene carbonate) with a head to tail ratio (H:T) greater than about 100:1.

In certain embodiments, polymer blends having a co-continuous laminar morphology include poly(propylene carbonate) characterized in that, on average the percentage of carbonate linkages is 85% or greater. In certain embodiments, a poly(propylene carbonate) composition is characterized in that, on average in the composition, the percentage of carbonate linkages is 90% or greater. In certain embodiments, a poly(propylene carbonate) composition is characterized in that, on average in the composition, the percentage of carbonate linkages is 91% or greater. In certain embodiments, a poly(propylene carbonate) composition is characterized in that, on average in the composition, the percentage of carbonate linkages is 92% or greater. In certain embodiments, a poly(propylene carbonate) composition is characterized in that, on average in the composition, the percentage of carbonate linkages is 93% or greater. In certain embodiments, a poly(propylene carbonate) composition is characterized in that, on average in the composition, the percentage of carbonate linkages is 94% or greater. In certain embodiments, a poly(propylene carbonate) composition is characterized in that, on average in the composition, the percentage of carbonate linkages is 95% or greater. In certain embodiments, a poly(propylene carbonate) composition is characterized in that, on average in the composition, the percentage of carbonate linkages is 96% or greater. In certain embodiments, a poly(propylene carbonate) composition is characterized in that, on average in the composition, the percentage of carbonate linkages is 97% or greater. In certain embodiments, a poly(propylene carbonate) composition is characterized in that, on average in the composition, the percentage of carbonate linkages is 98% or greater. In certain embodiments, a poly(propylene carbonate) composition is characterized in that, on average in the composition, the percentage of carbonate linkages is 99% or greater. In certain embodiments, a poly(propylene carbonate) composition is characterized in that, on average in the composition, the percentage of carbonate linkages is 99.5% or greater. In certain embodiments, a poly(propylene carbonate) composition is characterized in that ether linkages are not detectable by $^1$H or $^{13}$C NMR.

In certain embodiments, polymer blends having a co-continuous laminar morphology include poly(propylene carbonate) having a head-to-tail ratio of at least 4:1, a PDI less than 1.5, an ether content of less than 10%, and a $M_N$ between 75,000 g/mol and 350,000 g/mol.

In certain embodiments, polymer blends having a co-continuous laminar morphology include poly(propylene carbonate) having a head-to-tail ratio of at least 9:1, a PDI less than 1.5, an ether content of less than 10%, and a $M_N$ between 75,000 g/mol and 350,000 g/mol. In certain embodiments, polymer blend having a co-continuous laminar morphology includes poly(propylene carbonate) having a head-to-tail ratio of at least 6:1, a PDI less than 1.4, an ether content of less than 10%, and a $M_N$ between 75,000 g/mol and 350,000 g/mol.

In certain embodiments, polymer blends having a co-continuous laminar morphology include poly(propylene carbonate) having a head-to-tail ratio of at least 4:1, a PDI less than 1.4, an ether content of less than 10%, and a $M_N$ between 75,000 g/mol and 350,000 g/mol. In certain embodiments, the polymer blends having a co-continuous laminar morphology include poly(propylene carbonate) having a head-to-tail ratio of at least 4:1, a PDI less than 1.5, an ether content of less than 5%, and a $M_N$ between 75,000 g/mol and 350,000 g/mol.

In certain embodiments, polymer blends having a co-continuous laminar morphology include poly(propylene carbonate) having a head-to-tail ratio of at least 20:1, a PDI less than 1.3, an ether content of less than 2%, and a $M_N$ between 75,000 g/mol and 350,000 g/mol.

ii) Poly(Ethylene Carbonate)

In certain embodiments, polymer blends having a co-continuous laminar morphology of the present invention comprise PEC. In certain embodiments, polymer blends having a co-continuous laminar morphology comprise PEC having greater than about 90% carbonate linkages. In certain embodiments, polymer blends having a co-continuous laminar morphology comprise one or more of the PEC compositions described in APPENDIX B.

iii) Other Aliphatic Polycarbonates

In certain embodiments, polymer blends having a co-continuous laminar morphology comprise poly(propylene carbonate)-co-poly(ethylene carbonate). Such polymers encompass terpolymers derived from $CO_2$ with ethylene oxide and propylene oxide. In certain embodiments, a poly(propylene carbonate)-co-poly(ethylene carbonate) is a random copolymer. In some embodiments, a poly(propylene carbonate)-co-poly(ethylene carbonate) is a tapered copolymer. In some embodiments, a poly(propylene carbonate)-co-poly(ethylene carbonate) is a block copolymer. Poly(propylene carbonate)-co-poly(ethylene carbonate) compositions may contain ratios of EO to PO ranging from about 0.5% to about 99.5%. In certain embodiments, poly(propylene carbonate)-co-poly(ethylene carbonate) compositions have characteristics similar to those described in APPENDICES A & B for the pure polycarbonates.

In some embodiments, a polycarbonate contributes at least about 5% by weight of the total weight of the polymer blends having a co-continuous laminar morphology.

In some of these embodiments, a polyolefin comprises at least about 5% by weight of the total weight of the polymer blends having a co-continuous laminar morphology.

In some embodiments, a polymer blend having a co-continuous laminar morphology is extruded from a single polymer blend.

In some embodiments, a polymer blend having a co-continuous laminar morphology has a thickness of about 100 mils or less.

Although observed in a case above with a PPC having a molecular weight of about 180,000, depending on the local stress or shear rate level, the interfacial tension, the composition, the flow fields in the extruder, and the relative viscosity and melt elasticity of the two mixing polymer melts, it is expected that the co-continuous laminar morphology can be seen with polycarbonate and polyolefin for a polycarbonate over a range of molecular weights. In some embodiments, the polycarbonate has a molecular weight of at least about 40,000. In some embodiments, the polycarbonate has a molecular weight of about 300,000 or less. In some embodiments, the polycarbonate has a molecular weight in the range of about 40,000 to about 300,000.

Although observed in a case above with a 50/50 wt % polymer blend of PPC and LLDPE, depending on the local stress or shear rate level, the interfacial tension, the composition, the flow fields in the extruder, and the relative viscosity and melt elasticity of the two mixing polymer melts, it is expected that the co-continuous laminar morphology can be seen between polycarbonate and polyolefin over a range of blend compositions from about 10 wt % to about 50 wt % of the dispersed phase, especially between about 20 wt % to about 50 wt % dispersed phase. Above 50 wt % polycarbonate, the dispersed phase changes from polycarbonate to polyolefin, but a similar morphology is possible with stratified layers of polyolefin being dispersed in the polycarbonate matrix. In some embodiments, this stratified morphology is expected under appropriate conditions in polycarbonate blends with LLDPE as well as other polymers ranging from about 10 wt % to about 90 wt % polycarbonate blends.

In some embodiments, the polycarbonate makes up at least about 5% by weight of the total weight of the polymer blend. In some embodiments, the polycarbonate makes up at least about 10% by weight of the total weight of the polymer blend. In some embodiments, the amount of polycarbonate is in the range from about 10 wt % to about 90 wt % of the total blend. In some embodiments, the polycarbonate is in the range from about 20 wt % to about 80 wt % of the total blend. In some embodiments, the polycarbonate is in the range from about 20 wt % to about 50 wt % of the total blend. In some embodiments, the polycarbonate is in the range from about 40 wt % to about 60 wt % of the total blend. In some embodiments, the other polymer or polymers make up at least about 10% by weight of the total weight of the polymer blend. In some embodiments, the other polymer(s) is/are in the range from about 20 wt % to about 50 wt % of the total blend.

In some embodiments, a polymer blend having co-continuous laminar morphology includes more than one polycarbonate. In some embodiments, the polymer blend includes poly(ethylene carbonate) and poly(propylene carbonate). In some embodiments, the polycarbonates have different molecular weights. In some embodiments, the polycarbonates have different chemical structures. In some embodiments, the polycarbonates have different molecular weights and different chemical structures.

In some embodiments, a polymer blend having co-continuous laminar morphology includes more than one non-polycarbonate polymer. In some embodiments, the polymer blend film includes more than one polyolefin. In some embodiments, the polyolefins have different molecular weights. In some embodiments, the polyolefins have different chemical structures. In some embodiments, the polyolefins have different molecular weights and different chemical structures.

In some embodiments, a polymer blend having co-continuous laminar morphology includes more than one polycarbonate and more than one non-polycarbonate polymer. In some embodiments, a polymer blend includes more than one polycarbonate and more than one polyolefin.

IV) Methods

In certain embodiments, the present invention provides methods for improving the mechanical properties of an aliphatic polycarbonate composition. In certain embodiments, such methods include the steps of:

a) providing an aliphatic polycarbonate characterized in that when the aliphatic polycarbonate is made into a film, the film has an inherent elongation before break value as measured using ASTM D882 of less than 50%;

b) admixing up to about 30 weight percent of a crystalline or semicrystalline polymer to provide a mixture comprising at least 70 weight percent aliphatic polycarbonate;

c) forming a film from the mixture of step (b); and d) stretching the film from step (c) to provide a film having an elongation before break value as measured using ASTM D882 of greater than 100%.

In certain embodiments, steps (c) and (d) are performed simultaneously by making the film in a blown film line. In some embodiments, a provided method includes steps (a) and (b). In some embodiments, a provided method includes steps (a), (b), and (c).

In certain embodiments, the step of forming a film comprises extruding the film. In certain embodiments, the step of forming a film comprises casting the film.

In certain embodiments, the step of stretching a film comprises uniaxially stretching the film. In certain embodiments, the step of stretching the film comprises biaxially stretching the film.

In certain embodiments, a polymer mixture formed in step (b) is any of those defined hereinabove in the description of polymer blends of the present invention.

In certain embodiments, an aliphatic polycarbonate provided in step (a) is characterized in that it has a Tg greater than 35° C.

In certain embodiments, an aliphatic polycarbonate provided in step (a) is characterized in that the polycarbonate chains contain, on average, greater than 98% carbonate linkages. In certain embodiments, an aliphatic polycarbonate provided in step (a) comprises poly(propylene carbonate).

In certain embodiments, a semicrystalline polymer admixed in step (b) comprises a polyolefin. In certain embodiments, a semicrystalline polymer admixed in step (b) comprises LDPE. In certain embodiments, step (b) comprises admixing from about 1% to about 10% of a semicrystalline polymer.

In certain embodiments, a ratio of the elongation before break value of a film made only from the aliphatic polycarbonate provided in step (a) and the elongation before break value of the final film from step (d) is greater than 2. In certain embodiments, a ratio of the elongation before break value of a film made only from the aliphatic polycarbonate provided in step (a) and the elongation before break value of the final film from step (d) is greater than 3, greater than 5, or greater than 10.

In certain embodiments, methods of the present invention include additional steps after stretching such as, a heat-setting step or annealing step. Additionally, the stretched film can be further processed to make articles of commerce, packaging materials and the like. In certain embodiments, methods of the present invention include the step of thermoforming the film. For example, a thick PPC-based film can be stretched and then used to make cups by thermoforming. In some embodiments, multi-layer laminate structures can be made using the PPC-based film with high elongation properties. In some embodiments, provided methods may include further steps such as surface treatments and the like. For example, films can be surface treated by corona discharge, plasma, or other modifications known in the industry to make the film suitable for further processing like metallizing, laminating, printing, applying adhesives or other coatings.

V) Applications

Alternatively or in addition to the applications mentioned above, provided blends are useful in the applications described below.

In some embodiments, a provided polymer blend is useful in the manufacture of a consumer packaging article. In some embodiments, consumer packaging articles are made from, containing, or coated with the polymer blends described herein. Representative applications of polymers in packaging and concepts related thereto are described in *Plastics Packaging: Properties, Processing, Applications, And Regulations* by Susan E. M. Selke (Hanser Gardner Publications; 2 edition (Dec. 1, 2004) ISBN 978-1569903728), the entirety of which is incorporated herein by reference.

In certain embodiments, the present invention encompasses packaging materials comprising one or more aliphatic polycarbonate compositions extruded with one or more polyolefin compositions. In certain embodiments, packaging materials include films. In some embodiments, the films comprise at least 10% polycarbonate by weight. In some embodiments, the films comprise at least 20% polycarbonate by weight. In some embodiments, the films comprise at least 30% polycarbonate by weight. In some embodiments, the films comprise at least 50% polycarbonate by weight. In some embodiments, the films comprise at least 70% polycarbonate by weight. In some embodiments, the films comprise at least 90% polycarbonate by weight.

In certain embodiments, packaging materials of the present invention comprise blown films. In some embodiments, the invention encompasses extruded films. In some embodiments, films are between about 0.01 and about 100 mils in thickness. In some embodiments, a film is between about 0.1 and 10 mils, between about 0.2 and 5 mils or between about 0.5 and 3 mils in thickness.

In certain embodiments, films formed from extruded polymer blends of the present invention are suitable for food and beverage packaging. In some embodiments, films are blow-molded films, cast films, or extruded films. In certain embodiments, films are rigid films, stretch films, or heat-shrinkable films. Manufacturing techniques to produce such films are well known to the skilled artisan.

Extruded polymer blends described herein are useful for blown or cast films or as sheet materials (see Encyclopedia of Polymer Science and Technology, 1st Ed., vol. 7 p. 88-106; Kirk-Othmer Encyclopedia of Chemical Technology, 4th Ed., vol. 11, p. 843-856; and Plastics Materials, 5 Ed., Butterworth-Heinemann, 252 and p. 432ff). The films may be single layer or multilayer. The multilayer films may include other polymers, adhesives, etc. For packaging the films may be stretch-wrap, shrink-wrap or cling wrap. Films are useful form many applications such as agricultural films, packaging foods.

Extruded films may be formed from the polymer blends described herein and these films may be treated, for example drawn or stretched. In some embodiments, such films are biaxially stretched. Such extruded films are useful for packaging of various sorts.

In certain embodiments, films include an aliphatic polycarbonate as a component of a multilayer film. In certain embodiments, a polycarbonate acts as a tie layer in a laminate film. In some embodiments, a polycarbonate provides a structural layer in a multilayer film. In certain embodiments, films are biodegradable films. In some embodiments, such films include a polycarbonate in combination with one or more other degradable polymers, such as starch, PHB, 3PHP, PLA, or modified cellulose. In certain embodiments, a layer containing the polycarbonate acts as a barrier layer to retard the transmission of oxygen, water vapor, carbon dioxide, or organic molecules. In certain embodiments, polycarbonate films are used for packaging food items, either in a food-contact situation or as a secondary packaging material.

In certain embodiments, the polycarbonate-containing films are used one or more layers in multilayer constructions. In some embodiments, films are used as a component in a multilayer packaging article such as a beverage bottle. In some embodiments, such multilayer bottles are formed by blow-molding. In some embodiments, the polycarbonate films are used in the inner layer for paper-based liquid packaging articles such as juice boxes, milk cartons, and gable top boxes. In certain embodiments, films are used in 'tag-in-a-box' constructions. In certain applications the films are used in container closure construction such as collar wrappers, cap liners, or lid membranes.

In certain embodiments, flexible pouches are made from a single layer or multilayer polycarbonate film. Such pouches can be used for packaging various liquid products, such as milk, or powders, such as hot chocolate mix. The pouch may be heat sealed. It may also have a barrier layer, such as a metal foil layer.

In some embodiments, a wrap packaging film contains a polycarbonate film. In some embodiments, the films have differential cling. Such a film can be provided by a film laminate, including at least two layers; an outer reverse, which is a polycarbonate film which contains a tackifier in sufficient amount to impart cling properties; and an outer obverse which has little or no cling.

Although the polymer blends described herein are preferably directed toward use in food and beverage packaging, polymer blends may have other applications as well. In some embodiments, polycarbonate-containing films are used for packaging applications. In certain embodiments, polycarbonate-containing films are used as retail packaging for consumer products. In certain applications, polycarbonate-containing films are used to make bubble-wrap, or other similar packing materials. In certain embodiments, polycarbonate-containing films are used as substrates for adhesive tape.

In some embodiments, polycarbonate-containing films of the present invention are used as agricultural film. In some applications, such films are used as ground mulch. In certain embodiments, ground mulches containing the polycarbonate are degradable and may be plowed into the soil after use. In some embodiments, polycarbonate-containing films are used as greenhouse covering materials. In certain embodiments, polycarbonate films are used as permeable or impermeable row covering materials. In certain embodiments, polycarbonate films are used as geomembranes and pond liners.

In certain embodiments, polymer blends of the present invention may have utility in heat seal applications. In some embodiments, polycarbonate-containing composition may be used for such applications as lidstock (for example in packaging dairy products, dry goods, medical supplies and liquid fill containers); as overwraps for items such as soap, cigarettes, paper goods, and other consumer products; as overlays in labeling applications; and in blister pack construction.

The following listing is of some uses for polycarbonate-containing compositions and blends. In some cases a reference is given which discusses such uses for specific polymers other than a polycarbonate or for polymers in general. In these cases, the concepts described therein are sufficiently general that the skilled practitioner may apply the concepts and techniques to applications of polycarbonate compositions without undue experimentation. The entirety of each of these references is incorporated herein by reference. For the references, these include: W. Gerhartz, et al., Ed., Ullmann's Encyclopedia of Industrial Chemistry, 5th Ed. VCH Verlagsgesellschaft mBH, Weinheim, for which the volume and page number are given below; H. F. Mark, et al., Ed., Kirk-Othmer Encyclopedia of Chemical Technology, 4th Ed., John Wiley & Sons, New York, J. I Kroschwitz, et al., Ed., for which the volume and page number are given below, Encyclopedia of Polymer Science and Technology, 1st Ed., John Wiley & Sons, New York, for which the volume and page number are given below, H. F. Mark, et al., Ed., Encyclopedia of Polymer Science and Engineering, 2nd Ed., John Wiley & Sons, New York, for which volume and page numbers are given below, and J. A. Brydson, ed., Plastics Materials, 5 Ed., Butterworth-Heinemann, Oxford, UK, 1989, and the page is given below.

In some embodiments, polycarbonate-containing compositions can act as tackifiers for low strength adhesives (Ullmann's Encyclopedia of Industrial Chemistry, 5th Ed. vol. A1, p. 235-236). Elastomeric blends and/or relatively low molecular weight polycarbonate-containing compositions are preferred for these applications. In some embodiments, the present invention encompasses a low strength adhesive containing a polycarbonate composition or blend.

In some embodiments, polycarbonate-containing compositions can be useful as base resins for hot melt adhesives (Ullmann's Encyclopedia of Industrial Chemistry, 5th Ed. vol. A1, p. 233-234), pressure sensitive adhesives (ibid p. 235-236), or as solvent applied adhesives. Low to moderate molecular weight polycarbonates and thermoplastic blends of polycarbonates are preferred for hot melt adhesives. In some embodiments, the present invention encompasses hot melt adhesives containing a polycarbonate-containing composition or blend.

In certain embodiments, polymers may be reacted with various compounds particularly those that result in functional groups including, but not limited to epoxy, carboxylic anhydride (for instance reaction with maleic anhydride), an isocyanate, or a carboxylic acid (Encyclopedia of Polymer Science and Technology, 1st Ed., vol. 12, p. 445). In certain embodiments, polycarbonate-containing compositions are modified via hydroxy groups present at the chain ends. Such functionalized polymers may be useful as tougheners for various thermoplastics and thermosets when blended. When the polymers are elastomers, the functional groups which are grafted onto them may be used as curesites to crosslink the polymers. Maleic anhydride-grafted polymers are useful as tougheners for a wide range of materials (nylon, PPO, PPO/styrene alloys, PET, PBT, POM, PLA, PHB, etc.); as tie layers in multilayer constructs such as packaging barrier films; as hot melt, moisture-curable, and coextrudable adhesives; or as polymeric plasticizers. The maleic and hydride-grafted materials may be post-reacted with, for example, amines, to form other functional materials. Reaction with aminopropyl trimethoxysilane would allow for moisture-curable materials. Reactions with di- and tri-amines would allow for viscosity modifications.

In certain aspects, wire insulation and jacketing may be made from the polycarbonate-containing compositions or blends thereof (see Encyclopedia of Polymer Science and Engineering, 2nd Ed., vol. 17, p. 828-842). In the case of elastomers it may be preferable to crosslink the polymer after the insulation or jacketing is formed. In some embodiments, the present invention encompasses jacketing or insulation containing a polycarbonate composition or blend.

Polycarbonate compositions or blends thereof may be used as plasticizers or processing aids for other polymers including, but not limited to PLA, PHB, and PVC.

Polycarbonate compositions or blends can be used as tougheners for other polymers such as PLA, PHB, and polyolefins. In some embodiments, the present invention encompasses PLA blended with a polycarbonate composition or blend. In some embodiments, the present invention encompasses PHB blended with a polycarbonate composition or blend. In some embodiments, the present invention encompasses starch blended with a polycarbonate composition or blend.

Polycarbonate compositions or blends, especially those which are relatively flexible, are useful as capliner resins for carbonated and noncarbonated beverages.

In some embodiments, the present invention encompasses polymer additives containing polycarbonate compositions or blends. In certain embodiments, the invention includes molding resins such as the so-called thermoplastic olefins to which polycarbonate has been added, for example to improve paint adhesion, as in automotive uses.

In some embodiments, the present invention encompasses fibers containing polycarbonate compositions or blends. In some embodiments, fibers are fine denier fibers and/or multifilaments. These may be melt spun. They may be in the form of a filament bundle, a non-woven web, a woven fabric, a knitted fabric, or staple fiber. In some embodiments, the present invention encompasses fabrics, ropes, yarns, or other finished fiber products containing polycarbonate.

In some embodiments, the invention encompasses articles made by injection molding the polycarbonate blends. Such injection molded items include disposable items such as food service containers and utensils as well as more durable including but not limited to items such as consumer goods, toys, parts for appliance, electronics, and automotive applications.

In some embodiments, provided films are packaging films. In some embodiments, packaging films are laminate films. In some embodiments, the laminate films include a polymer selected from the group consisting of: polyolefin, polyester, polyether, polyamide, polystyrene, polyvinyl chloride, polyethylene terephthalate, fluorinated polymers, and mixtures of two or more of these. In certain embodiments, laminate films include a polymer selected from the group consisting of: polylactide, poly(hydroxy alkanoate), aliphatic polycarbonate other than poly(propylene carbonate), aromatic polycarbonate, polyvinyl alcohol, NYLON™, and mixtures of any two or more of these.

In some embodiments, the present invention encompasses a single serving sachet containing polycarbonate. In certain embodiments, such sachets are for packaging personal care products such as soaps or shampoos. In certain embodiments, such sachets are for packaging food products such as condiments.

EXEMPLIFICATION

Example 1

A structurally precise PPC was fed to a single-screw extruder with a 4" film die. The extruder temperature was maintained at 170° C. Films of 100 microns, 200 microns, 500 microns, and 900 microns were obtained by adjusting the die opening. The films were cooled by passing them through a roll-system with water-cooled rolls. The films obtained were clear and tough and could be used for thermoforming various articles. An Illig SB53-C1 thermoformer equipped with vacuum system was used to form small cups from each of these PPC films by thermoforming. In thermoforming, the processing is controlled by temperature, achieved through a pyrometer which monitors the temperature of the PPC sheet, heated by the radiation of the ceramic heaters, set at 300° C. in this case. That is, the male mold moves up and the vacuum is turned on when the surface temperature reaches the setting point, 130° C. in this case. Heating times of 15, 25, and 135 seconds were used for 0.1 mm, 0.2 mm, and 0.9 mm thick films, respectively.

Example 2

PPC similar to that described in Example 1 (Novomer PPC) was fed to an injection molding machine through a feed hopper. Upon entrance into the barrel, the resin is heated to 170° C. and fed into the mold. Dogbones and flat bars were molded to be tested per ASTM standards. A tensile strength at yield of 39.5 MPa, an elongation at yield of 3.24% and a tensile modulus of 1447 MPa were measured (ASTM D638-08 (ISO 527)). A flexural modulus of 2525 MPa was measured (ASTM D790 (ISO 178)). A notched Izod impact of 0.6721 ft-lb/inch was measured (ASTM D256, ISO 180). Finally, a heat deflection temperature, or deflection temperature under load, of 33° C. was measured (ASTM D1238, ISO 1133).

Example 3

Structurally precise PPC (Novomer PPC) was blended with polyolefins and made into various articles including films, injection molded items, and blow molded bottles. Unexpectedly, the structurally precise PPC survived the extrusion process and provided useful blends with polyolefins. PPC similar to that described in Example 1 was blended at 30 or 50 weight % with either low density polyethylene (LLDPE), high density polyethylene (HDPE), or polypropylene (PP) in a twin-screw extruder. The temperature of the extruder was set at 180° C. for the LLDPE and 190° C. for HDPE and PP. A compatibilizer was used to enable enhanced dispersion of PPC and the polyolefin. Typically, the compatibilizer was loaded at a maximum of 20-22% of the dispersed phase. Thus, a 50/50 polyolefin/PPC blend was formulated as: 45/45/10::Polyolefin/PPC/compatibilizer and a 70/30 polyolefin/PPC blend was formulated as: 66/28/6:: Polyolefin/PPC/compatibilizer. An anyhydride modified LLDPE was used as the compatibilizer for LLDPE blends and HDPE while an anyhydride modified PP was used as the compatibilizer for PP blends. Pellets of these blends were made by passing the melt from the twin-screw extruder through a strand die into a pelletizer. These pellets were then used to make film, injection molded parts, and thermoformed articles, as described above for pure PPC. In one case (HDPE blends), the pellets were also used to make blow-molded articles like bottles for detergent and shampoo use using traditional extrusion-blow molding equipment. Physical data for the blends are shown in Table 1.

TABLE 1

| | Tensile Strength at Yield | Elongation at Yield | Flexural Modulus Units | Tensile Modulus | Notched Izod Impact |
|---|---|---|---|---|---|
| | MPa | % | MPa | MPa | ft-lb/inch |
| PPC | 39.5 | 3.24 | 2525 | 1447 | 0.6721 |
| LLDPE | 11.2 | 64 | — | 164 | no break |
| 70/30 LLDPE/PPC | 12.9 | 6.21 | 344 | 437 | 5.73 |
| 50/50 LLDPE/PPC | 15.4 | 3.72 | 823 | 684 | 2.713 |
| HDPE | 20.6 | 8 | 664 | 563 | 2.25 |
| 70/30 HDPE/PPC | 23.6 | 5.79 | 1184 | 817 | 1.19 |
| 50/50 HDPE/PPC | 25.9 | 3.23 | 1493 | 931 | 1.016 |
| PP | 32.5 | 8 | 1317 | 930 | 1.5 |
| 70/30 PP/PPC | 28.9 | 4.22 | 1763 | 1024 | 1.58 |
| 50/50 PP/PPC | 28.8 | 3.76 | 2009 | 1137 | 1.62 |

A LLDPE marketed as Exceed™ 1018 (ExxonMobil, Irving, Tex.) was used as the polyolefin in some tests. Exceed™ 1018 is a metallocene catalyzed polyethylene resin (a ethylene-hexene copolymer), which is used to form films with good tensile strength, impact strength, and puncture resistance. The LLDPE is reported as having a density of 0.918 g/cm$^3$, a melt index (190° C./2.16 kg) of 1.0 g/10 min, and a peak melting temperature of 246° F.

A HDPE marketed as Alathon® M5350 (Lyondell Chemical Co., Houston, Tex.) was used as the polyolefin in some tests. Alathon® M5350 is a narrow molecular weight distribution copolymer with high impact strength and good processing stability. The HDPE is reported as having a density of 0.953 g/cm$^3$ and a melt index of 4.5.

A PP marketed as DOW H110-02N (Dow Chemical Co., Midland, Mich.) was used as the polyolefin in some tests. DOW H110-02N is a polypropylene homopolymer with a good impact and stiffness balance and excellent processability. The PP is reported as having a density of 0.9 g/cm$^3$ and a melt index of (230° C.) of 2.2 g/10 min.

Example 4

A structurally precise PPC with an average molecular weight of about 180,000 was used as the polycarbonate in the following tests.

The polycarbonate and compatibilizer were dried in a vacuum oven at 95° F. for 48 hours before processing. The materials (polycarbonate, polyolefin, and the compatibilizer) were dry-blended and fed to a ZSK-30 co-rotating twin screw extruder (TSE, Werner & Pfleiderer, Stuttgart, Germany) by a twin screw feeder. A water bath was attached at the end of TSE and the extrudate strands were pelletized. Three blends were prepared and tested. The first blend, 50/50 wt % LLDPE/PPC with Admer AT2543A (Mitsui Chemicals, Tokyo, Japan) as the compatibilizer, was extruded at a temperature of 170° C. at a feed rate of 10 lb/hr and a screw speed of 110 rpm. The second blend, 50/50 wt % HDPE/PPC with Admer AT2543A as the compatibilizer, was extruded at a temperature of 170° C. at a feed rate of 10 lb/hr and a screw speed of 110 rpm. The third blend, 50/50 wt % PP/PPC with Admer QF551A (Mitsui Chemicals, Tokyo, Japan) as the compatibilizer, was extruded at a temperature of 180° C. at a feed rate of 10 lb/hr and a screw speed of 110 rpm. The compatibilizer level was maintained in all cases between 1-10% of the dispersed phase.

For film extrusion, a single screw extruder (D=1.8 cm, L/D=15; C.W. Brabender Instruments, Inc., South Hackensack, N.J.) was used to prepare films using a 6-inch sheet die attached at the end of extruder. 200 μm and 500 μm thick films were made, with thickness of the film being varied by adjusting the width of the die opening. The film was then collected by a three-layer take-up roll. The temperature of the roll was maintained at 60° C. by a circulating water bath. The thickness of the film was also adjustable by the screw speed and the take-up speed on the rolls. In addition to the three blends described above, extruded films of PPC, LLDPE, HDPE, and PP were formed. PPC films were extruded at 170° C. LLDPE films were extruded at 200° C. HDPE films were extruded at 230° C. PP films were extruded at 235° C. 50/50 LLDPE/PPC with Admer AT2543A and 50/50 HDPE/PPC with Admer AT2543A films were extruded at 180° C. 50/50 PP/PPC with Admer QF551A films were extruded at 190° C.

Oxygen permeability of the polymer films were measured at 23° C. and 50% relative humidity. Pure PPC films showed an oxygen permeability of 6.2 cc mil/100 in$^2$ day. Pure PEC films showed an oxygen permeability of 0.59 cc mil/100 in$^2$ day. Pure LLDPE films showed an oxygen permeability of 513 cc mil/100 in² day. Pure HDPE films showed an oxygen permeability of 136 cc mil/100 in² day. Pure PP films showed an oxygen permeability of 164 cc mil/100 in² day. LLDPE/PPC films showed an oxygen permeability of 41 cc mil/100 in³ day for a barrier improvement factor of 12.5 over pure LLDPE. HDPE/PPC films showed an oxygen permeability of 81 cc mil/100 in² day for a barrier improvement factor of 1.7 over pure HDPE. PP/PPC films showed an oxygen permeability of 35 cc mil/100 in² day for a barrier improvement factor of 4.7 over pure PP.

Expected oxygen permeability of the polymer blend films based on the oxygen permeability of the pure components was calculated using two different models, a volume additivity model and a Maxwell model.

The volume additivity model is defined by the equation:

$$P_{blend} = \text{volfr}_d P_d + (1-\text{volfr}_d)P_m \quad (1)$$

and the Maxwell model is defined by the equation:

$$P_{blend} = \frac{P_m(P_d + 2P_m - 2\text{volfr}_d(P_m - P_d))}{P_d + 2P_m + \text{volfr}_d(P_m - P_d)} \quad (2)$$

where $P_{blend}$ is the permeability of the blend, $P_m$ is the permeability through the matrix phase, $P_d$ is the permeability through the dispersed phase, and $\text{volfr}_d$ is the volume fraction of the dispersed phase. The predicted oxygen permeability for LLDPE/PPC was 301 by the volume additivity model and 248 by the Maxwell model. The predicted oxygen permeability for HDPE/PPC was 82 by the volume additivity model and 67 by the Maxwell model. The predicted oxygen permeability for PP/PPC was 98 by the volume additivity model and 80 by the Maxwell model.

Scanning electron microscopy (SEM) was also performed on the polymer films. FIG. 2 shows a co-continuous laminar morphology of the dispersed phase for the LLDPE/PPC polymer blend film. FIG. 3 shows islands of PPC 30 in a matrix of HDPE 35 for the HDPE/PPC polymer blend film. The co-continuous morphology for the LLDPE/PPC polymer blend film leads to improved barrier properties, because a tortuous path being generated for $O_2$ permeability through the film. Oxygen can not easily diffuse through the dispersed PPC layer 20 and, due to the morphology, does not find a quick diffusion path through the low barrier LLDPE matrix 25. Thus, the permeability of $O_2$ through the 50/50 LLDPE/PPC film is much lower than would be expected using a volume additivity model or the Maxwell model for permeability through a two-phase system.

The morphology seen in FIG. 2 with the 50/50 LLDPE/PPC, where PPC is the dispersed phase, is different than the typical islands-in-a-sea morphology seen in FIG. 3 with the 50/50 HDPE-PPC micrograph. When two polymers are dispersed in each other, the formation of a spherical dispersed phase, as seen in FIG. 3, is entropically favored. However, in certain cases as in FIG. 2, it has been seen that the dispersed phase is stretched out into a stratified morphology, also known in the literature as a laminar or co-continuous morphology as observed in the LLDPE-PPC case. This stratified co-continuous morphology leads to the dispersed phase forming thin sheet-like layers (typically less than 1 micron thick, and often less than 0.2-0.5 microns thick). This creates a tortuous path for diffusion of gases (like oxygen) through the film, thereby lowering the gas transmission rate through the film much more than expected from a film with a dispersed phase with spherical domains in the film. It has been shown that a thin platelet-like morphology, with the platelets or stratified layers having a large, but finite, length/width ratio, can reduce the gas transmission rate dramatically (see Hopfenberg, H. B. and Paul, D. R., in *Polymer Blends*, D. R. Paul and S, Newman, eds., Vol. 1, Chapter 10, Academic Press, New York, 1978, hereby incorporated herein by reference).

The deformation aspects of drop stretching and coalescence which leads to a stratified co-continuous laminar morphology have been studied for other polymer systems (see Subramanian, P. M., "Permeability barriers by controlled morphology of polymer blends", *Polymer Engineering & Science*, Vol. 25, No. 8, pp. 483-487, 1985; Kamal, M. R. et al., "The development of laminar morphology during extrusion of polymer blends, *Polymer Engineering & Science*, Vol. 35, No. 1, pp. 41-51, 1995; and Lee, S. Y. and Kim, S. C., Laminar morphology development and oxygen permeability of LDPE/EVOH blends", *Polymer Engineering & Science*, Vol. 37, No. 2, pp. 463-475, 1985, which are all hereby incorporated by reference herein).

Example 5

PPC of average molecular weight of 185,000, having greater than 99% carbonate linkages, and containing less than 2% propylene carbonate was compounded with 5% LDPE (Dow LDPE 5004I as well as Dow LDPE 640I in a twin screw extruder. Optionally, a functionalized polyolefin can be used as a compatibilizer. For example, Admer AT2543A was used as a compatibilizer in some cases at 0.5 wt % to 1 wt % levels.

Oriented Films:

The compounded PPC-LDPE blend was then made into oriented films in two different ways.

a) Blown Film Process: The PPC-LDPE blend was fed to a blown film line to make blown film.

A blow-up ratio of about 2-3 was observed and typical film thickness was between 1 to 1.5 mil. The film was then tested by ASTM D882 which provides tensile and elongation properties for polymeric films.

b) Cast Film followed by Biaxial Stretching: The PPC-LDPE blend was cast into a 7 mil thick film. This was then biaxially stretched in a Iwamoto biaxial film stretching machine by heating the film to a temperature between 40 and 80 degree Celsius, more preferably between 50 and 70 degree Celsius and then stretching in both directions simultaneously. Typically film can be stretched between 1.5 times to 6-10 times the original length. In one example, the film was held for 2 minutes at 58 degrees Celcius, then stretched at 1.5%/sec strain rate in both directions, with a maximum speed of 100 mm/minute. Film was stretched 2.5 times the original length in both directions. Both the as-cast 7 mil films as well as the biaxially stretched films were tested by ASTM D882 which provides tensile and elongation properties for polymeric films.

Data by ASTM D882 on the blown PPC-based films are tabulated below in Table 2.

TABLE 2

| Polymer composition | Tensile Strength, MPa | Elongation at Break, % |
| --- | --- | --- |
| Pure PPC | 45 | 20 |
| Pure LDPE | 12 | 120 |
| 95% PPC, 5% LDPE | 50 | 212 |

TABLE 2-continued

| Polymer composition | Tensile Strength, MPa | Elongation at Break, % |
|---|---|---|
| 94.5% PPC, 5% LDPE, 0.5% Admer | 52 | 195 |
| 95% PPC + 5% Ecoflex (poly(butylene adipate-co-terephtalate) | 41 | 208 |
| 94% PPC + 5% Ecoflex + 1% Joncryl | 44 | 197 |
| 79% PPC + 20% Ecoflex + 1% Joncryl | 38 | 254 |

As can be seen in Table 2, films according to the present invention display high Elongation at Break values relative to the unblended films. Unexpectedly, the elongation properties of the blends sometimes exceed the values of the individual components.

Casting a film and then stretching it biaxially (sequentially or simultaneously) provides similar improvement in Elongation at break as shown below in Table 3.

TABLE 3

Cast Film: As-is and after simultaneous biaxially stretching.

| Composition | Tensile Strength, MPa | Elongation at Break, % | Tensile Modulus, MPa |
|---|---|---|---|
| Pure PPC | 34 | 3 | 3702 |
| Pure PPC repeat | 34 | 7 | 3751 |
| Pure PPC—Biaxially Stretched 2.5x | 52 | 2 | 3863 |
| Pure LDPE | 12 | 209 | 294 |
| 94% PPC + 5% LDPE + 1% Admer AT2543A | 33 | 3 | 3677 |
| 94% PPC + 5% LDPE + 1% Admer AT2543A; repeat | 37 | 8 | 3537 |
| 94% PPC + 5% LDPE + 1% Admer AT2543A,[1] Biaxially Stretched 2.5x | 45 | 144 | 3874 |

[1]Admer AT2543A is an anhyride functionalized polyethylene (from Mitsui)

As shown in Table 2, Biaxial stretching did not improve Elongation at Break for pure PPC alone. However, biaxial stretching improves Elongation at Break for "PPC+5% LDPE" significantly. Tensile strength and modulus advantages of PPC over polyolefins are still retained with addition of 5% LDPE.

All of the previously-mentioned references are hereby incorporated by reference herein.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

APPENDIX A

Description of PPC suitable for use in extruded blends of the present invention:

The following description is adapted from a co-owned International Patent Application Publication WO 2010/060038, the entirety of which is incorporated herein by reference.

In some embodiments, a polycarbonate in the polymer blend is a PPC with advantageous properties made with careful control of reaction parameters. For example, such control of certain reaction parameters leads to PPC that is more structurally precise than previous PPC compositions. Unexpectedly, this structurally precise PPC has improved processing characteristics that allow use of the material in numerous applications where PPC has performed poorly in the past. In certain embodiments, polymer blends are formed from structurally precise PPC wherein the PPC has a high head-to-tail ratio, a low ether linkage content, a narrow polydispersity, and a low cyclic carbonate content. PPC compositions from which these articles are made have physical characteristics that differentiate them from prior PPC compositions typically formed by the polymerization of propylene oxide and carbon dioxide in the presence of heterogeneous zinc catalyst systems.

In some embodiments, PPC possesses improved processing and performance characteristics relative to less structurally-precise poly(propylene carbonate) compositions from the prior art. These prior art materials contain a larger percentage of ether linkages, a lower head-to-tail ratio, a broader molecular weight distribution, a higher cyclic carbonate content, or combinations of any two or more of these. In some embodiments, the PPC is able to be processed by means including, but not limited to: injection molding; extrusion, melt processing, blowing, thermoforming, foaming, and casting under conditions where prior art poly (propylene carbonate) compositions degrade or otherwise perform poorly.

In some embodiments, resulting poly(propylene carbonate)-containing blends and films thereby produced possess unexpectedly improved physical characteristics including, but not limited to: higher strength, less tendency toward thermal deformation, improved gas barrier properties, higher glass transition temperatures, and combinations of two or more of these.

It will be understood that in the present disclosure for provided polymer blends and films, the terms "structurally precise poly(propylene carbonate)" and "poly(propylene carbonate)", unless otherwise noted, are used interchangeably.

In certain embodiments, PPC is characterized in that it has a high head-to-tail ratio. In some embodiments, PPC is characterized in that it has a high percentage of carbonate linkages. In some embodiments, PPC is characterized in that it has a narrow polydispersity index. In certain embodiments, PPC is characterized in that it contains very low levels of cyclic carbonate.

In those embodiments where the structurally precise poly (propylene carbonate) is characterized by a high head-to-tail ratio, polymers have on average greater than about 80% of adjacent monomer units oriented head-to-tail. In certain embodiments, on average in provided polymer blends and films, greater than about 85% of adjacent monomer units in the PPC are oriented head-to-tail. In some embodiments, on average in provided polymer blends and films, greater than about 90% of adjacent monomer units in the PPC are oriented head-to-tail. In some embodiments, on average in provided polymer blends and films, greater than about 95% of adjacent monomer units in the PPC are oriented head-to-tail. In some embodiments, on average in provided polymer blends and films, essentially all adjacent monomer units in the PPC are oriented head-to-tail.

In those embodiments where the structurally precise poly (propylene carbonate) is characterized by a high percentage of carbonate linkages, polymers have on average greater than about 90% of adjacent monomer units connected via carbonate linkages and less than about 10% ether linkages. In certain embodiments, on average in provided polymer blends and films, greater than about 95% of adjacent monomer units in the PPC connected via carbonate linkages. In some embodiments, on average in provided polymer blends and films, greater than about 97% of adjacent monomer units in the PPC are connected via carbonate linkages. In some embodiments, on average in provided polymer blends and films, greater than about 99% of adjacent monomer units in the PPC are connected via carbonate linkages. In some embodiments, on average in provided polymer blends and films, essentially all adjacent monomer units in the PPC are connected via carbonate linkages. In certain embodiments, polymer blends and films may contain polyether portions formed in a separate process from the carbonate chains, and in such cases the ether linkages of the polyether portions are to be understood to be distinct from the ether linkages described above which typically arise from imperfect copolymerization of $CO_2$ and propylene oxide.

In those embodiments where the structurally precise poly (propylene carbonate) is characterized by a narrow polydispersity index (PDI), the PPC has a PDI less than about 2. In certain embodiments, the PPC has a PDI less than about 1.8. In some embodiments, the PPC has a PDI less than about 1.5. In some embodiments, the PPC has a PDI less than about 1.4, less than about 1.2 or less than about 1.1. In certain embodiments, the PPC has a PDI between about 1.0 and about 1.2.

In those embodiments where the structurally precise poly (propylene carbonate) is characterized by a low cyclic carbonate content, the PPC has a cyclic carbonate content less than about 5%. In certain embodiments, the PPC contains less than 5% propylene carbonate. In some embodiments, the PPC contains less than 3% propylene carbonate. In some embodiments, the PPC contains less than 1% propylene carbonate. In certain embodiments, the PPC contains essentially no propylene carbonate.

In some embodiments, structurally the precise poly(propylene carbonate) is characterized in that it possesses a combination of two or more characteristics selected from the group consisting of a high head-to-tail ratio, a high percentage of carbonate linkages, a narrow polydispersity index, and a low cyclic carbonate content. In some embodiments, the poly(propylene carbonate) is characterized in that it has a combination of a high head-to-tail ratio and a high percentage of carbonate linkages. In some embodiments, the poly(propylene carbonate) is characterized in that it has a combination of a high head-to-tail ratio and a narrow polydispersity index. In some embodiments, the poly(propylene carbonate) is characterized in that it has a combination of a high head-to-tail ratio and a low cyclic carbonate content. In some embodiments, the poly(propylene carbonate) is characterized in that it has a combination of a narrow polydispersity index and high percentage of carbonate linkages. In some embodiments, the poly(propylene carbonate) is characterized in that it has a combination of a high head-to-tail ratio, a high percentage of carbonate linkages, and a narrow polydispersity index.

Structurally precise poly(propylene carbonate) may have a range of molecular weights in the polymer blends and polymer films. For specific applications it may be desirable to use a higher or lower molecular weight material to obtain the optimum combination of performance and processing characteristics. Such selection processes are well known to the skilled artisan. The molecular weight of the polymer can be represented by the molecular weight number ($M_n$). High molecular weight PPC as described herein generally has an $M_n$ greater than about $5\times10^4$ g/mol. Low molecular weight PPC as described herein has an $M_n$ between about $1\times10^3$ and about $5\times10^4$ g/mol.

In certain embodiments, poly(propylene carbonate) is a thermoplastic having a relatively high $M_n$. In certain embodiments, structurally precise thermoplastic poly(propylene carbonate) has an $M_n$ above about $5\times10^4$ g/mol. In certain embodiments, poly(propylene carbonate) has an $M_n$ above about $1\times10^5$ g/mol. In certain embodiments, poly (propylene carbonate) has an $M_n$ between about $5\times10^4$ g/mol and about $2\times10^7$ g/mol.

In certain embodiments, polymer blends and films include structurally precise poly(propylene carbonate) having a molecular weight between about 40,000 and about 400,000 g/mol. In certain embodiments, polymer blends and films include structurally precise poly(propylene carbonate) having a molecular weight between about 50,000 and about 350,000 g/mol. In certain embodiments, polymer blends and films include structurally precise poly(propylene carbonate) having a molecular weight between about 100,000 and about 300,000 g/mol. In certain embodiments, the $M_n$ is in the range of about 150,000 and about 250,000 g/mol. In some embodiments, the structurally precise poly(propylene carbonate) has an $M_n$ between about 160,000 and about 240,000 g/mol. In certain embodiments, the poly(propylene carbonate) has an $M_n$ between about 180,000 and about 220,000 g/mol. In certain embodiments, the poly(propylene carbonate) has an $M_n$ of about 180,000 g/mol.

In certain embodiments, structurally precise poly(propylene carbonate) has the following combination of properties: an $M_n$ in the range of about 60,000 to about 400,000 g/mol; a carbonate linkage content above 95%, a head-to-tail ratio greater than about 85%, a polydispersity index less than about 1.5, and a cyclic carbonate content below about 5%.

In some embodiments, structurally precise poly(propylene carbonate) has the following combination of properties: an $M_n$ in the range of about 60,000 to about 100,000 g/mol; a carbonate linkage content above 95%, a head-to-tail ratio greater than about 85%, a polydispersity index less than about 1.5, and a cyclic carbonate content below about 5%.

In certain embodiments, structurally precise poly(propylene carbonate) has the following combination of properties: an $M_n$ of about 80,000 g/mol, a carbonate linkage content above 98%, a head-to-tail ratio greater than about 85%, a polydispersity index less than about 1.2, and a cyclic carbonate content below about 2%.

In some embodiments, structurally precise poly(propylene carbonate) has the following combination of properties: an $M_n$ in the range of about 120,000 to about 250,000 g/mol, a carbonate linkage content above 95%, a head-to-tail ratio greater than about 85%, a polydispersity index less than about 1.5, and a cyclic carbonate content below about 5%.

In certain embodiments, structurally precise poly(propylene carbonate) has the following combination of properties: an $M_n$ of about 180,000 g/mol, a carbonate linkage content above 98%, a head-to-tail ratio greater than about 85%, a polydispersity index less than about 1.2, and a cyclic carbonate content below about 2%.

In some embodiments, structurally precise poly(propylene carbonate) possesses some degree of stereoregularity. In some embodiments, the PPC is at least partially isotactic. In some embodiments, the PPC is at least partially syndiotactic. In certain embodiments, the PPC is substantially isotactic. In some embodiments, the PPC is a blend of atactic PPC with isotactic or syndiotactic PPC.

In certain embodiments, structurally precise PPC includes a blend of two or more PPC compositions characterized in that each PPC composition in the blend has a different average molecular weight. In certain embodiments, a polycarbonate component includes a blend of high molecular weight PPC having an $M_n$ between about 150,000 and about 400,000 g/mol with a lower molecular weight PPC having an $M_n$ below about 100,000 g/mol. In certain embodiments, a polycarbonate component includes a blend of high molecular weight PPC having an $M_n$ between about 150,000 and about 250,000 g/mol with a lower molecular weight PPC having an $M_n$ between about 30,000 g/mol and about 80,000 g/mol. In certain embodiments, each component of such blends has a narrow polydispersity. In certain embodiments, the PDI of the high molecular weight and low molecular weight components of a blend are each less than 1.2 when measured independently. In certain embodiments, such blends are produced by mixing discrete samples of PPC polymer having low and high molecular weights.

In certain embodiments, a structurally precise poly(propylene carbonate) has a glass transition temperature ($T_g$) above 40° C. In certain embodiments, the structurally precise poly(propylene carbonate) has a glass transition temperature ($T_g$) above 41° C. In certain embodiments, a structurally precise poly(propylene carbonate) has a glass transition temperature ($T_g$) above 42° C. In certain embodiments, a structurally precise poly(propylene carbonate) has a glass transition temperature ($T_g$) above 43° C. In certain embodiments, a structurally precise poly(propylene carbonate) has a glass transition temperature ($T_g$) above 44° C. In certain embodiments, a structurally precise poly(propylene carbonate) has a glass transition temperature ($T_g$) above 45° C.

In certain embodiments, a structurally precise poly(propylene carbonate) is formed using catalysts other than zinc-containing catalysts. In certain embodiments, a structurally precise poly(propylene carbonate) contains no detectable zinc residue.

In some embodiments, aliphatic polycarbonates are obtained by copolymerization of epoxides and carbon dioxide in the presence of transition metal catalysts. In certain embodiments, the structurally precise poly(propylene carbonate) is formed using metal salen catalysts. In certain embodiments, a structurally precise poly(propylene carbonate) is formed using cobalt salen catalysts. Suitable catalysts and methods include those described in U.S. Pat. No. 7,304,172 and in published PCT Application No. WO/2010/022388A2 the entire content of each of which is incorporated herein by reference.

In some embodiments, a structurally precise poly(propylene carbonate) includes polymer chains having a structure represented by formula I:

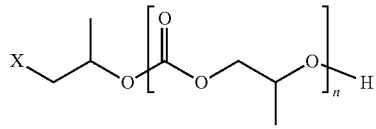

I where X is a moiety corresponding to the bound form of any nucleophile that can ring-open an epoxide and n is an integer from about 10 to about 40,000. In certain embodiments, X in structure I is selected from the group consisting of halide, azide, or an optionally substituted group consisting from the group of carboxylate, sulfonate, phenol, and alkoxide. In some embodiments, n is from about 50 to about 3,000.

In certain embodiments, a structurally precise poly(propylene carbonate) polymers are present as a mixture of two or more different polymer chain types, where the different chain types are distinguished by the presence of two or more different chain terminating groups and/or the presence, absence, or differences in small molecule polymer initiation molecules embedded within the polymer chain.

In certain embodiments, a structurally precise poly(propylene carbonate) is characterized in that it includes two polymer chain types, A and B, where the types differ in their terminating groups. In certain embodiments, polymer chain types A and B have the following formulae:

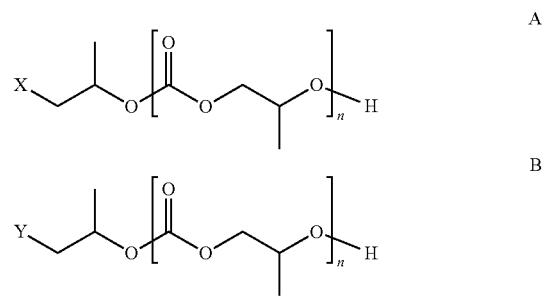

where n is as defined above, —X and —Y each represent a nucleophile that can ring-open an epoxide, and where —X and —Y are different.

In certain embodiments, X and Y are independently selected from the group consisting of halide, azide, or an optionally substituted group selected from the group consisting of carboxylate, sulfonate, phenol, and alkoxide. In certain embodiments, X is a halide and Y is an optionally substituted group selected from the group consisting of carboxylate, sulfonate, phenol, and alkoxide. In certain embodiments, X is a halide and Y is a carboxylate. In certain embodiments, X is chloride and Y is a carboxylate. In certain embodiments, X is chloride and Y is selected from the group consisting of: formate, acetate, benzoate, trifluoroacetate, and pentafluorobenzoate. In certain embodiments, X is chloride and Y is trifluoroacetate (shown below as structures $A^2$ and $B^2$).

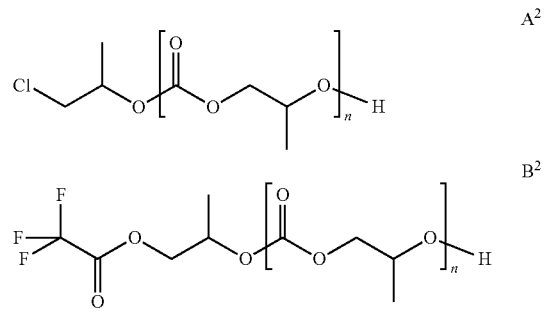

where n is as defined above.

In certain embodiments, the ratio between chain types A and B ranges from about 1:3 to about 3:1. In certain embodiments, the ratio between chain types A and B ranges from about 1:2 to about 2:1. In certain embodiments, structurally precise poly(propylene carbonate) includes an approximately equimolar mixture of chain types A and B. In certain embodiments, the structurally precise poly(propylene carbonate) includes an approximately equimolar mixture of chain types $A^2$ and $B^2$.

In certain embodiments, structurally precise poly(propylene carbonate) includes chains of type C:

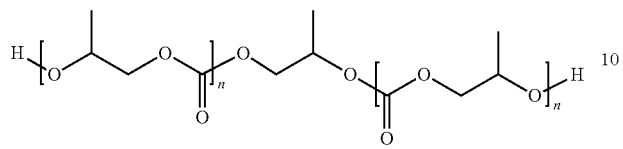

C where each n is independently as defined above.

In certain embodiments, the structurally precise poly(propylene carbonate) includes chains of type C in combination with chains of types A or A and B. In certain embodiments, the ratio of chains of type C to chains of types A or A and B ranges (e.g. the ratios C:A or C:[A+B]) from about 0.1:1 to about 100:1. In certain embodiments, this ratio is between about 1:1 and about 10:1. In certain embodiments, this ratio is between about 2:1 and about 5:1.

In some embodiments, the structurally precise poly(propylene carbonate) includes chains of type D which have a polymer initiation moiety embedded within them. In certain embodiments, an embedded polymer initiation moiety is located approximately in the center of the polycarbonate chains (in other words, the moiety is linked to two or more poly(propylene carbonate) chains where statistically each chain is of approximately equal length). In certain embodiments, chains of type D are linear polymer chains with two polycarbonate chains linked to an embedded polymer initiation moiety. In certain embodiments, chains of type D are star polymers with three or more polycarbonate chains linked to an embedded polymer initiation moiety.

In certain embodiments, chains of type D have a formula $D^1$:

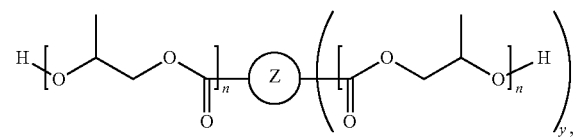

$D^1$ where each n is independently as defined above, y is an integer from 1 to 5 indicating how many additional individual polycarbonate chains are linked to the embedded polymer initiation moiety (e.g. the total number of poly(propylene carbonate) chains linked to the embedded polymer initiation moiety ranges from 2 to 6); and where Z is any polyfunctional molecule that can react with carbon dioxide at two or more sites to initiate a polymer chain (e.g. to form a carbonate, carbamate, thiocarbonate, or ester from an oxygen, nitrogen, sulfur, or carbon nucleophile respectively). In certain embodiments, the value of y for polymers of type $D^1$ is 1. In certain embodiments, the value of y for polymers of type $D^1$ is 2. In certain embodiments, the value of y for polymers of type $D^1$ is 3.

In some embodiments, chains of type D have a formula $D^2$:

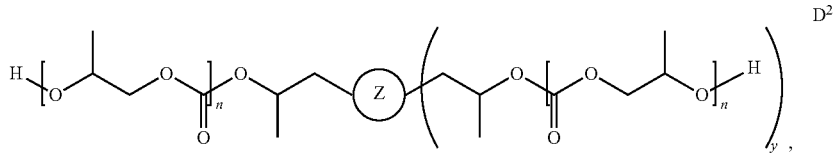

$D^2$ where each n is independently as defined above, y is an integer from 1 to 5 indicating how many additional individual polycarbonate chains are linked to the embedded polymer initiation moiety (e.g. the total number of poly(propylene carbonate) chains linked to the embedded polymer initiation moiety ranges from 2 to 6); and where Z is any polyfunctional molecule that can react at two or more sites with an epoxide to initiate formation of a polycarbonate chain (e.g. by an oxygen, nitrogen, sulfur, or carbon nucleophile respectively to form an ether, amine, thioether, or carbon-carbon bond, respectively). In certain embodiments, the value of y for polymers of type $D^2$ is 1. In certain embodiments, the value of y for polymers of type $D^2$ is 2. In certain embodiments, the value of y for polymers of type $D^2$ is 3.

In some embodiments, chains of type D have a formula $D^3$:

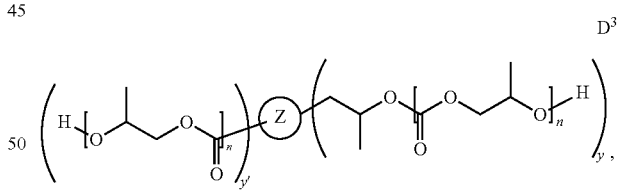

$D^3$ where each n is independently as defined above, y and y' are each independently an integer from 0 to 6 and the sum of y and y' is at least 2; and where Z is any polyfunctional molecule that can react at two or more sites with carbon dioxide or an epoxide to initiate formation of polycarbonate chains as described above for structures $D^1$ and $D^2$, respectively. In certain embodiments, the value of y' for polymers of type $D^3$ is 2. In certain embodiments, the value of y for polymers of type $D^3$ is 2. In certain embodiments, for polymers of type $D^3$ the value of one of y or y' is 2 and the value of the other is 0. In some embodiments, the sum of y and y' is greater than 2.

In certain embodiments, structurally precise poly(propylene carbonate) contains chains of formula A and chains of formula $D^3$ in a ratio from about 1:50 to about 50:1. In certain embodiments the ratio of chains of formula A to chains of formula $D^3$ ranges from 1:50 to 1:1. In certain embodiments the ratio of chains of formula A to chains of formula $D^3$ ranges from 1:10 to 10:1. In certain embodiments the ratio of chains of formula A to chains of formula $D^3$ ranges from 1:2 to 2:1.

In certain embodiments, structurally precise poly(propylene carbonate) contains at least 0.1% of chains $D^3$ where the sum of y and y' is greater than 2. In certain embodiments, the structurally precise poly(propylene carbonate) contains at least 0.5% and 20% of chains $D^3$ where the sum of y and y' is greater than 2.

In certain embodiments, structurally precise poly(propylene carbonate) includes chains of type D along with chains of type A. In certain embodiments, the structurally precise poly(propylene carbonate) includes chains of type D along with a mixture of chains of types A and B. In certain embodiments, the structurally precise poly(propylene carbonate) includes chains of type D along with chains of type C, and optionally also containing chains of types A or a mixture of types A and B.

In certain embodiments, structurally precise poly(propylene carbonate) includes chains of type $D^1$ wherein the embedded chain transfer moiety is a bound form of ethylene glycol (e.g. where Z is —OCH$_2$CH$_2$O—) and the resulting polymer chains have the formula $D^4$:

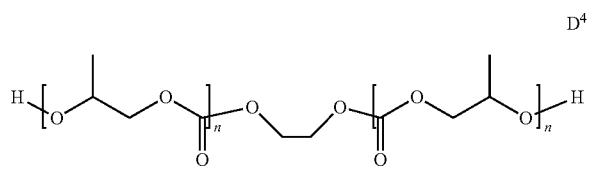

$D^4$ where each n is independently as defined above.

In certain embodiments, structurally precise poly(propylene carbonate) has approximately 10 to 90% of the chains with structure $D^4$ with the balance made up of chains of structures A, B, or C or mixtures of two or more of these.

In certain embodiments, structurally precise poly(propylene carbonate) includes chains of type $D^1$ wherein the embedded chain transfer moiety is a bound form of dipropylene glycol (which may be a mixture of isomers) and the resulting polymer chains have the formula $D^5$:

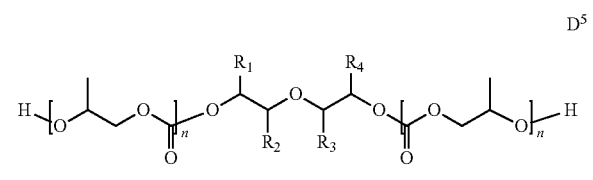

$D^5$ where each n is independently as defined above, one of $R_1$ and $R_2$ is methyl and the other is hydrogen and one of $R_3$ and $R_4$ is methyl and the other is hydrogen (e.g. Z in formula $D^1$ has one of the following structures:

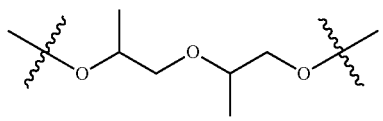

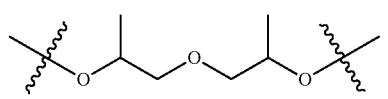

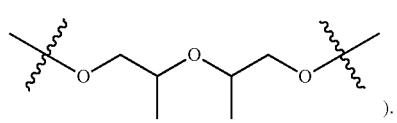

).

In certain embodiments, structurally precise poly(propylene carbonate) has approximately 10 to 90% of the chains with structure $D^5$ with the balance made up of chains of structures A, B, or C or mixtures of two or more of these.

In certain embodiments, structurally precise poly(propylene carbonate) includes chains of type $D^1$ wherein the embedded chain transfer moiety is a bound form of 1,3 propane diol (e.g. where Z is —OCH$_2$CH$_2$CH$_2$O—) and the resulting polymer chains have the formula $D^6$:

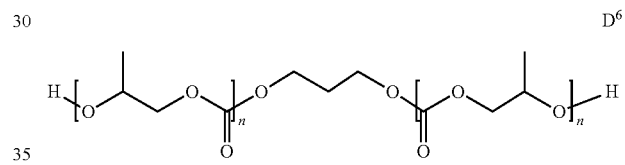

$D^6$ where each n is independently as defined above.

In certain embodiments, structurally precise poly(propylene carbonate) has approximately 10 to 90% of the chains with structure $D^6$ with the balance made up of chains of structures A, B, or C or mixtures of two or more of these.

In certain embodiments, structurally precise poly(propylene carbonate) includes chains of type $D^3$ wherein the embedded chain transfer moiety is a bound form of glycolic acid and the resulting polymer chains have the formula $D^7$:

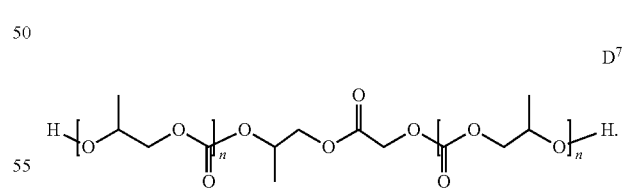

$D^7$

In certain embodiments, structurally precise poly(propylene carbonate) has approximately 10 to 90% of the chains with structure $D^7$ with the balance made up of structures A, B, or C or mixtures of two or more of these.

In certain embodiments, structurally precise poly(propylene carbonate) includes chains of type $D^3$ wherein the embedded chain transfer moiety is a bound form of propoxylated glycerol and the resulting polymer chains have the formula $D^8$:

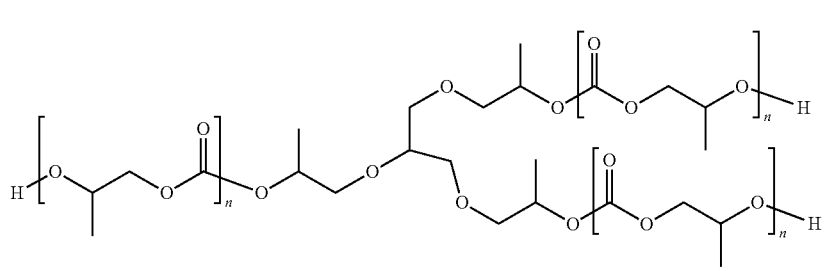

where each n is independently as defined above.

In certain embodiments, structurally precise poly(propylene carbonate) has approximately 10 to 90% of the chains with structure $D^9$ with the balance made up of chains of structures A, B, or C or mixtures of two or more of these.

In certain embodiments, structurally precise poly(propylene carbonate) includes chains of type $D^3$ wherein the embedded chain transfer moiety is a bound form of propoxylated pentaerythritol and the resulting polymer chains have the formula $D^9$:

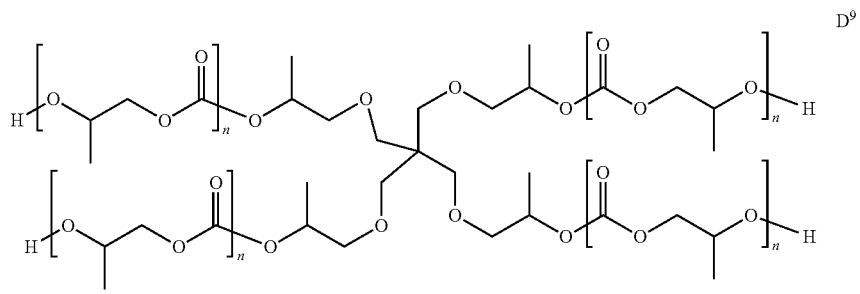

where each n is independently as defined above.

In certain embodiments, structurally precise poly(propylene carbonate) has approximately 10 to 90% of the chains with structure $D^9$ with the balance made up of chains of structures A, B, or C or mixtures of two or more of these.

In certain embodiments, structurally precise poly(propylene carbonate) includes chains of type $D^3$ wherein the embedded chain transfer moiety is a bound form of polyethylene glycol or polypropylene glycol and the resulting polymer chains have the formula $D^{10}$:

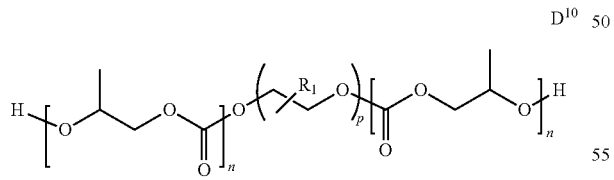

where each n is independently as defined above, p is an integer from 2 to 200 inclusive, and $R^1$ is optionally present, and if present is methyl.

In certain embodiments, the structurally precise poly(propylene carbonate) has approximately 10 to 90% of the chains with structure $D^{10}$ with the balance made up of chains of structures A, B, or C or mixtures of two or more of these.

In certain embodiments, the structurally precise poly(propylene carbonate) includes chains of type $D^3$ wherein the embedded chain transfer moiety is a bound form of an optionally unsubstituted diacid. In certain embodiments the diacid is a straight chain saturated diacid and the resulting polymer chains have the formula $D^{11}$:

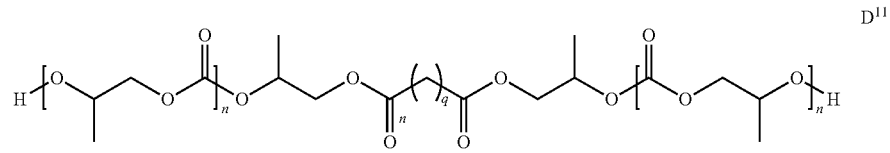

where each n is independently as defined above, and q is an integer from 0 to 32 inclusive.

In certain embodiments, structurally precise poly(propylene carbonate) has approximately 10 to 90% of the chains with structure $D^{11}$ with the balance made up of chains of structures A, B, or C or mixtures of two or more of these.

In certain embodiments, structurally precise poly(propylene carbonate) includes two or more varieties of chains of type D differentiated from each other by the identity of the embedded chain transfer moiety. In certain embodiments, the structurally precise poly(propylene carbonate) includes polymer chains of type $D^4$ along with one or more additional different chain D types. In certain embodiments, the structurally precise poly(propylene carbonate) includes polymer chains of type $D^5$ along with one or more additional different chain D types. In certain embodiments, the structurally precise poly(propylene carbonate) includes polymer chains of type $D^6$ along with one or more additional different chain D types. In certain embodiments, the structurally precise poly(propylene carbonate) includes polymer chains of type $D^7$ along with one or more additional different chain D types. In certain embodiments, the structurally precise poly(propylene carbonate) includes polymer chains of type $D^8$ along with one or more additional different chain D types. In certain embodiments, the structurally precise poly(propylene carbonate) includes polymer chains of type $D^9$ along with one or more additional different chain D types.

In certain embodiments, structurally precise poly(propylene carbonate) includes polymer chains of type C along with chains of type D. In certain embodiments, the structurally precise poly(propylene carbonate) includes polymer chains of type C along with chains of type $D^4$. In certain embodiments, the structurally precise poly(propylene carbonate) includes polymer chains of type C along with chains of type $D^5$. In certain embodiments, the structurally precise poly(propylene carbonate) includes polymer chains of type C along with chains of type $D^6$. In certain embodiments, the structurally precise poly(propylene carbonate) includes polymer chains of type C along with chains of type $D^7$. In certain embodiments, the structurally precise poly(propylene carbonate) includes polymer chains of type C along with chains of type $D^8$. In certain embodiments, the structurally precise poly(propylene carbonate) includes polymer chains of type C along with chains of type $D^9$. In certain embodiments, the structurally precise poly(propylene carbonate) includes polymer chains of type A along with chains of types C and D. In certain embodiments, the structurally precise poly(propylene carbonate) includes polymer chains of type A and B along with chains of types C and D.

In certain embodiments, structurally precise poly(propylene carbonate) includes chains of type C along with chain types A or A and B. In certain embodiments, the structurally precise poly(propylene carbonate) includes predominantly chains of type C along with lesser amounts of chain types A or A and B. In certain embodiments, the structurally precise poly(propylene carbonate) includes a majority (e.g. >50%, >60%, >70%, >80%, or >90%) of chains of type C along with lesser amounts of chains of type A. In certain embodiments, the structurally precise poly(propylene carbonate) includes a majority (e.g. >50%, >60%, >70%, >80%, or >90%) of chains of type C along with lesser amounts of a mixture of chains of types A and B. In certain embodiments, the structurally precise poly(propylene carbonate) includes a majority (e.g. >50%, >60%, >70%, >80%, or >90%) of chains of types C and D along with lesser amounts of a mixture of chains of types A and B.

In some embodiments, structurally precise poly(propylene carbonate) includes about 30 to 80% of polymer chains selected from chains of structure C and D or a mixture of C and D, and 20 to 70% of chains selected from structures A, B, or a mixture of A and B.

In certain embodiments, PPC has equal proportions of $A^2$ and $B^2$ (e.g. a 1:1 ratio between $A^2$ chains and $B^2$ chains) along with any proportion of one or more chain types C and/or D. In certain embodiments, the PPC contains about equal proportions of four chain types having structures $A^2$, $B^2$, C, and $D^4$. In certain embodiments, the PPC has approximately equal proportions of $A^2$ $B^2$ and $D^4$ (e.g. approximately a 1:1:1 ratio between $A^2$ chains $B^2$ chains and $D^4$ chains) along with any proportion of chains type C. In certain embodiments, the PPC contains approximately 10 to 90% of each of chain types $A^2$, $B^2$, C and $D^4$.

In certain embodiments, PPC has approximately equal proportions of $A^2$, $B^2$ and $D^5$ (e.g. approximately a 1:1:1 ratio between $A^2$ chains $B^2$ chains and $D^5$ chains) along with any proportion of chains type C. In certain embodiments, the PPC contains approximately 10 to 90% of each of chain types $A^2$, $B^2$, C and $D^5$.

In certain embodiments, PPC has approximately equal proportions of $A^2$, $B^2$ and $D^6$ (e.g. approximately a 1:1:1 ratio between $A^2$ chains $B^2$ chains and $D^6$ chains) along with any proportion of chains type C. In certain embodiments, the PPC contains approximately 10 to 90% of each of chain types $A^2$, $B^2$, C and $D^6$.

In certain embodiments, PPC has approximately equal proportions of $A^2$, $B^2$ and $D^7$ (e.g. approximately a 1:1:1 ratio between $A^2$ chains $B^2$ chains and $D^7$ chains) along with any proportion of chains type C. In certain embodiments, the PPC contains approximately 10 to 90% of each of chain types $A^2$, $B^2$, C and $D^7$.

In certain embodiments, PPC has approximately equal proportions of $A^2$, $B^2$ and $D^8$ (e.g. approximately a 1:1:1 ratio between $A^2$ chains $B^2$ chains and $D^8$ chains) along with any proportion of chains type C. In certain embodiments, the PPC contains approximately 10 to 90% of each of chain types $A^2$, $B^2$, C and $D^8$.

In certain embodiments, PPC has approximately equal proportions of $A^2$, $B^2$ and $D^9$ (e.g. approximately a 1:1:1 ratio between $A^2$ chains $B^2$ chains and $D^9$ chains) along with any proportion of chains type C. In certain embodiments, the PPC contains approximately 10 to 90% of each of chain types $A^2$, $B^2$, C and $D^9$.

In certain embodiments, PPC has approximately equal proportions of $A^2$, $B^2$ and $D^{10}$ (e.g. approximately a 1:1:1 ratio between $A^2$ chains $B^2$ chains and $D^{10}$ chains) along with any proportion of chains type C. In certain embodiments, the PPC contains approximately 10 to 90% of each of chain types $A^2$, $B^2$, C and $D^{10}$.

In certain embodiments, PPC has approximately equal proportions of $A^2$, $B^2$ and $D^{11}$ (e.g. approximately a 1:1:1 ratio between $A^2$ chains $B^2$ chains and $D^{11}$ chains) along with any proportion of chains type C. In certain embodiments, the PPC contains approximately 10 to 90% of each of chain types $A^2$, $B^2$, C and $D^{11}$.

In certain embodiments, where the structurally precise PPC includes two or more chain types (e.g. any of structures A through $D^{11}$), the value of n at each occurrence is approximately the same.

In certain embodiments, any of the structures A through $D^{11}$ described above may be modified. In certain embodiments, this may be done by performing chemistry post-polymerization on the terminal hydroxyl group(s). In certain embodiments, the structurally precise poly(propylene carbonate) may contain chains of type A through $D^{11}$, where the terminating groups are esters, ethers, carbamates, sulfonates, or carbonates. In certain embodiments, these derivatives may be formed by reaction with acylating agents to provide groups such as acetate, trifluoroacetate, benzoate or pentafluorobenzoate. In some embodiments, hydroxyl groups may be reacted with isocyanates to form carbamates, with silyl halides or silyl sulfonates to form silyl ethers, with alkyl halides or alkyl sulfonates to form ethers, or with sulfonyl halides or anhydrides to form sulfonates.

Examples A1 through A4 describe methods of making structurally precise PPC. By using different chain transfer agents and controlling the amount of water present in the reactions, the identity and relative ratios of chain types in the samples are changed.

Example A1: Synthesis of PPC Including Chains of $B^2$ and C

A 1-liter Parr reactor was charged with 200 grams propylene oxide containing 33 ppm water, 123 mg of racemic N,N'-Bis(3,5-di-tert-butylsalicylidene)-1,2-cyclohexanediamino cobalt(III) trifluoroacetate (salcyCoTFA) catalyst and 112 mg bis(triphenylphosphine)iminium trifluoroacetate (PPN-TFA) co-catalyst. The reactor was sealed, pressurized to 100 psi with $CO_2$, and agitated at 250 rpm while the temperature was maintained at 35° C. After 23 hours, the polymerization was quenched with 2.1 equivs of methane sulfonic acid (MSA) in 200 g acetone. The reaction mixture was distilled to remove unreacted propylene oxide and the sample was then precipitated in 50/50 MeOH/$H_2O$ to isolate the solid polymer. The recovered polymer was dried in a vacuum oven, then redissolved at 20 wt % into acetone, and precipitated a second time. Recovered polymer was dried in 75° C. vacuum oven for 8 hours. GPC analysis revealed the PPC sample resulting from Example 1 has a bimodal molecular weight distribution and contains approximately equal populations of chains with Mw of 230.8 kg/mol and 110 kg/mol, corresponding to chains of types C and $B^2$ respectively.

Example 1a: Synthesis of PPC Including Chains of $A^2$, $B^2$, and C

The PPC of this example is produced under conditions identical to Example 1, except 104 mg of bis(triphenylphosphine)iminium chloride (PPN-Cl) was substituted for the PPN-TFA). The presence and relative abundances of chains of types $A^2$ and $B^2$ can be detected by analytical methods to detect chlorine and fluorine. Suitable methods are known in the art and include mass spectroscopy and fluorine NMR among others.

Example 2: Synthesis of PPC Including Chains of $B^2$, C, and $D^5$

A 1-liter Parr reactor was charged with 200 grams propylene oxide containing 33 ppm water, 58 mg of dipropylene glycol, 123 mg of salcyCoTFA catalyst and 112 mg PPN-TFA co-catalyst. The reactor was sealed, pressurized to 100 psi with $CO_2$, and agitated at 250 rpm while the temperature was maintained at 35° C. After 23 hours, the polymerization was quenched with 2.1 equivs of methane sulfonic acid (MSA) in 200 g acetone. The reaction mixture was distilled to remove unreacted propylene oxide and the sample was then precipitated in 50/50 MeOH/$H_2O$ to isolate the solid polymer. The recovered polymer was dried in a vacuum oven, then redissolved at 20 wt % into acetone, and precipitated a second time. Recovered polymer was dried in 75° C. vacuum oven for 8 hours.

Example 3: Synthesis of PPC Including Chains of $B^2$, C, and $D^8$

This material was produced under conditions identical to those described in Example 2 except 76 mg glycerol propoxylate was substituted for the dipropylene glycol.

Example 4: Synthesis of PPC Including Chains of $B^2$, C, and $D^9$

This material was produced under conditions identical to those described in Example 2 except 92 mg pentaerythritol propoxylate was substituted for the dipropylene glycol.

Gel permeation chromatography (GPC) was performed on the polymers from Examples 2 through 4. The polymer resulting from Example 2 has a bimodal molecular weight distribution and contains predominantly chains with $M_w$ of approximately 120 kg/mol (a mixture of chains of type $D^5$ and C) with a smaller population of chains with $M_w$ of approximately 60 kg/mol, corresponding to a mixture of chains of type $B^2$. For the polymer from Example 2, the $M_n$ was about 92 kg/mol, the $M_w$ was about 118 kg/mol, and the PDI was about 1.29. The samples from Examples 3 and 4 each show a characteristic trimodal molecular weight distribution in the GPC. The three components correspond to chains of type $B^2$ (the low molecular weight population), a middle population containing chains of type C and a high $M_w$ population corresponding to chains of type $D^8$ (Example 3) or $D^9$ (Example 4). For the polymer from Example 3, the $M_n$ was about 90 kg/mol, the $M_w$ was about 127 kg/mol, and the PDI was about 1.42. For the polymer from Example 4, the $M_n$ was about 115 kg/mol, the $M_w$ was about 185 kg/mol, and the PDI was about 1.61.

The ratio of these chain types can be manipulated using the methods disclosed in the preceding examples or by physical blending of samples having different chain types to provide PPC compositions with varying melt flow indices (MFIs). In certain applications having a higher MFI can be advantageous for injection molding and extrusion operations to make plastic articles of the present invention. The PPC of Example 2 was found to have an MFI of 2.56 g/10 min when measured at 170° C. at 2.16 kg. Under the same conditions, the PPC of Example 3 was found to have an MFI of 2.35 g/10 min while that of Example 4 was found to be 0.79 g/10 min. It will be appreciated that the skilled artisan can use these trends to formulate PPC compositions with a range of melt flow properties.

PPC was passed through an extruder at 170° C. and injection molded to make tensile bars and extruded into films of various thicknesses. Attempts were made to treat prior art PPC available commercially under the trade name QPAC, but the prior art material was either unable to be processed under these conditions or yielded films and tensile bars with that were extremely soft and lacked the structural integrity exhibited by the samples of the inventive PPC. Without being bound by any theory or thereby limiting the scope of the claimed invention, it is believed this may be due to thermal degradation of the commercial PPC during the extrusion process at these temperatures.

APPENDIX B

Description of PEC compositions suitable for use in certain embodiments of the invention.

In certain embodiments, the PEC is characterized in that it has a high percentage of carbonate linkages. In some embodiments, the PPC is characterized in that it has a narrow polydispersity index. In certain embodiments, the PPC is characterized in that it contains very low levels of cyclic carbonate.

In those embodiments where the structurally precise poly(ethylene carbonate) is characterized by a high percentage of carbonate linkages, polymers have on average greater than about 90% of adjacent monomer units connected via carbonate linkages and less than about 10% ether linkages. In certain embodiments, on average in provided polymer blends and films, greater than about 95% of adjacent monomer units in the PEC connected via carbonate linkages. In some embodiments, on average in provided polymer blends and films, greater than about 97% of adjacent monomer units in the PEC are connected via carbonate linkages. In some embodiments, on average in provided polymer blends and films, greater than about 99% of adjacent monomer units in the PEC are connected via carbonate linkages. In some embodiments, on average in provided polymer blends and films, essentially all adjacent monomer units in the PEC are connected via carbonate linkages. In certain embodiments, polymer blends and films may contain polyether portions formed in a separate process from the carbonate chains, and in such cases the ether linkages of the polyether portions are to be understood to be distinct from the ether linkages described above which typically arise from imperfect copolymerization of $CO_2$ and propylene oxide.

In those embodiments where the poly(ethylene carbonate) is characterized by a narrow polydispersity index (PDI), the PEC has a PDI less than about 2. In certain embodiments, the PEC has a PDI less than about 1.8. In some embodiments, the PEC has a PDI less than about 1.5. In some embodiments, the PEC has a PDI less than about 1.4, less than about 1.2 or less than about 1.1. In certain embodiments, the PEC has a PDI between about 1.0 and about 1.2.

In those embodiments where the poly(ethylene carbonate) is characterized by a low cyclic carbonate content, the PEC has a cyclic carbonate content less than about 5%. In certain embodiments, the PEC contains less than 5% propylene carbonate. In some embodiments, the PEC contains less than 3% propylene carbonate. In some embodiments, the PEC contains less than 1% propylene carbonate. In certain embodiments, the PEC contains essentially no propylene carbonate.

In some embodiments, structurally the precise poly(ethylene carbonate) is characterized in that it possesses a combination of two or more characteristics selected from the group consisting of a high percentage of carbonate linkages, a narrow polydispersity index, and a low cyclic carbonate content. In some embodiments, the poly(ethylene carbonate) is characterized in that it has a combination of a narrow polydispersity index and high percentage of carbonate linkages. In some embodiments, the poly(ethylene carbonate) is characterized in that it has a combination of a high percentage of carbonate linkages, and a low cyclic content. In some embodiments, the poly(ethylene carbonate) is characterized in that it has a combination of a narrow polydispersity index, and a low cyclic content.

The poly(ethylene carbonate) may have a range of molecular weights in the polymer blends and polymer films. For specific applications it may be desirable to use a higher or lower molecular weight material to obtain the optimum combination of performance and processing characteristics. Such selection processes are well known to the skilled artisan. The molecular weight of the polymer can be represented by the molecular weight number ($M_n$). High molecular weight PEC as described herein generally has an $M_n$ greater than about $5 \times 10^4$ g/mol. Low molecular weight PEC as described herein has an $M_n$ between about $1 \times 10^3$ and about $5 \times 10^4$ g/mol.

In certain embodiments, the poly(ethylene carbonate) is a thermoplastic having a relatively high $M_n$. In certain embodiments, the thermoplastic poly(ethylene carbonate) has an $M_n$ above about $5 \times 10^4$ g/mol. In certain embodiments, the poly(ethylene carbonate) has an $M_n$ above about $1 \times 10^5$ g/mol. In certain embodiments, the poly(ethylene carbonate) has an $M_n$ between about $5 \times 10^4$ g/mol and about $2 \times 10^7$ g/mol.

In certain embodiments, polymer blends and films include poly(ethylene carbonate) having a molecular weight between about 40,000 and about 400,000 g/mol. In certain embodiments, polymer blends and films include poly(ethylene carbonate) having a molecular weight between about 50,000 and about 350,000 g/mol. In certain embodiments, polymer blends and films include poly(ethylene carbonate) having a molecular weight between about 100,000 and about 300,000 g/mol. In certain embodiments, the $M_n$ is in the range of about 150,000 and about 250,000 g/mol. In some embodiments, the poly(ethylene carbonate) has an $M_n$ between about 160,000 and about 240,000 g/mol. In certain embodiments, the poly(ethylene carbonate) has an $M_n$ between about 180,000 and about 220,000 g/mol. In certain embodiments, the poly(ethylene carbonate) has an $M_n$ of about 180,000 g/mol.

In certain embodiments, the poly(ethylene carbonate) has the following combination of properties: an $M_n$ in the range of about 60,000 to about 400,000 g/mol; a carbonate linkage content above 95%, a polydispersity index less than about 1.5, and a cyclic carbonate content below about 5%.

In some embodiments, the poly(ethylene carbonate) has the following combination of properties: an $M_n$ in the range of about 60,000 to about 100,000 g/mol; a carbonate linkage content above 95%, a polydispersity index less than about 1.5, and a cyclic carbonate content below about 5%.

In certain embodiments, the poly(ethylene carbonate) has the following combination of properties: an $M_n$ of about 80,000 g/mol, a carbonate linkage content above 98%, a polydispersity index less than about 1.2, and a cyclic carbonate content below about 2%.

In some embodiments, the poly(ethylene carbonate) has the following combination of properties: an $M_n$ in the range of about 120,000 to about 250,000 g/mol, a carbonate linkage content above 95%, a polydispersity index less than about 1.5, and a cyclic carbonate content below about 5%.

In certain embodiments, the poly(ethylene carbonate) has the following combination of properties: an $M_n$ of about 180,000 g/mol, a carbonate linkage content above 98%, a polydispersity index less than about 1.2, and a cyclic carbonate content below about 2%.

In certain embodiments, the PEC includes a blend of two or more PEC compositions characterized in that each PEC composition in the blend has a different average molecular weight. In certain embodiments, the polycarbonate component includes a blend of high molecular weight PEC having an $M_n$ between about 150,000 and about 400,000 g/mol with a lower molecular weight PEC having an $M_n$ below about 100,000 g/mol. In certain embodiments, the polycarbonate component includes a blend of high molecular weight PEC having an $M_n$ between about 150,000 and about 250,000 g/mol with a lower molecular weight PEC having an $M_n$ between about 30,000 g/mol and about 80,000 g/mol. In certain embodiments, each component of such blends has a narrow polydispersity. In certain embodiments, the PDI of the high molecular weight and low molecular weight components of a blend are each less than 1.2 when measured independently. In certain embodiments, such blends are produced by mixing discrete samples of PEC polymer having low and high molecular weights.

In certain embodiments, the poly(ethylene carbonate) has a glass transition temperature ($T_g$) above 40° C. In certain embodiments, the poly(ethylene carbonate) has a glass transition temperature ($T_g$) above 41° C. In certain embodiments, the poly(ethylene carbonate) has a glass transition temperature ($T_g$) above 42° C. In certain embodiments, the poly(ethylene carbonate) has a glass transition temperature ($T_g$) above 43° C. In certain embodiments, the poly(ethylene carbonate) has a glass transition temperature ($T_g$) above 44° C. In certain embodiments, the poly(ethylene carbonate) has a glass transition temperature ($T_g$) above 45° C.

In certain embodiments, the poly(ethylene carbonate) is formed using catalysts other than zinc-containing catalysts. In certain embodiments, the poly(ethylene carbonate) contains no detectable zinc residue.

In some embodiments, the aliphatic polycarbonates are obtained by copolymerization of epoxides and carbon dioxide in the presence of transition metal catalysts. In certain embodiments, the poly(ethylene carbonate) is formed using metal salen catalysts. In certain embodiments, the poly(ethylene carbonate) is formed using cobalt salen catalysts. Suitable catalysts and methods include those described in U.S. Pat. No. 7,304,172 and in published PCT Application No. WO/2010/022388A2 the entire content of each of which is incorporated herein by reference.

In some embodiments, poly(ethylene carbonate) includes polymer chains having a structure represented by formula 1:

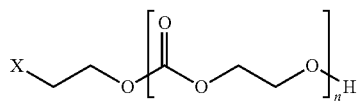

where X is a moiety corresponding to the bound form of any nucleophile that can ring-open an epoxide and n is an integer from about 10 to about 40,000. In certain embodiments, X in structure 1 is selected from the group consisting of halide, azide, or an optionally substituted group consisting from the group of carboxylate, sulfonate, phenol, and alkoxide. In some embodiments, n is from about 50 to about 3,000.

In certain embodiments, poly(ethylene carbonate) polymers are present as a mixture of two or more different polymer chain types, where the different chain types are distinguished by the presence of two or more different chain terminating groups and/or the presence, absence, or differences in small molecule polymer initiation molecules embedded within the polymer chain.

In certain embodiments, poly(ethylene carbonate) is characterized in that it includes two polymer chain types, 1A and 1B, where the types differ in their terminating groups. In certain embodiments, the polymer chain types 1A and 1B have the following formulae:

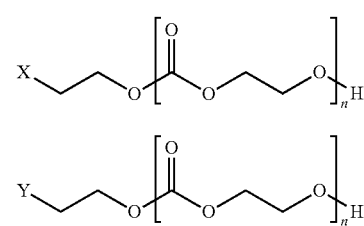

where n is as defined above, —X and —Y each represent a nucleophile that can ring-open an epoxide, and where —X and —Y are different.

In certain embodiments, X and Y are independently selected from the group consisting of halide, azide, or an optionally substituted group selected from the group consisting of carboxylate, sulfonate, phenol, and alkoxide. In certain embodiments, X is a halide and Y is an optionally substituted group selected from the group consisting of carboxylate, sulfonate, phenol, and alkoxide. In certain embodiments, X is a halide and Y is a carboxylate. In certain embodiments, X is chloride and Y is a carboxylate. In certain embodiments, X is chloride and Y is selected from the group consisting of: formate, acetate, benzoate, trifluoroacetate, and pentafluorobenzoate. In certain embodiments, X is chloride and Y is trifluoroacetate (shown below as structures $1A^2$ and $1B^2$).

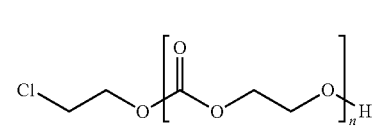

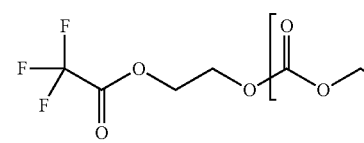

where n is as defined above.

In certain embodiments, the ratio between chain types 1A and 1B ranges from about 1:3 to about 3:1. In certain embodiments, the ratio between chain types 1A and 1B ranges from about 1:2 to about 2:1. In certain embodiments, the poly(ethylene carbonate) includes an approximately equimolar mixture of chain types 1A and 1B. In certain embodiments, the poly(ethylene carbonate) includes an approximately equimolar mixture of chain types $1A^2$ and $1B^2$.

In certain embodiments, poly(ethylene carbonate) includes chains of type 1C:

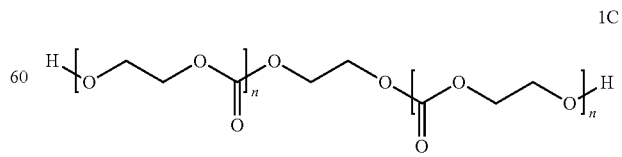

where each n is independently as defined above.

In certain embodiments, poly(ethylene carbonate) includes chains of type 1C in combination with chains of types 1A or 1A and 1B. In certain embodiments, the ratio of chains of type 1C to chains of types 1A or 1A and 1B ranges (e.g. the ratios 1C: 1A or 1C:[1A+1B]) from about 0.1:1 to about 100:1. In certain embodiments, this ratio is between about 1:1 and about 10:1. In certain embodiments, this ratio is between about 2:1 and about 5:1.

In some embodiments, poly(ethylene carbonate) includes chains of type 1D which have a polymer initiation moiety embedded within them. In certain embodiments, an embedded polymer initiation moiety is located approximately in the center of the polycarbonate chains (in other words, the moiety is linked to two or more poly(ethylene carbonate) chains where statistically each chain is of approximately equal length). In certain embodiments, chains of type 1D are linear polymer chains with two polycarbonate chains linked to an embedded polymer initiation moiety. In certain embodiments, chains of type 1D are star polymers with three or more polycarbonate chains linked to an embedded polymer initiation moiety.

In certain embodiments, chains of type 1D have a formula $1D^1$:

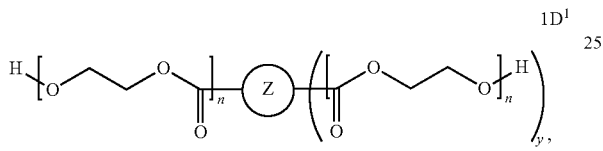

where each n is independently as defined above, y is an integer from 1 to 5 indicating how many additional individual polycarbonate chains are linked to the embedded polymer initiation moiety (e.g. the total number of poly(ethylene carbonate) chains linked to the embedded polymer initiation moiety ranges from 2 to 6); and where Z is any polyfunctional molecule that can react with carbon dioxide at two or more sites to initiate a polymer chain (e.g. to form a carbonate, carbamate, thiocarbonate, or ester from an oxygen, nitrogen, sulfur, or carbon nucleophile respectively). In certain embodiments, the value of y for polymers of type $1D^1$ is 1. In certain embodiments, the value of y for polymers of type $1D^1$ is 2. In certain embodiments, the value of y for polymers of type $1D^1$ is 3.

In some embodiments, chains of type 1D have a formula $1D^2$:

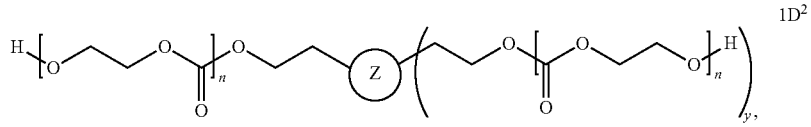

where each n is independently as defined above, y is an integer from 1 to 5 indicating how many additional individual polycarbonate chains are linked to the embedded polymer initiation moiety (e.g. the total number of poly(ethylene carbonate) chains linked to the embedded polymer initiation moiety ranges from 2 to 6); and where Z is any polyfunctional molecule that can react at two or more sites with an epoxide to initiate formation of a polycarbonate chain (e.g. by an oxygen, nitrogen, sulfur, or carbon nucleophile respectively to form an ether, amine, thioether, or carbon-carbon bond, respectively). In certain embodiments, the value of y for polymers of type $1D^2$ is 1. In certain embodiments, the value of y for polymers of type $1D^2$ is 2. In certain embodiments, the value of y for polymers of type $1D^2$ is 3.

In some embodiments, chains of type 1D have a formula $1D^3$:

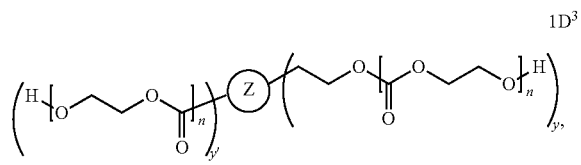

where each n is independently as defined above, y and y' are each independently an integer from 0 to 6 and the sum of y and y' is at least 2; and where Z is any polyfunctional molecule that can react at two or more sites with carbon dioxide or an epoxide to initiate formation of polycarbonate chains as described above for structures $1D^1$ and $1D^2$, respectively. In certain embodiments, the value of y' for polymers of type $1D^3$ is 2. In certain embodiments, the value of y for polymers of type $1D^3$ is 2. In certain embodiments, for polymers of type $1D^3$ the value of one of y or y' is 2 and the value of the other is 0. In some embodiments, the sum of y and y' is greater than 2.

In certain embodiments, poly(ethylene carbonate) contains chains of formula 1A and chains of formula $1D^3$ in a ratio from about 1:50 to about 50:1. In certain embodiments the ratio of chains of formula 1A to chains of formula $1D^3$ ranges from 1:50 to 1:1. In certain embodiments the ratio of chains of formula 1A to chains of formula $1D^3$ ranges from 1:10 to 10:1. In certain embodiments the ratio of chains of formula 1A to chains of formula $1D^3$ ranges from 1:2 to 2:1.

In certain embodiments, poly(ethylene carbonate) contains at least 0.1% of chains $1D^3$ where the sum of y and y' is greater than 2. In certain embodiments, the poly(ethylene carbonate) contains at least 0.5% and 20% of chains $1D^3$ where the sum of y and y' is greater than 2.

In certain embodiments, poly(ethylene carbonate) includes chains of type 1D along with chains of type 1A. In certain embodiments, the poly(ethylene carbonate) includes chains of type 1D along with a mixture of chains of types 1A and 1B. In certain embodiments, the poly(ethylene carbonate) includes chains of type D along with chains of type C, and optionally also containing chains of types 1A or a mixture of types 1A and 1B.

In certain embodiments, poly(ethylene carbonate) includes chains of type $1D^1$ wherein the embedded chain transfer moiety is a bound form of ethylene glycol (e.g. where Z is —$OCH_2CH_2O$—) and the resulting polymer chains have the formula $1D^4$:

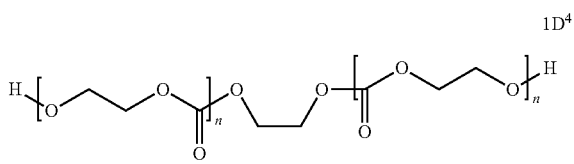

1D⁴ where each n is independently as defined above.

In certain embodiments, poly(ethylene carbonate) has approximately 10 to 90% of the chains with structure 1D⁴ with the balance made up of chains of structures 1A, 1B, or C or mixtures of two or more of these.

In certain embodiments, poly(ethylene carbonate) includes chains of type 1D¹ wherein the embedded chain transfer moiety is a bound form of dipropylene glycol (which may be a mixture of isomers) and the resulting polymer chains have the formula 1D⁵:

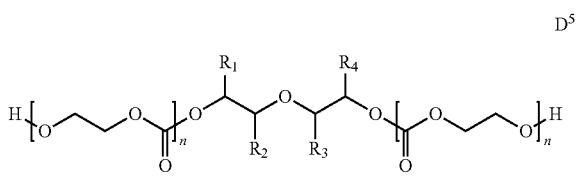

D⁵ where each n is independently as defined above, one of $R_1$ and $R_2$ is methyl and the other is hydrogen and one of $R_3$ and $R_4$ is methyl and the other is hydrogen (e.g. Z in formula $D^1$ has one of the following structures:

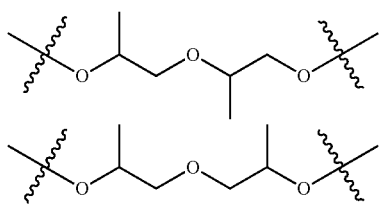

-continued

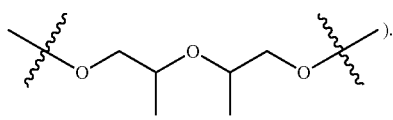

In certain embodiments, poly(ethylene carbonate) has approximately 10 to 90% of the chains with structure 1D⁵ with the balance made up of chains of structures 1A, 1B, or 1C or mixtures of two or more of these.

In certain embodiments, poly(ethylene carbonate) includes chains of type 1D¹ wherein the embedded chain transfer moiety is a bound form of 1,3 propane diol (e.g. where Z is —OCH₂CH₂CH₂O—) and the resulting polymer chains have the formula 1D⁶:

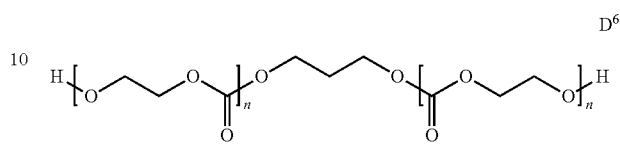

D⁶ where each n is independently as defined above.

In certain embodiments, poly(ethylene carbonate) has approximately 10 to 90% of the chains with structure 1D⁶ with the balance made up of chains of structures 1A, 1B, or 1C or mixtures of two or more of these.

In certain embodiments, poly(ethylene carbonate) includes chains of type 1D³ wherein the embedded chain transfer moiety is a bound form of glycolic acid and the resulting polymer chains have the formula 1D⁷:

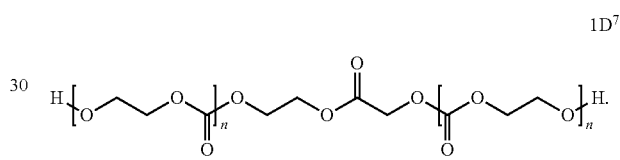

1D⁷

In certain embodiments, poly(ethylene carbonate) has approximately 10 to 90% of the chains with structure 1D⁷ with the balance made up of chains of structures 1A, 1B, or 1C or mixtures of two or more of these.

In certain embodiments, poly(ethylene carbonate) includes chains of type 1D³ wherein the embedded chain transfer moiety is a bound form of propoxylated glycerol and the resulting polymer chains have the formula 1D⁸:

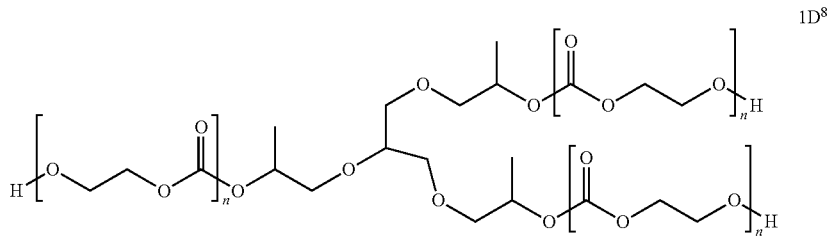

1D⁸ where each n is independently as defined above.

In certain embodiments, poly(ethylene carbonate) has approximately 10 to 90% of the chains with structure 1D⁹ with the balance made up of chains of structures 1A, 1B, or C or mixtures of two or more of these.

In certain embodiments, poly(ethylene carbonate) includes chains of type 1D³ wherein the embedded chain transfer moiety is a bound form of propoxylated pentaerythritol and the resulting polymer chains have the formula 1D⁹:

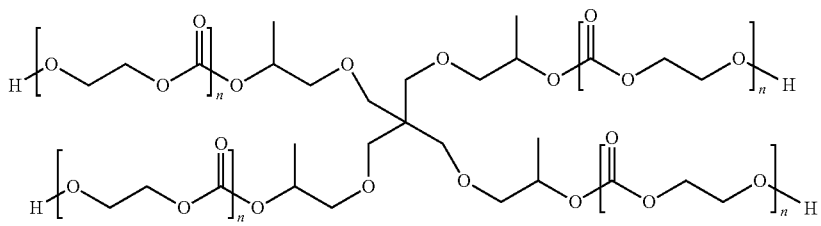

1D⁹ where each n is independently as defined above.

In certain embodiments, poly(ethylene carbonate) has approximately 10 to 90% of the chains with structure 1D⁹ with the balance made up of chains of structures 1A, 1B, or C or mixtures of two or more of these.

In certain embodiments, poly(ethylene carbonate) includes chains of type 1D³ wherein the embedded chain transfer moiety is a bound form of polyethylene glycol or polypropylene glycol and the resulting polymer chains have the formula 1D¹⁰:

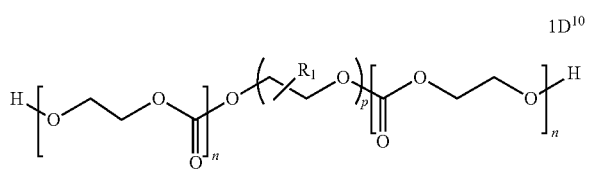

1D¹⁰ where each n is independently as defined above, p is an integer from 2 to 200 inclusive, and R¹ is optionally present, and if present is methyl.

In certain embodiments, poly(ethylene carbonate) has approximately 10 to 90% of the chains with structure 1D¹⁰ with the balance made up of chains of structures 1A, 1B, or 1C or mixtures of two or more of these.

In certain embodiments, poly(ethylene carbonate) includes chains of type 1D³ wherein the embedded chain transfer moiety is a bound form of an optionally unsubstituted diacid. In certain embodiments the diacid is a straight chain saturated diacid and the resulting polymer chains have the formula 1D¹¹:

In certain embodiments, the poly(ethylene carbonate) includes polymer chains of type 1D⁵ along with one or more additional different chain 1D types. In certain embodiments, the poly(ethylene carbonate) includes polymer chains of type 1D⁶ along with one or more additional different chain 1D types. In certain embodiments, the poly(ethylene carbonate) includes polymer chains of type 1D⁷ along with one or more additional different chain 1D types. In certain embodiments, the poly(ethylene carbonate) includes polymer chains of type 1D⁸ along with one or more additional different chain 1D types. In certain embodiments, the poly(ethylene carbonate) includes polymer chains of type 1D⁹ along with one or more additional different chain 1D types.

In certain embodiments, poly(ethylene carbonate) includes polymer chains of type 1C along with chains of type 1D. In certain embodiments, the poly(ethylene carbonate) includes polymer chains of type 1C along with chains of type 1D⁴. In certain embodiments, the poly(ethylene carbonate) includes polymer chains of type 1C along with chains of type 1D⁵. In certain embodiments, the poly(ethylene carbonate) includes polymer chains of type 1C along with chains of type 1D⁶. In certain embodiments, the poly(ethylene carbonate) includes polymer chains of type 1C along with chains of type 1D⁷. In certain embodiments, the poly(ethylene carbonate) includes polymer chains of type 1C along with chains of type 1D⁸. In certain embodiments, the poly(ethylene carbonate) includes polymer chains of type 1C along with chains of type 1D⁹. In certain embodiments, the poly(ethylene carbonate) includes polymer chains of type 1A along with chains of types 1C and 1D. In certain embodiments, the poly(ethylene carbonate) includes polymer chains of type 1A and 1B along with chains of types 1C and 1D.

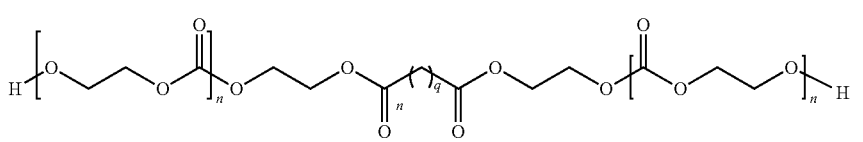

1D¹¹ where each n is independently as defined above, and q is an integer from 0 to 32 inclusive.

In certain embodiments, poly(ethylene carbonate) has approximately 10 to 90% of the chains with structure 1D¹¹ with the balance made up of chains of structures 1A, 1B, or 1C or mixtures of two or more of these.

In certain embodiments, poly(ethylene carbonate) includes two or more varieties of chains of type 1D differentiated from each other by the identity of the embedded chain transfer moiety. In certain embodiments, the poly(ethylene carbonate) includes polymer chains of type 1D⁴ along with one or more additional different chain 1D types.

In certain embodiments, poly(ethylene carbonate) includes chains of type 1C along with chain types 1A or 1A and 1B. In certain embodiments, the poly(ethylene carbonate) includes predominantly chains of type 1C along with lesser amounts of chain types 1A or 1A and 1B. In certain embodiments, the poly(ethylene carbonate) includes a majority (e.g. >50%, >60%, >70%, >80%, or >90%) of chains of type 1C along with lesser amounts of chains of type A. In certain embodiments, the poly(ethylene carbonate) includes a majority (e.g. >50%, >60%, >70%, >80%, or >90%) of chains of type 1C along with lesser amounts of a mixture of chains of types 1A and 1B. In certain embodiments, the poly(ethylene carbonate) includes a majority (e.g. >50%, >60%, >70%, >80%, or >90%) of chains of types 1C and 1D along with lesser amounts of a mixture of chains of types 1A and 1B.

In some embodiments, poly(ethylene carbonate) includes about 30 to 80% of polymer chains selected from chains of structure 1C and 1D or a mixture of 1C and 1D, and 20 to 70% of chains selected from structures 1A, 1B, or a mixture of 1A and 1B.

In certain embodiments, PEC has equal proportions of $1A^2$ and $1B^2$ (e.g. a 1:1 ratio between $1A^2$ chains and $1B^2$ chains) along with any proportion of one or more chain types 1C and/or 1D. In certain embodiments, the PEC contains about equal proportions of four chain types having structures $1A^2$, $1B^2$, C, and $D^4$. In certain embodiments, the PEC has approximately equal proportions of $1A^2$ $1B^2$ and $D^4$ (e.g. approximately a 1:1:1 ratio between $1A^2$ chains $1B^2$ chains and $1D^4$ chains) along with any proportion of chains type 1C. In certain embodiments, the PEC contains approximately 10 to 90% of each of chain types $1A^2$, $1B^2$, 1C and $1D^4$.

In certain embodiments, PEC has approximately equal proportions of $1A^2$, $1B^2$ and $1D^5$ (e.g. approximately a 1:1:1 ratio between $1A^2$ chains $1B^2$ chains and $1D^5$ chains) along with any proportion of chains type 1C. In certain embodiments, the PEC contains approximately 10 to 90% of each of chain types $1A^2$, $1B^2$, 1C and $1D^5$.

In certain embodiments, PEC has approximately equal proportions of $1A^2$, $1B^2$ and $1D^6$ (e.g. approximately a 1:1:1 ratio between $1A^2$ chains $1B^2$ chains and $1D^6$ chains) along with any proportion of chains type 1C. In certain embodiments, the PEC contains approximately 10 to 90% of each of chain types $1A^2$, $1B^2$, 1C and $1D^6$.

In certain embodiments, PEC has approximately equal proportions of $1A^2$, $1B^2$ and $1D^7$ (e.g. approximately a 1:1:1 ratio between $1A^2$ chains $1B^2$ chains and $1D^7$ chains) along with any proportion of chains type C. In certain embodiments, the PEC contains approximately 10 to 90% of each of chain types $1A^2$, $1B^2$, 1C and $1D^7$.

In certain embodiments, PEC has approximately equal proportions of $1A^2$, $1B^2$ and $1D^8$ (e.g. approximately a 1:1:1 ratio between $1A^2$ chains $1B^2$ chains and $1D^8$ chains) along with any proportion of chains type 1C. In certain embodiments, the PEC contains approximately 10 to 90% of each of chain types $1A^2$, $1B^2$, 1C and $1D^8$.

In certain embodiments, PEC has approximately equal proportions of $1A^2$, $1B^2$ and $1D^9$ (e.g. approximately a 1:1:1 ratio between $1A^2$ chains $1B^2$ chains and $1D^9$ chains) along with any proportion of chains type C. In certain embodiments, the PEC contains approximately 10 to 90% of each of chain types $1A^2$, $1B^2$, 1C and $1D^9$.

In certain embodiments, PEC has approximately equal proportions of $1A^2$, $1B^2$ and $1D^{10}$ (e.g. approximately a 1:1:1 ratio between $1A^2$ chains $1B^2$ chains and $1D^{10}$ chains) along with any proportion of chains type 1C. In certain embodiments, the PEC contains approximately 10 to 90% of each of chain types $1A^2$, $1B^2$, 1C and $1D^{10}$.

In certain embodiments, PEC has approximately equal proportions of $1A^2$, $1B^2$ and $1D^{11}$ (e.g. approximately a 1:1:1 ratio between $1A^2$ chains $1B^2$ chains and $1D^{11}$ chains) along with any proportion of chains type C. In certain embodiments, the PEC contains approximately 10 to 90% of each of chain types $1A^2$, $1B^2$, 1C and $1D^{11}$.

In certain embodiments, where PEC includes two or more chain types (e.g. any of structures 1A through $1D^{11}$), the value of n at each occurrence is approximately the same.

In certain embodiments, any of the structures 1A through $1D^{11}$ described above may be modified. In certain embodiments, this may be done by performing chemistry post-polymerization on the terminal hydroxyl group(s). In certain embodiments, the poly(ethylene carbonate) may contain chains of type 1A through $1D^{11}$, where the terminating groups are esters, ethers, carbamates, sulfonates, or carbonates. In certain embodiments, these derivatives may be formed by reaction with acylating agents to provide groups such as acetate, trifluoroacetate, benzoate or pentafluorobenzoate. In some embodiments, hydroxyl groups may be reacted with isocyanates to form carbamates, with silyl halides or silyl sulfonates to form silyl ethers, with alkyl halides or alkyl sulfonates to form ethers, or with sulfonyl halides or anhydrides to form sulfonates.

APPENDIX C

This appendix describes additional aliphatic polycarbonates and blends encompassed in the extruded polymer blends and barrier materials of the present invention.

In certain embodiments, a polymer blend includes a terpolymer of poly(propylene carbonate) and poly(ethylene carbonate), or poly(propylene carbonate)-co-poly(ethylene carbonate)terpolymer, where the polymer include both ethylene carbonate and propylene carbonate repeat units throughout the chain.

In certain embodiments, a polymer blend includes a polycarbonate having the structure of formula 1:

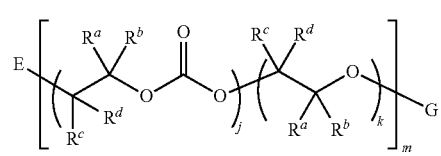

where:
$R^a$ is hydrogen, halogen, -L-$OR^z$, or an optionally substituted moiety selected from the group consisting of $C_{1-30}$ aliphatic; 3- to 14-membered carbocycle; 6- to 14-membered aryl; 5- to 14-membered heteroaryl having 1-4 heteroatoms independently selected from nitrogen, oxygen, or sulfur; and 3- to 12-membered heterocyclic having 1-3 heteroatoms independently selected from the group consisting of nitrogen, oxygen, and sulfur; or $R^a$ is a $C_{1-8}$ saturated or unsaturated, straight or branched, hydrocarbon chain, where one or more methylene units are optionally and independently replaced by —NR—, —N(R)C(O)—, —C(O)N(R)—, —N(R)SO$_2$—, —SO$_2$N(R)—, —O—, —C(O)—, —OC(O)—, —OC(O)O—, —C(O)O—, —OC(O)N (R)—, —S—, —SO—, —SO$_2$—, —C(=S)—, or —C(=NR)— and where one or more hydrogen atoms is optionally replaced with —$OR^z$;
L is a $C_{1-8}$ saturated or unsaturated, straight or branched, hydrocarbon chain,
each R is independently hydrogen, optionally substituted $C_{1-6}$ aliphatic, or:
two R on the same nitrogen atom are taken together with the nitrogen atom to form a 4- to 7-membered heterocyclic ring having 0-2 additional heteroatoms independently selected from nitrogen, oxygen, or sulfur;
$R^z$ is selected from the group consisting of hydrogen, a silyl group, a hydroxyl protecting group, or an optionally substituted group selected from the group consisting of $C_{1-20}$ acyl; $C_{1-20}$ aliphatic; 3- to 14-membered carbocycle; 6- to 14-membered aryl; 5- to 14-membered heteroaryl having 1-4 heteroatoms independently selected from nitrogen, oxygen, or sulfur; and 3- to 12-membered heterocyclic having 1-3 heteroatoms independently selected from the group consisting of nitrogen, oxygen, and sulfur;

each of $R^b$, $R^c$, and $R^d$ is independently hydrogen, halogen, or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 3- to 14-membered carbocycle; 6- to 14-membered aryl; 5- to 14-membered heteroaryl having 1-4 heteroatoms independently selected from nitrogen, oxygen, or sulfur; and 3- to 12-membered heterocyclic having 1-3 heteroatoms independently selected from the group consisting of nitrogen, oxygen, and sulfur;
where any of ($R^a$ and $R^c$), ($R^c$ and $R^d$), and ($R^a$ and $R^b$) can be taken together with intervening atoms to form one or more optionally substituted rings selected from the group consisting of: 3- to 14-membered carbocycle; and 3- to 12-membered heterocyclic having 1-3 heteroatoms independently selected from the group consisting of nitrogen, oxygen, and sulfur;

E is any group that can ring-open an epoxide;

G is selected from the group consisting of hydrogen, a $C_{1-20}$ acyl group, a silyl group, an optionally substituted $C_{1-20}$ aliphatic group, an optionally substituted 6- to 14-membered aryl group, a carbamoyl group, and a hydroxyl protecting group;

j is an integer from about 50 to about 15,000;

k is an integer from about 0 to about 2,500; and m is the sum of j and k, where m is an integer from about 50 to about 17,500.

In certain embodiments, a polymer blend includes a polycarbonate having the structure of formula 1a:

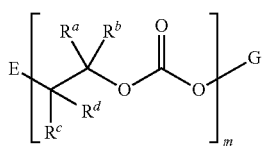

where E, G, $R^a$, $R^b$, $R^c$, and $R^d$ are as defined above, and m is an integer between about 100 and about 17,500.

In certain embodiments, a polymer blend includes a polycarbonate having the structure of formula 2:

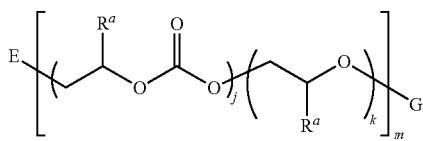

where E, G, $R^a$, j, k, and m are as defined above.

In certain embodiments, a polymer blend includes a polycarbonate having the structure of formula 2 where $R^a$ is selected from the group consisting of —H, methyl, ethyl, propyl, butyl, higher saturated aliphatic, chloromethyl, trifluoromethyl, pentafluoroethyl, higher fluoroalkyl, vinyl, allyl, phenyl, benzyl, higher unsaturated aliphatic, and $CH_2OR^z$, where $R^z$ is as defined above. In certain embodiments, the polycarbonate is part of a random-, tapered-, or block-copolymer including monomer units incorporating any two or more of these $R^a$ groups.

In certain embodiments, a polymer blend includes a polycarbonate having the structure of formula 2 where $R^a$ is selected from the group consisting of —H, methyl, ethyl, propyl, butyl, $C_{5-30}$ alkyl, chloromethyl, trifluoromethyl, pentafluoroethyl, vinyl, allyl, phenyl, benzyl, $CH_2OAc$, $CH_2OC(O)CF_3$, $CH_2OC(O)Et$, $CH_2OBz$, $CH_2OMe$, $CH_2OEt$, $CH_2OPr$, $CH_2OBu$, $CH_2OPh$, $CH_2OBn$, $CH_2OAllyl$, and $CH_2OCF_3$. In certain embodiments, the polycarbonate is part of a random-, tapered-, or block-copolymer including monomer units incorporating any two or more of these $R^a$ groups.

In certain embodiments, a polymer blend includes a polycarbonate having the structure of formula 3:

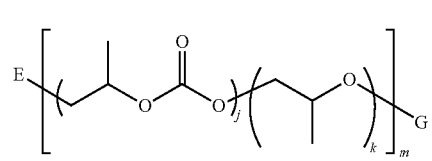

where E, G, j, k, and m are as defined above.

In certain embodiments, a polymer blend includes a polycarbonate having the structure of formula 3a:

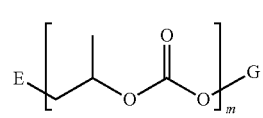

where E and G are as defined above and m is an integer between about 100 and about 17,500.

In certain embodiments, a polymer blend includes a polycarbonate having the structure of formula 4:

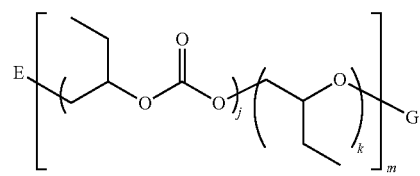

where E, G, j, k, and m are as defined above.

In certain embodiments, a polymer blend includes a polycarbonate having the structure of formula 5:

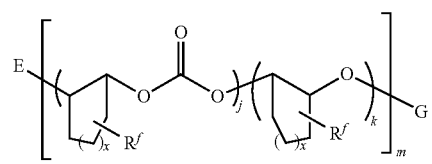

where E, G, $R^a$, j, k, and m are as defined above, each $R^f$ is independently an optionally substituted $C_{1-10}$ aliphatic group, and x is an integer between 0 and 5 inclusive.

In certain embodiments, a polymer blend includes a polycarbonate having the structure of formula 6:

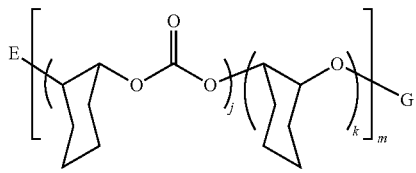
6 where E, G, j, k, and m are as defined above.

In certain embodiments, a polymer blend includes a polycarbonate having the structure of formula 7:

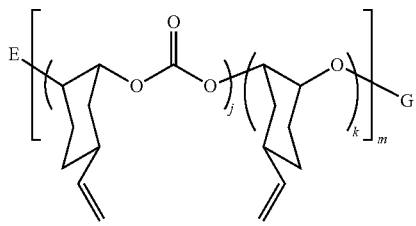
7 where E, G, j, k, and m are as defined above.

In some embodiments, $R^a$ is -L-$OR^z$. In some embodiments, L is a bivalent $C_{1-8}$ saturated or unsaturated, straight or branched, hydrocarbon chain. In some embodiments, one or more methylene units of L are optionally and independently replaced by —NR—, —N(R)C(O)—, —C(O)N(R)—, —N(R)SO$_2$—, —SO$_2$N(R)—, —O—, —C(O)—, —OC(O)—, —C(O)O—, —S—, —SO—, —SO$_2$—, —C(=S)—, or —C(=NR)—. In some embodiments, L is a bivalent $C_{1-8}$ saturated hydrocarbon chain, where one or two methylene units of L are optionally and independently replaced by —O—. In certain embodiments, L is —CH$_2$—.

In certain embodiments, a polymer blend includes a polycarbonate having the structure of formula 8:

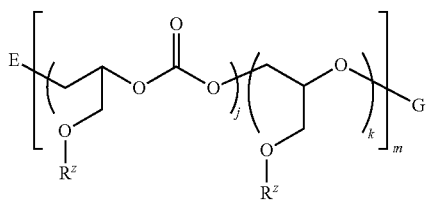
8 where $R^z$, E, G, j, k, and m are as defined above.

In certain embodiments, a polymer blend includes a polycarbonate having the structure of formula 9.

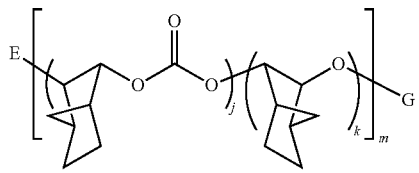
9 where E, G, j, k, and m are as defined above.

In certain embodiments, a polymer blend includes a polycarbonate having the structure of formula 10 or formula 11:

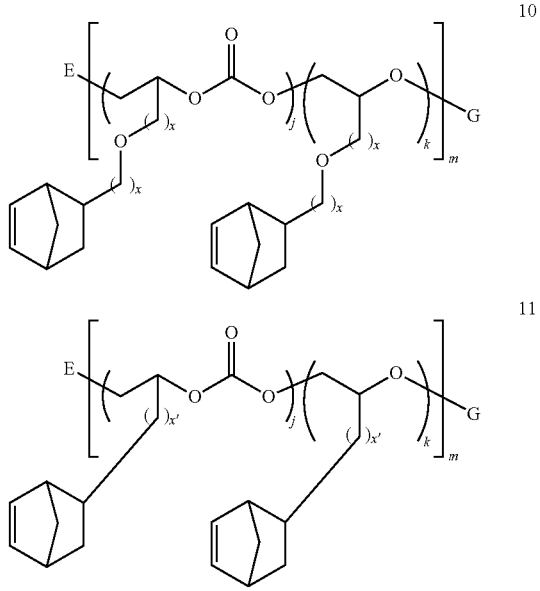

where E, G, j, k, and m are as defined above, each x is independently an integer between 0 and 4 inclusive, and each x' is independently an integer between 0 and 8 inclusive.

In certain embodiments, a polycarbonate may be characterized by the percentage of carbonate and ether linkages in the polymer chains. This characteristic may also be expressed as the ratio of j:k as shown in formulae 1 through 11. In certain embodiments, the polymer blend includes a polycarbonate having the structure of any of formulae 1 through 11, where the value of j is greater than the value of k. In certain embodiments, the value of j is at least about 10 times greater than the value of k. In other embodiments, the value of j is at least about 20 times greater than the value of k. In certain embodiments, the value of j is at least about 50 times greater than the value of k. In other embodiments, the value of j is at least about 100 times greater than the value of k. In certain embodiments, the value of k is 0. In some embodiments, the polycarbonate composition is essentially free of k repeating units (ether linkages).

In certain embodiments, a polymer blend includes a polycarbonate having the structure of any of formulae 1 through 11, where the number average molecular weight ($M_N$) of the APC is in the range from about $1\times10^4$ g/mol to about $2\times10^6$ g/mol. In certain embodiments, $M_N$ ranges from about 20,000 g/mol to about 400,000 g/mol. In certain embodiments, $M_N$ ranges from about 80,000 g/mol to about 300,000 g/mol. In certain embodiments, $M_N$ ranges from about 100,000 g/mol to about 300,000 g/mol. In certain embodiments, $M_N$ ranges from about 150,000 g/mol to about 250,000 g/mol.

In certain embodiments, a polymer blend includes a random, block, or tapered copolymer of two or more of 1 through 11.

What is claimed is:

1. An extruded polymer blend comprising at least 70 weight percent aliphatic polycarbonate and at least one polyolefin, wherein:
   the aliphatic polycarbonate comprises a blend of two or more aliphatic polycarbonates having a different average molecular weight and having greater than 90% carbonate linkages and less than 10% ether linkages;
   the aliphatic polycarbonate is selected from the group consisting of poly(propylene carbonate), poly(ethylene carbonate), poly(propylene carbonate)-co-poly(ethylene carbonate), a poly(propylene carbonate) co-polymer with one or more additional aliphatic polycarbonates, a poly(ethylene carbonate) co-polymer with one or more additional aliphatic polycarbonates, a physical blend of any two or more of the above, and a copolymer comprising any of the above.

2. The extrude polymer blend of claim 1, wherein the aliphatic polycarbonate comprises a copolymer of carbon dioxide and one or more epoxides.

3. The extruded polymer blend of claim 1, comprising polypropylene carbonate).

4. The extruded polymer blend from claim 1, comprising poly(ethylene carbonate).

5. The extruded polymer blend of claim 1, wherein the polyolefin is selected from the group consisting of polyethylene, polypropylene, poly(alpha olefins), and mixtures or copolymers of any two or more of these.

6. The extruded polymer blend of claim 1, wherein the polyolefin is selected from the group consisting of LDPE, LLDPE, HDPE, polypropylene, or any combination of the above.

7. The extruded polymer blend of claim 1, wherein the polyolefin comprises polyethylene.

8. The extruded polymer blend of claim 1, wherein the polyolefin comprises polypropylene.

9. The extruded polymer blend of claim 1, further comprising at least one compatibilizer.

10. The extruded polymer blend of claim 1, comprising at least 80 weight percent aliphatic poly carbonate.

11. The extruded polymer blend of claim 1, comprising at least 85 weight percent aliphatic poly carbonate.

12. The extruded polymer blend of claim 1, comprising at least 90 weight percent aliphatic poly carbonate.

13. The extruded polymer blend of claim 1, comprising at least 95 weight percent aliphatic poly carbonate.

14. The extruded polymer blend of claim 10, wherein the polyolefin represents between about 5% and about 30% of the blend.

15. The extruded polymer blend of claim 10, wherein the polyolefin represents between about 10% and about 25% of the blend.

16. The extruded polymer blend of claim 1, wherein the blend has been extruded at a temperature above 160° C.

17. The extruded polymer blend of claim 16, wherein the blend has been extruded at a temperature above 170° C.

18. The extruded polymer blend of claim 16, wherein the blend has been extruded at a temperature above 180° C.

19. The extruded polymer blend of claim 16, wherein the blend has been extruded at a temperature above 200° C.

20. A plastic film comprising an extruded polymer blend of claim 1.

21. The plastic film of claim 20, wherein the film has been stretched and that the elongation before break value as measured using ASTM D882, prior to stretching is less than 50% and that the elongation before break value as measured using ASTM D882 after stretching is greater than 100%.

* * * * *